US012344519B2

(12) United States Patent
Chang et al.

(10) Patent No.: US 12,344,519 B2
(45) Date of Patent: Jul. 1, 2025

(54) BEVERAGE DISPENSING MACHINE AND POUCH FOR USE WITH BEVERAGE DISPENSING MACHINE

(71) Applicant: LNJ Group, LLC, Glen Head, NY (US)

(72) Inventors: Marshal Chang, Westminster, MD (US); Jeremy M. Fallis, Jr., Bethlehem, PA (US); Brian Orme, Phoenixville, PA (US); Derrick Du, San Bruno, CA (US); Charles Le Pere, Cork (IE); Courtney Cavanaugh, Cork (IE); Simon Gatrall, Cork (IE); Jonathan Downing, Cork (IE); Jon-William Murphy, Cork (IE)

(73) Assignee: LNJ Group, LLC, Glen Head, NY (US)

( * ) Notice: Subject to any disclaimer, the term of this patent is extended or adjusted under 35 U.S.C. 154(b) by 85 days.

(21) Appl. No.: 17/548,353

(22) Filed: Dec. 10, 2021

(65) Prior Publication Data

US 2022/0274822 A1 Sep. 1, 2022

Related U.S. Application Data

(63) Continuation-in-part of application No. 16/553,168, filed on Aug. 27, 2019, now Pat. No. 11,608,259.

(Continued)

(51) Int. Cl.

*B67D 1/08* (2006.01)
*B67D 1/12* (2006.01)
*F25B 21/02* (2006.01)

(52) U.S. Cl.

CPC .......... *B67D 1/0869* (2013.01); *B67D 1/1211* (2013.01); *F25B 21/02* (2013.01)

(58) Field of Classification Search

CPC .. B67D 1/0869; B67D 1/0004; B67D 1/0809; B67D 1/0895; B01F 2215/0072; A47J 31/0673; A47J 31/3628

(Continued)

(56) References Cited

U.S. PATENT DOCUMENTS 4,829,771 A * 5/1989 Koslow .................. F25B 21/02 62/3.64
8,839,631 B2 * 9/2014 Lu .......................... F25B 21/02 62/426

(Continued)

*Primary Examiner* — Charles P. Cheyney

(74) *Attorney, Agent, or Firm* — Meister Seelig & Fein PLLC

(57) ABSTRACT

A beverage dispensing device comprising a beverage reservoir, a receptacle that receives a beverage container including a beverage and discharges the beverage from the beverage container into the beverage reservoir, a cutting mechanism that opens the beverage container to release the beverage, a cooling system comprising one or more thermoelectric coolers including one or more plate-like surfaces along the flow path wherein the cooling system performs at least one of chilling or warming the beverage that flows over at least part of the plate-like surface. The beverage dispensing device further comprising a pump that transfers the beverage from the beverage reservoir to the cooling system, an aeration component that receives and aerates the beverage from the cooling system, and a discharge nozzle coupled to the aeration component that dispenses the beverage.

37 Claims, 40 Drawing Sheets

Related U.S. Application Data

(60) Provisional application No. 62/723,068, filed on Aug. 27, 2018.

(58) Field of Classification Search
USPC .............................. 222/146.1; 99/323.1, 295
See application file for complete search history.

(56) References Cited

U.S. PATENT DOCUMENTS

| | | | | |
|---|---|---|---|---|
| 9,695,030 | B2 * | 7/2017 | Walker | B67D 1/0047 |
| 9,932,218 | B2 * | 4/2018 | Melville, Jr. | B67D 1/0046 |
| 10,040,042 | B2 * | 8/2018 | Showalter | B65D 35/242 |
| 10,526,188 | B2 * | 1/2020 | Kim | B67D 1/0869 |
| 2015/0079240 | A1 * | 3/2015 | Lo Foro | A47J 31/407<br>426/115 |
| 2015/0125586 | A1 * | 5/2015 | Ergican | A47J 31/46<br>99/295 |
| 2016/0175783 | A1 * | 6/2016 | Jarrousse | B01F 25/31242<br>261/130 |
| 2016/0255991 | A1 * | 9/2016 | Givens, Jr. | A47J 31/41 |
| 2017/0334704 | A1 * | 11/2017 | Koretz | B67D 1/0809 |
| 2018/0362326 | A1 * | 12/2018 | Jarrousse | B67D 3/0032 |
| 2019/0231119 | A1 * | 8/2019 | Kennedy | A47J 31/407 |

* cited by examiner

Step 1: Touch Button to turn on the machine & open the pouch door

Step 2: Insert Pouch

Step 3: Touch button to close door & start cycle

Step 4: Finished

Step 1: Touch button to turn on the machine and open the pouch door.
Start up--Light rotates around button indicating internal processing, not yet ready for pouch insertion Step 2: Insert Pouch
Ready--Light becomes solid or fades in and out before pouch is inserted to indicate readiness/ waiting Step 3: Touch button to close door and start cycle
Processing--Light glows solid and bright when button is pressed to show confirmation Step 4: Finished!
Completion--Light blinks twice, then stays solid to indicate completion of the process

BEVERAGE DISPENSING MACHINE AND POUCH FOR USE WITH BEVERAGE DISPENSING MACHINE

CROSS-REFERENCE TO RELATED APPLICATION

This application is a continuation-in-part of U.S. patent application Ser. No. 16/553,168, filed on Aug. 27, 2019, which in turn claims priority to U.S. Provisional Patent Application No. 62/723,068, filed on Aug. 27, 2018, the disclosures of which are incorporated herein by reference in their entireties.

This application claims priority to Australian Patent Application No. 2021201910, filed on Mar. 26, 2021, the disclosure of which is incorporated herein by reference.

FIELD OF THE INVENTION

The technology described herein relates to a beverage dispensing machine and a pouch for use with the beverage dispensing machine. In particular, the technology concerns a wine dispensing machine and a pouch for holding a single serving of wine.

DESCRIPTION OF THE RELATED ART

Wine is a favorite evening and bar product for many adults. The top 30% of drinkers in the United States have on average one glass of wine per day. A standard bottle of wine holds 750 ml or 25.4 oz., which is equivalent to approximately six glasses of wine. Thus, the wine consumer will typically have 3-6 days with the same bottle of wine.

Consumers often store bottles of wine in the refrigerator or on kitchen shelves. White wine is usually served chilled at a temperature of about 43° F. (7° C.). Red wines should be served at a temperature that is slightly below room temperature at a temperature of about 64° F. (18° C.) (except for specific varietals, such as Zinfandel or Lambrusco). For wine to be fully appreciated, it is desired to be served under appropriate conditions, including optimum temperature.

Consumers often desire to decant or aerate wine before consuming it to allow it to breathe. Various devices have been created to permit aeration of wine in a quick manner, such that decanting is not necessary.

The single serve beverage category is expanding due to added consumer convenience and other factors. Some manufacturers have begun selling single-serve wines in small bottles or hard containers, such as wine glasses that include a removable seal around the opening. Several manufacturers are selling single serve wine in soft pouches. Others sell single serve brick packs of wine.

U.S. Pat. No. 10,035,111, assigned to "10-VINS" describes a machine for preparing wine. It discusses a liquid flow pipe that is cooled using a well-known Peltier cooling device. After the wine reaches a proper temperature, the wine flows down the liquid flow pipe through an aerating device before it is dispensed through a nozzle. The aeration occurs downstream from the cooling. The liquid remains in the pipe and the wine is cooled by conduction through the pipe wall.

SUMMARY

The present invention provides a beverage dispensing machine and method for processing a pouch containing a beverage. According to one embodiment, the beverage dispensing device comprises a beverage reservoir, a receptacle that receives a beverage container including a beverage and discharges the beverage from the beverage container into the beverage reservoir, a cutting mechanism that opens the beverage container to release the beverage therefrom, a cooling system comprising one or more thermoelectric coolers including one or more plate-like surfaces along the flow path wherein the cooling system performs at least one of chilling or warming the beverage that flows over at least part of the plate-like surface. The beverage dispensing device further comprises a pump that transfers the beverage from the beverage reservoir to the cooling system, an aeration component that receives and aerates the beverage from the cooling system, and a discharge nozzle coupled to the aeration component that dispenses the beverage.

The one or more thermoelectric coolers may cause additional aeration and include one or more of fins, channels, projections, a circuitous path, and a flat surface. The one or more thermoelectric coolers may include a Peltier cooler coupled to a radiator system. The Peltier cooler may include a plate-like surface that allows the beverage to flow therewith, the plate-like surface is either smooth or non-smooth, wherein the non-smooth surface provides turbulence to the beverage that serves as an aeration function. The cooling system may comprise one or more of a pump, a valve, a cooling block, a radiator, and a cooling fluid circulating through the radiator. The beverage dispensing device may further comprise activation hardware and software that activates the beverage dispensing device to cool and dispense the beverage from the beverage container.

In one embodiment, the beverage dispensing device may further comprising a discard bin coupled to the receptacle and a discard mechanism coupled between the receptacle and the discard bin, wherein the beverage container is moved from the receptacle to the discard bin via the discard mechanism after the beverage container has been substantially emptied of the beverage. In another embodiment, the beverage dispensing device may further comprise a housing including a head having a top surface having an opening for receiving the beverage container, wherein the opening is coupled to the receptacle. In yet another embodiment, the beverage dispensing device may further comprise a door coupled to the opening, wherein the door is automatic or manual, and the head includes the discharge nozzle positioned on a lower side thereof, wherein the housing includes a recess positioned below the head and the discharge nozzle for receiving a glass. In an alternative embodiment, the beverage dispensing device may comprise a door coupled to the opening in the housing, wherein the door closes the opening and is opened either manually or automatically operated. In yet another alternative embodiment, the beverage dispensing device further comprises a piercing element that pierces the beverage container at one or more locations on the beverage container to permit the beverage to vacate the beverage container, wherein the beverage flows by gravity into the beverage reservoir.

The piercing element may comprise one or more sharp elements that are coupled to a motor that moves the piercing element in and out of contact with the beverage container to repeatedly pierce and/or agitate the beverage container, the movement of the piercing element causing aeration of the beverage. The cutting mechanism may be coupled to the receptacle to permit cutting of the beverage container when the beverage container is positioned in the receptacle. The receptacle may be coupled to a discard bin and further comprises means for transferring the beverage container from the receptacle to the discard bin. The Peltier cooler may include a cooling surface positioned in a partially vertical orientation. The cutting mechanism may include a cutting blade and where the cutting blade may be coupled to a motor that moves the blade in and out of contact with the beverage container to repeatedly cut and/or agitate the beverage container, wherein the movement of the cutting blade causing aeration of the beverage. The beverage dispensing device may further comprise an activation button, wherein the activation button turns the beverage dispensing device on and activates dispensation of the beverage from the beverage dispensing device.

In one embodiment, the cooling system may comprise at least one cooling pump, at least one heat sink, at least one radiator, and at least one fan, wherein the beverage flows into a first opening in the heat sink and out of a second opening in the heat sink, and the cooling pump pumps a cooling fluid from an area adjacent to the one or more thermoelectric coolers and through the radiator that is cooled by the at least one fan and returned to the cooling pump. The heat sink includes a pair of plate-like members including fins extending outwardly from a surface thereof to define channels, wherein the fins are positioned adjacent one another to provide a flow path therebetween, and further comprises a core positioned between the pair of plate-like members to define sides of a chamber through which the beverage flows. The core may include an entrance and an exit that each corresponds with a channel defined between the pair of plate-like members, wherein a seal is positioned between the core and each of the plate-like members, and a plurality of fasteners couple the heat sink together.

The cooling system may comprise a pair of Peltier coolers including a heat sink positioned between the Peltier coolers, and a cooling pump positioned directly adjacent each of the Peltier coolers to transfer cooling fluid through a radiator, where the cooling fluid is cooled and recirculated to the respective cooling pump. The receptacle may be shaped to trap the beverage container in the receptacle and to permit cutting of the receptacle with a cutting knife that moves into and out of the receptacle to cut the beverage container, wherein the beverage in the container evacuates the container via gravity. The beverage dispensing device may further comprise a first temperature sensor associated with the reservoir, a second temperature sensor associated with the beverage dispensing device that measures an ambient temperature, and a third temperature sensor associated with the cooling system that measures the temperature of the beverage in the cooling system.

According to one embodiment, the method comprises detecting, by a sensor coupled to a computing device, a presence of a pouch within a compartment and receiving, by the computing device, code data from a code scanning device, wherein the code data includes parameters for processing beverage from the pouch including beverage type, ideal serving temperature, and ideal aeration. Operation of the beverage dispensing device may be based on the code data. A cutting mechanism is instructed by the computing device to empty a beverage from the pouch into a beverage reservoir. The method further comprises the computing device detecting a temperature of the beverage via a temperature sensor, determining the beverage requires chilling to the ideal serving temperature and aeration to an ideal aeration based on the beverage type, instructing a pump to direct the beverage from the beverage reservoir to a cooling system, instructing a cooling system to cool the beverage to the ideal temperature, instructing an aeration component to aerate the beverage, and instructing a nozzle to dispense the beverage.

The code data may comprise a barcode or a quick response code that is associated with the pouch. The code data may include year of vintage, vineyards, grape varietal, food pairings, tasting notes, regions, wine makers, aromas, viscosity, sediments, production method, wine ratings/user reviews, packager/packaging facility, and date of packaging. The pouch may be authenticated as licensed or trustworthy based on the code data. Information from the code data may be displayed on a display. The aeration component may comprise at least one of a gravity fed system, a disruption system, and a venturis system.

BRIEF DESCRIPTION OF THE DRAWING FIGURES

DETAILED DESCRIPTION

Figure 1:
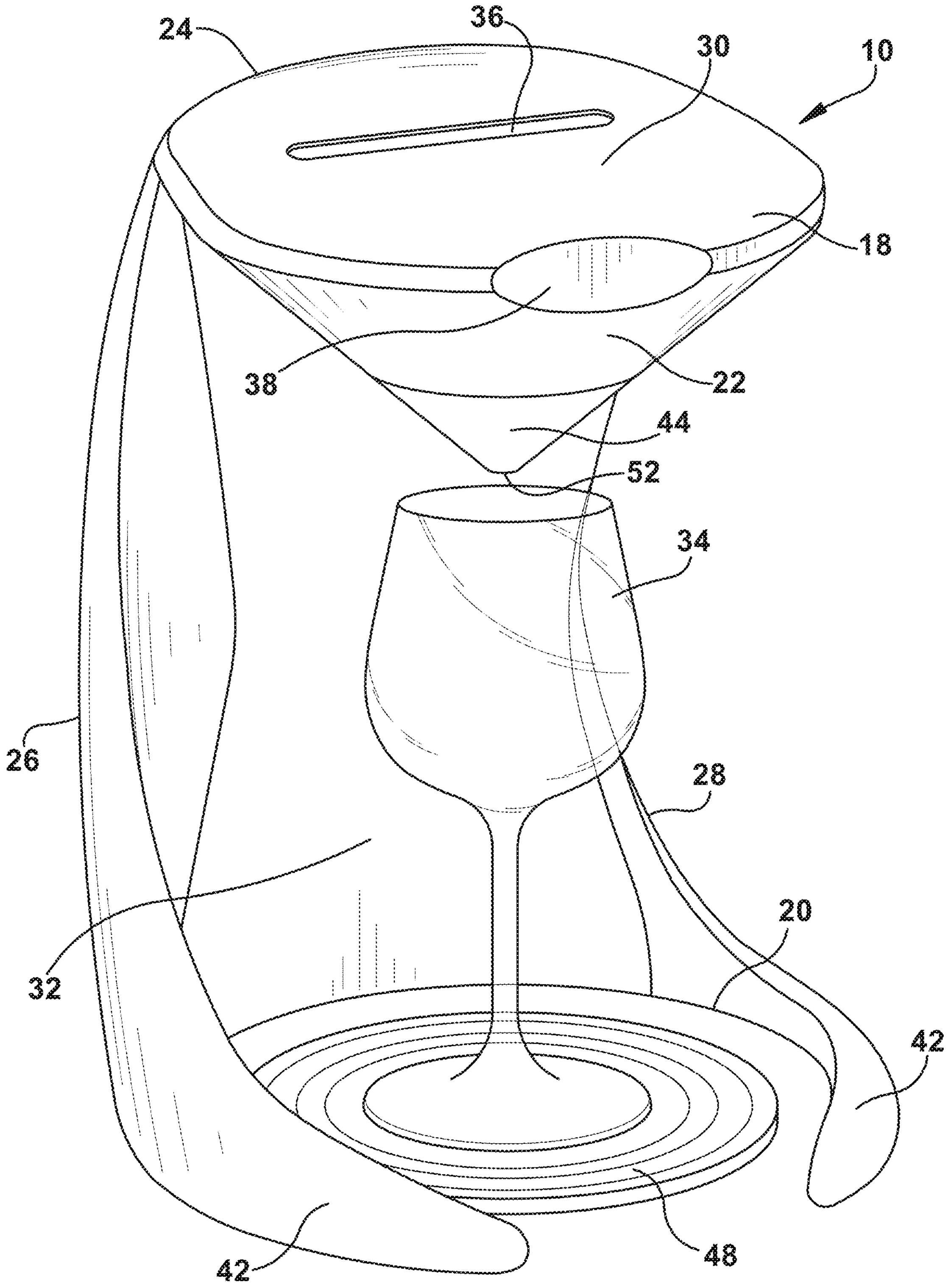
FIG. 1 illustrates a perspective view of an exemplary wine dispensing device according to a first embodiment of the present invention.
Figure 2:
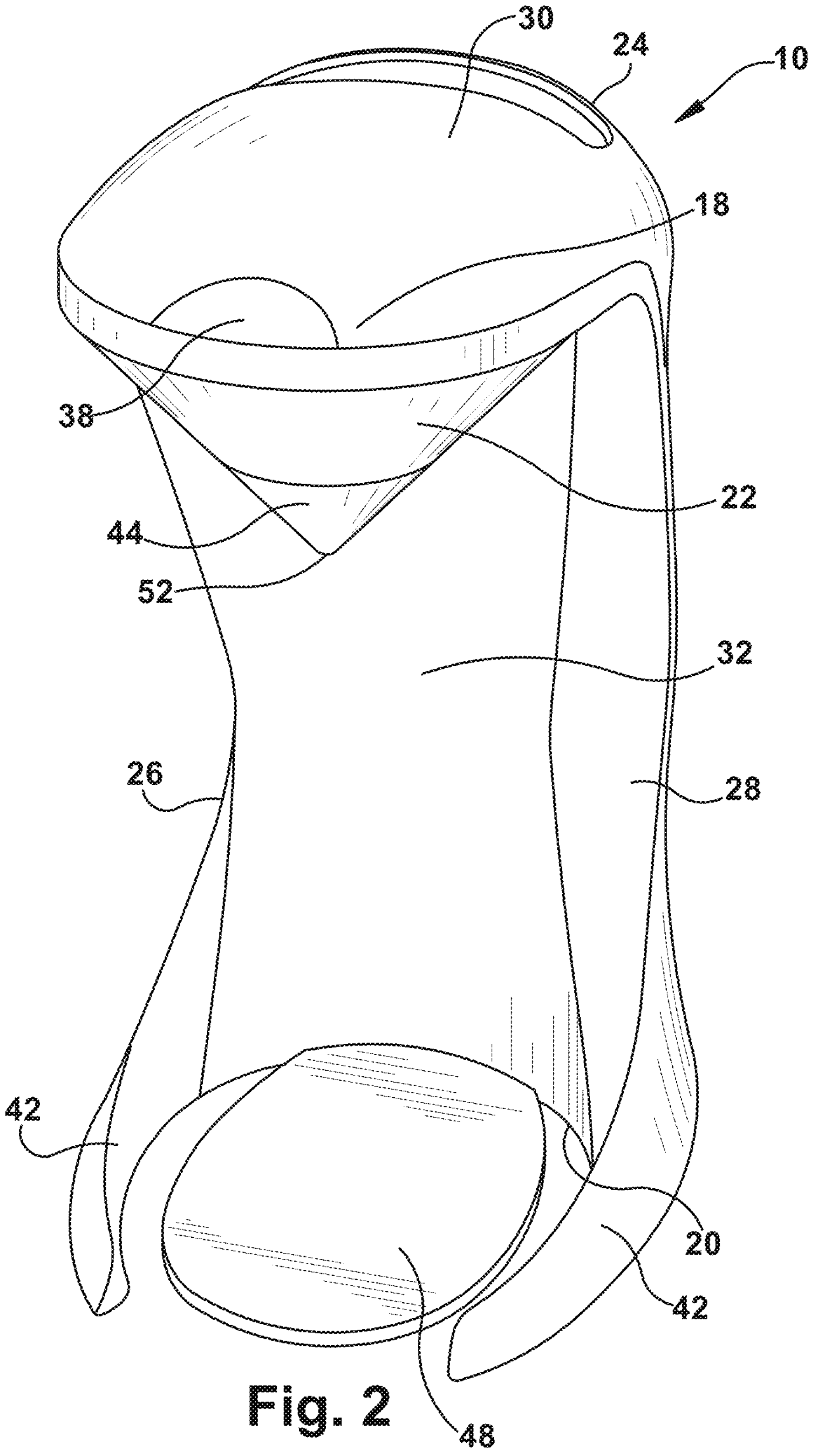
FIG. 2 illustrates a front perspective view of a wine dispensing device according to a second embodiment of the present invention.
Figure 4:
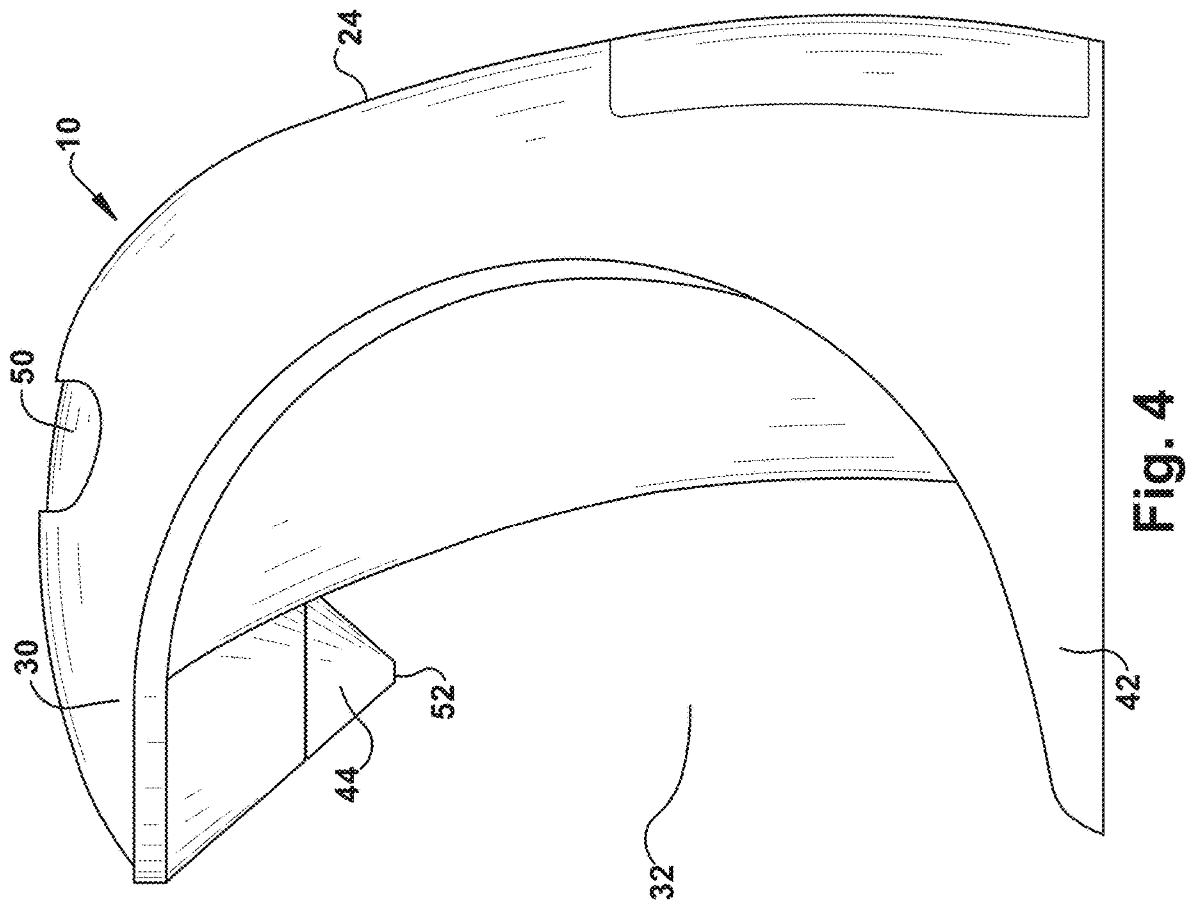
FIG. 4 illustrates a side view of the wine dispensing device according to the second embodiment of the present invention, with the opposite side being a mirror image thereof.
Figure 3:
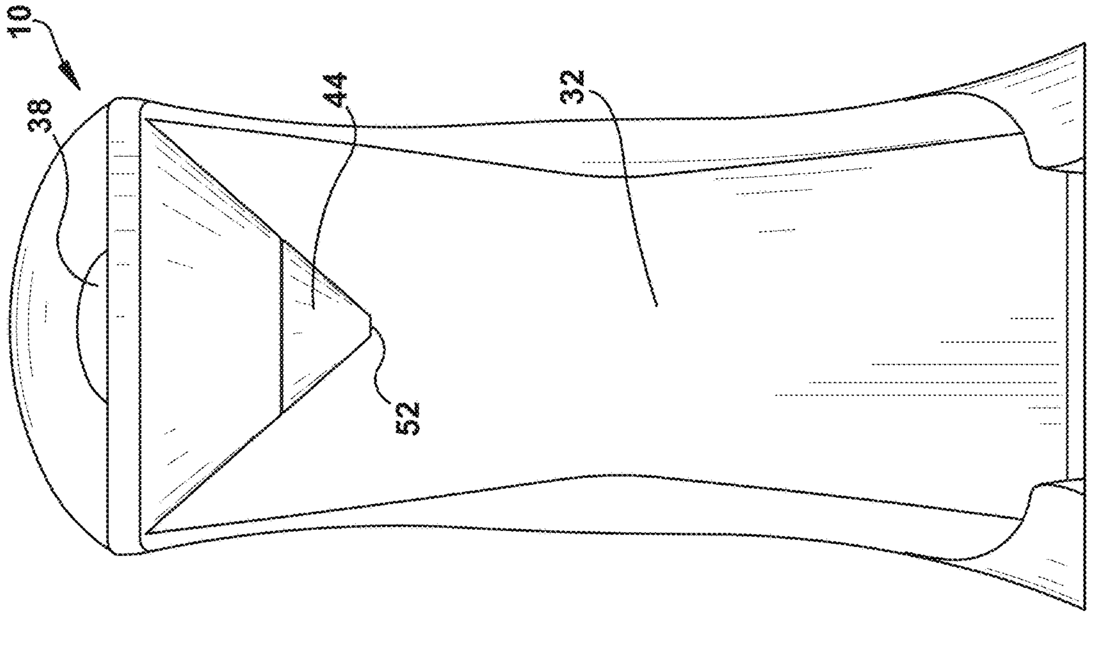
FIG. 3 illustrates a front view of the wine dispensing device according to the second embodiment of the present invention.
Figure 5:
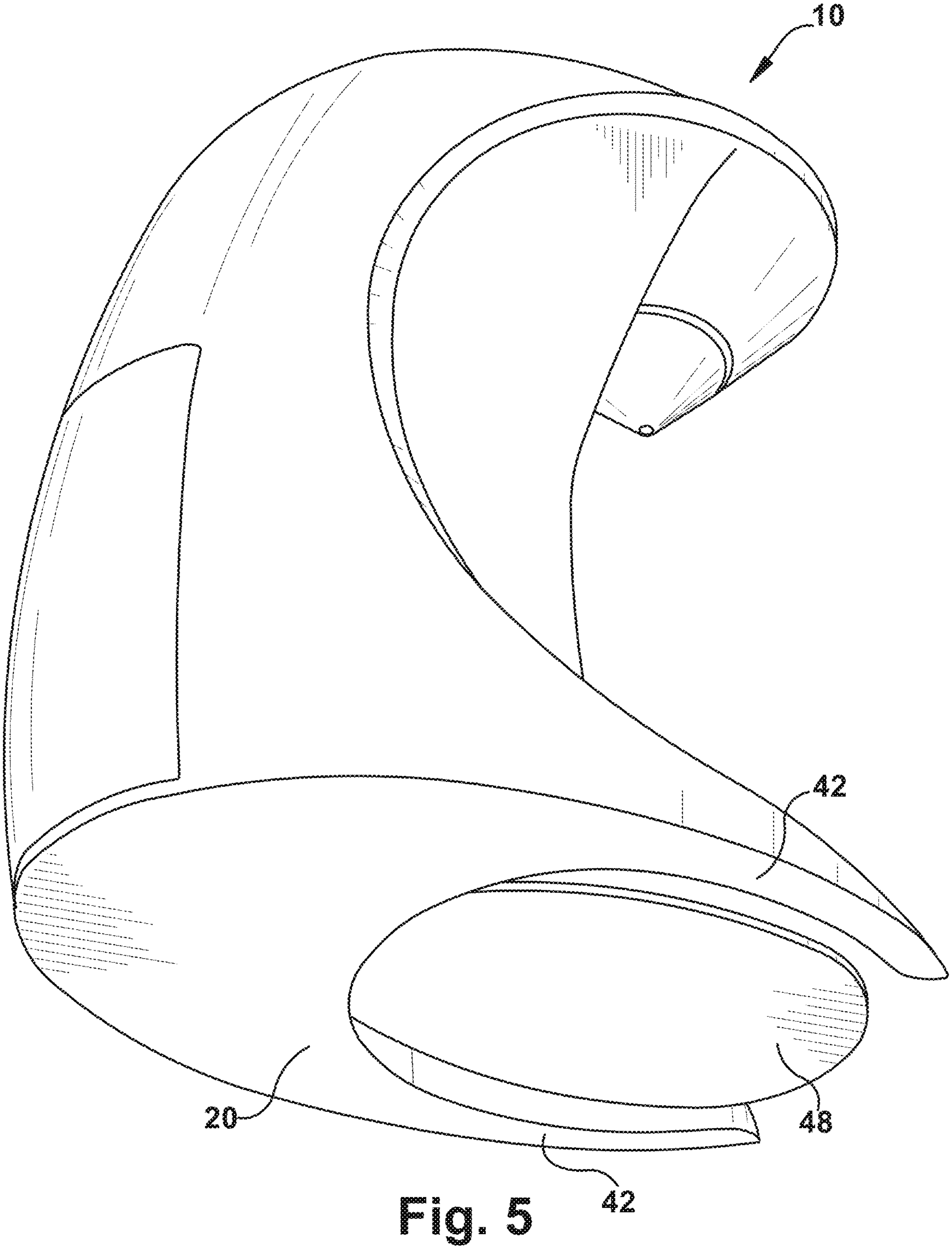
FIG. 5 illustrates a bottom, rear perspective view of the wine dispensing device according to the second embodiment of the present invention.

Wine consumption is on the rise in the United States, largely due to the Millennial market. Wine drinkers' motives for choosing wine over other alcoholic beverages primarily revolve around relaxation and socialization.

The technology described herein relates to wine dispensing devices and systems that can be used by an ordinary consumer and stored on a countertop under the upper cabinets in the kitchen. The wine dispensing devices and system may be intended for both daily and occasional use. An exemplary wine dispensing device may operate quietly and have a height under 18 inches and a depth that is less than 24 inches. The disclosed wine dispensing devices may include features including chilling (and warming), aerating, serving, and preserving of wine. Other features may also be provided, if desired.

The flexible packaging market continues to grow due to its convenience and portability. The flexible packaging segment is the largest segment worldwide comprising 29% of all packaging types. One type of flexible packaging is a pouch, such as a four-sided pouch or a pouch with a bottom gusset. Pouches with a bottom gusset typically will stand up while four-sided pouches typically cannot stand up. A pouch for use with the herein described wine dispensing devices may utilize a barrier film that can be used to seal the wine, alcohol, or other beverages in the pouch with an acceptable shelf-life.

The disclosed wine dispensing device may be utilized with a pre-filled beverage pouch. The filled beverage pouch may be designed to hold a wine product and to have a shelf-life of at least 18 months-24 months. The wine pouches may be made with flexible packaging in the form of soft pouches that are portable and easy to use. The flexible packaging may be of any known type, suitable for mechanical opening and providing an appropriate amount of preservation for the contents of the pouch.

Techniques for opening soft pouches are known and disclosed by U.S. Pat. No. 9,695,030, which issued on Jul. 4, 2017. The disclosure of U.S. Pat. No. 9,695,030 is incorporated herein by reference in its entirety. The presently disclosed wine dispensing device may use opening techniques including horizontal or vertical slicing, cutting, piercing, squeezing, and piercing at multiple locations, including on the side and/or bottom of a pouch. One or more blades may be used for cutting. The blades may comprise one or more different blade types and forms including serrated and different blade shapes depending on a type of cut. One or more piercers may be used for piercing. In addition, techniques for opening non-soft pouches are disclosed and may be utilized with the wine dispensing device described herein, if desired. These include molded containers that have at least one end that is soft, permitting the end or ends to be opened with any of the techniques described. Exemplary shapes of the disclosed molded containers include bottles, cups, and test tube-shapes, among other known shapes. The molded containers may, themselves be openable by the techniques described herewith.

Referring to the figures, FIG. 1 depicts a first embodiment of the wine dispensing device 10. The wine dispensing device 10 has a housing with a top end 18, a bottom end 20, a front 22, a rear 24, a left side 26 and a right side 28. A head 30 that houses some of the inner workings of the device 10 is positioned at the top end 18. A recess 32 is provided in the center of the front of the housing for accepting a wine glass 34 and for dispensing wine into the wine glass 34. The recess 32 is positioned directly under the head 30. The recess 32 may be sized to accept at least a wine glass 34, such as a 9.8 inch tall wine glass. The recess 32 in the housing may also accept shorter glasses. The recess 32 is partially surrounded by the housing but is open at the front thereof for accepting a wine glass 34 into the space of the recess 32.

The device 10 includes a pouch loading slot or opening 36 positioned on the head 30. The slot is positioned on an upper surface at the top end 18 of the housing. The slot is sized for accepting a pouch 12 of wine. The device 10 has a user interface 38 positioned at the front of the head 30 at the top end 18 of the device 10. The user interface 38 may comprise a one-touch button, but could be multiple buttons or other interfaces, such as a touch screen.

The user interface 38 can include LED light indicators where lighting indicates different steps in the process. The user interface 38 may include a ring of LED lights that surround the user interface 38. The LED lights may move around the user interface 38 so that different areas of the button may light up. The button itself may light up with one or more colors. The device 10 may also include lighting that is used to showcase the wine glass 34, such as lights that shine upwardly on the glass or downwardly on the glass. Lighting could also be used to light the water reservoir 40 or to indicate that the reservoir 40 is empty or near empty.

Legs 42 of the housing extend forward from the left and right sides 26, 28 of the housing and surround at least in part the recess 32 where the wine glass 34 is received. The legs 42 help to support the device 10 and are positioned substantially at the lower end of the device 10. The head 30 of the housing includes a discharge nozzle 44 that is positioned on a lower side of the head 30 at the upper end of the recess 32 of the housing. The discharge nozzle 44 permits wine to exit the device 10. The discharge nozzle 44 has a funnel-like shape that imparts some turbulence to the wine and can provide some decanting. The rear surface of the device 10 may include a discard bin that is used to capture emptied pouches.

Figure 9:
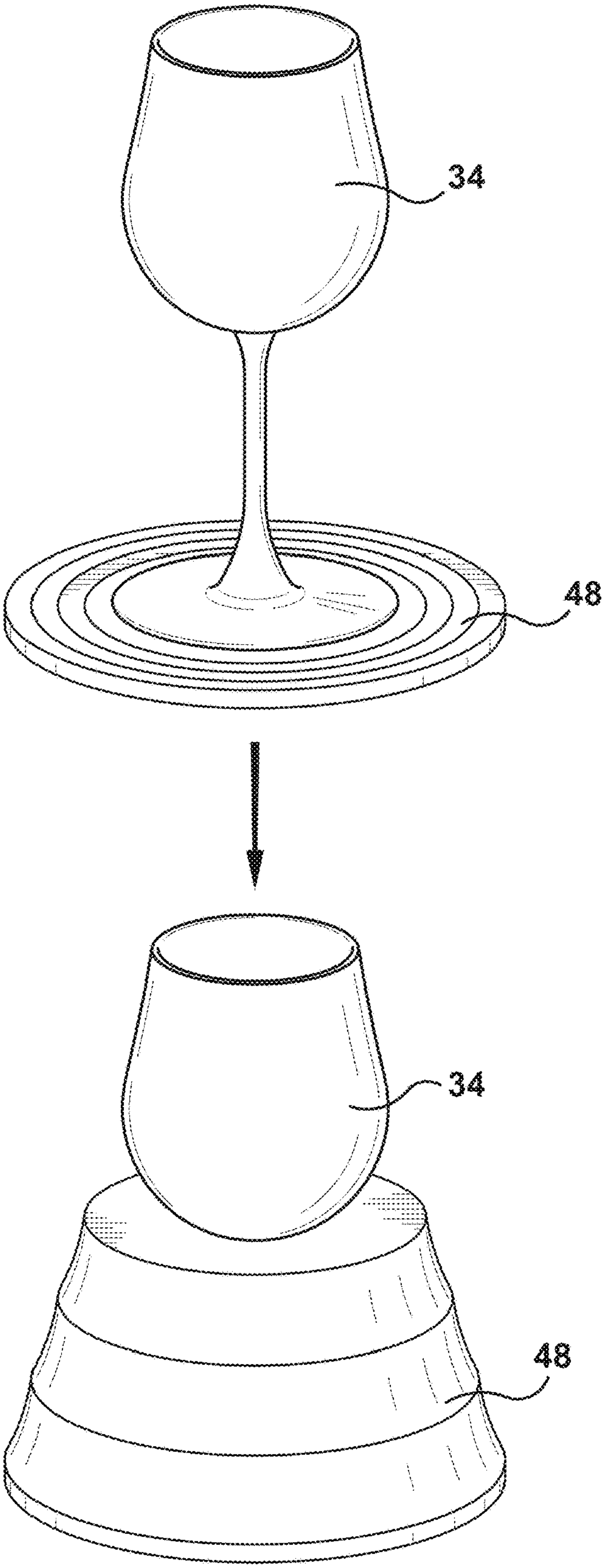
FIG. 9 illustrates a device for adjusting the tray height of the device, where an adjustable, expandable base member is utilized to provide different heights according to an embodiment of the present invention.

The device 10 of FIG. 1 includes a separate base member 48 that is positioned under the nozzle 44 for catching any spilled wine. The base member 48 can also be raised by expanding upwardly to provide a bench for seating a wine glass 34 at a position above the bottom 20. It is advantageous to have the opening of the wine glass 34 positioned near the dispensing nozzle 44 to avoid splashing. An extended version of the base member 48 is shown in FIG. 9, which shows a first height, which is the lowest height, and a second height, which is higher than the lowest height. The base member 48 is cup-shaped and expands upwardly to provide different heights. The base member 48 shown has three separate heights, but could have fewer or lesser heights, if desired. The base member 48 may be designed in any known manner as long as it provides different heights. If desired, while not shown, different base members 48 could be provided, with each having its own height, such that the base members 48 are not expandable.

FIGS. 2-5 depict another wine dispensing device 10 that is similar to the device 10 shown in FIG. 1. This device 10 also has a top end 18, a bottom end 20, a front 22 and a rear 24, and a left 26 and a right side 28. The head 30 is provided at the top end 18 and is rounded. A slot for receiving a wine pouch is disposed towards the rear 24 of the head 30. The slot can be a door that translates forwardly and rearwardly by the operation of a motor, such as a servo. Alternatively, the door may be manually operated by a user. A discard bin area may be positioned on the rear 24 of the device 10. The device 10 may have a height of about 16.75 inches, a width of about 9 inches, and a depth of about 13.7 inches, making it sized to be easily received on a kitchen counter and stored under the upper kitchen cabinets. The device 10 has a recess 32 in the front for receiving a wine glass, and a nozzle 44 positioned under the head 30 for dispensing liquid from the device 10.

Figure 6:
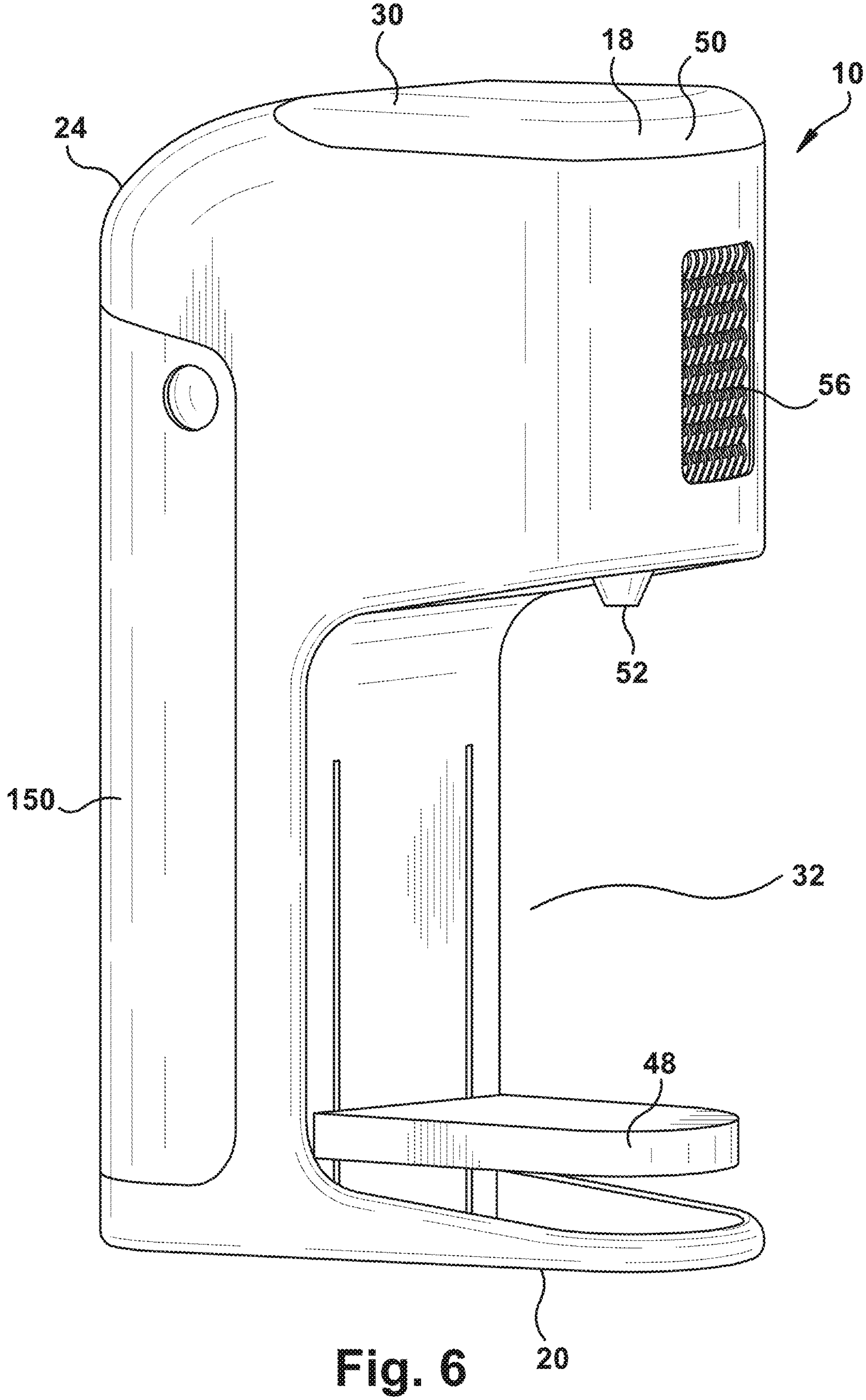
FIG. 6 illustrates a perspective view of a wine dispensing device according to a third embodiment of the present invention, showing an adjustable height tray.

FIG. 6 depicts an alternative embodiment of the wine dispensing device 10 that has a shape different from the devices 10 shown in FIGS. 1-5. In this embodiment, the device 10 has a housing with a top end 18, a bottom end 20, and a rear 24. A recess 32 for receiving wine glasses and for dispensing liquid is provided at the front of the device 10, below a head 30 of the device 10 which is positioned at the top end. The head 30 of the device 10 is substantially rectangular in shape and is positioned at the top end 18 and a discharge opening 52 is provided at the lower end of the head 30 for dispensing a liquid. The opening is provided by a discharge nozzle 44 positioned on the lower surface of the head 30. The discharge nozzle 44 faces downwardly.

The device 10 includes a discharge bin on the rear side 24 thereof. A cooling mechanism is shown positioned on the front of the device 10 on the head 30. The cooling mechanism is positioned behind a window 56 that permits the user to view the wine as it flows over the cooling mechanism. As discussed in greater detail below, the cooling mechanism may have protrusions, such as fins, fingers, or ribs, that the wine flows over while being cooled by a cooling mechanism. The protrusions help to cause turbulence in the wine, which results in aeration. In addition to aiding in cooling (or warming) the wine, the protrusions also make for interesting viewing by the user.

The device 10 also includes an adjustable base member 48 that is movable upwardly and downwardly. The base member 48 may be raised for shorter glasses and lowered for taller glasses. Any known type of mechanism can be used for raising and lowering the adjustable base member 48. The base member 48 shown includes a base plate, which is flat for positioning a glass on the plate. The base plate can include a drip tray, if desired. The base plate can be removable and replaceable at different heights using legs (not shown) that insert into recesses in the walls that surround the recess 32, or by sliding the base plate into recesses provided within the recess 32. The base plate can be snapped in at different heights. The base plate may rest on rails that permit it to be raised and lowered by pushing the base member 48 up and down. The base plate locks into position at any location where it is pushed to.

Figure 7:
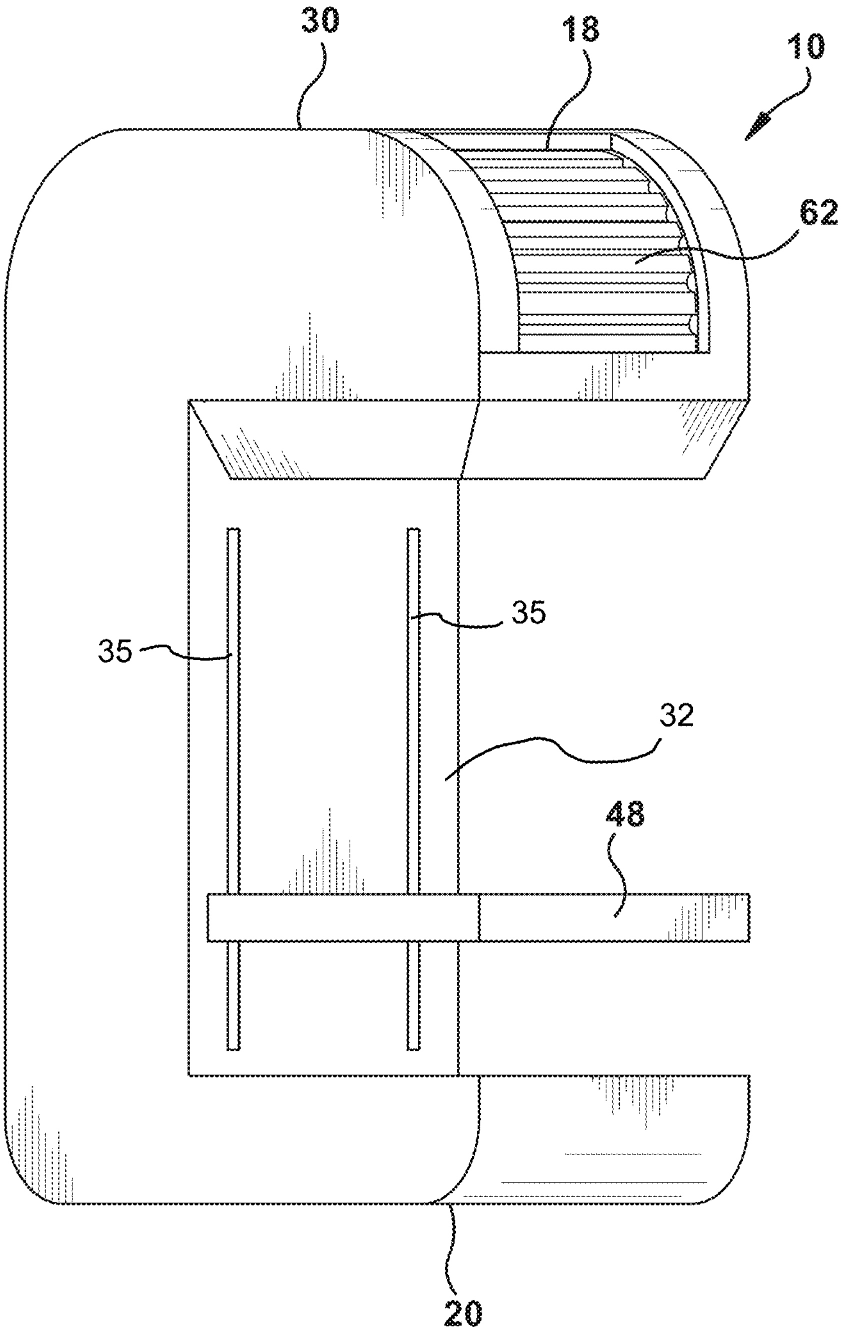
FIG. 7 illustrates a perspective view of the wine dispensing device having a rolling door according to the third embodiment of the present invention, with the adjustable height tray positioned a mid-level height.

FIG. 7 depicts an alternative embodiment of the wine dispensing device 10 that is similar to the device 10 shown in FIG. 6, but that includes a roll-top door 62 for inserting a wine pouch into a pouch receiving receptacle in the head portion 30 of the device 10. The device 10 also has an adjustable base 48 that rides in two slots 35 positioned in the rear of the recess 32. This adjustable base permits the user to use differently sized glasses for dispensing wine, as discussed above. The roll top door 62 may be manually operated or automatically operated with the use of a motor.

Figure 8:
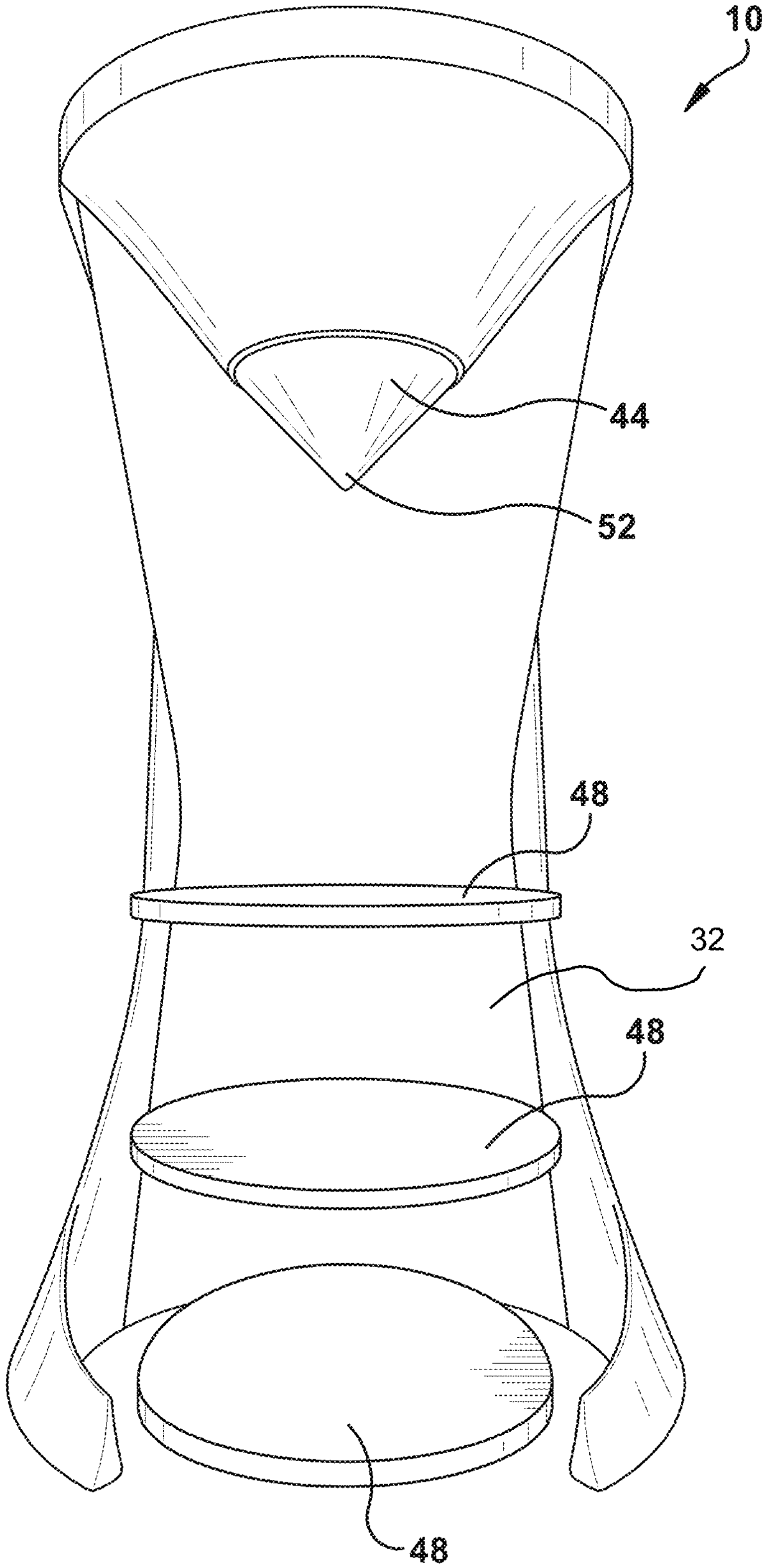
FIG. 8 illustrates the wine dispensing device according to the third embodiment of the present invention with an adjustable tray height, showing the different heights as they relate to differently sized wine glasses.

FIG. 8 depicts the wine dispensing device 10 showing different heights for the base member depending upon the type of glass used. The lowest height is used for a taller 10 inch glass, such as that used for a Bordeaux wine. This height is shown as being 10.9 inches to permit the glass to easily be inserted into and removed from the recess 32. A middle height for the base member is designed for a standard 7 inch glass and provides a 7.9 inch height to permit the glass to be easily inserted into and removed from the recess. An upper height for the base member is designed for a stemless glass, such as a 4 inch tall stemless wine glass. The recess 32 provided at this upper height is 4.9 inches tall, again providing room for a glass to be inserted and removed from the recess 32. As discussed above, less splashing of wine will occur when the glass is positioned directly below the discharge opening 52 of the discharge nozzle 44. This provides for a more consistent wine tasting experience.

Figure 10:
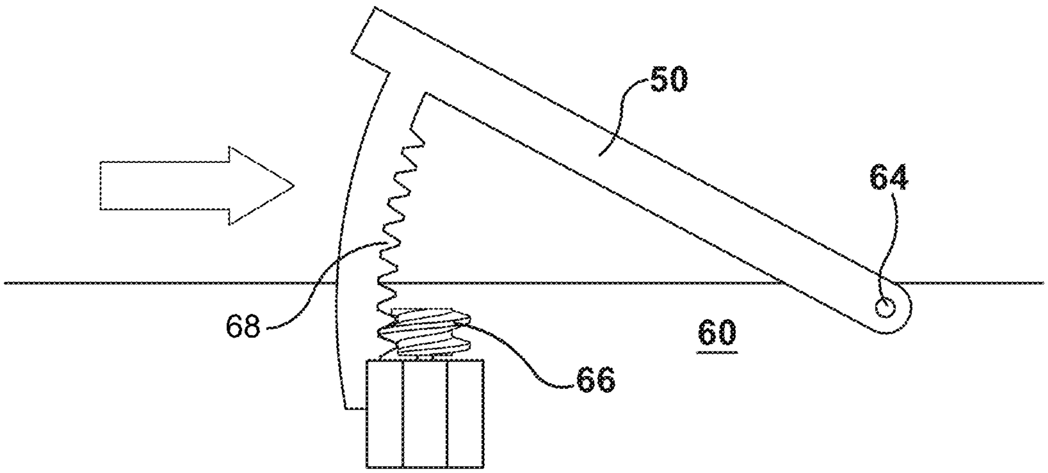
FIG. 10 illustrates a door for use with a wine dispensing device according to an embodiment of the present invention, with the door design using a worm gear.

FIG. 10 depicts a possible loading mechanism for loading a pouch into the head of a wine dispensing device. In this embodiment, a door 50 is provided on or near the top end of a wine dispensing device. The door 50 is rotatable about a rearward pivot point 64 and may be driven by a worm gear 66 that mates with a rack 68 that is positioned on the door 50. The rack is positioned on an outer edge of the door 50 and would be unnoticeable to the user. A motor would push the door 50 up and down as gears 66 push the teeth of the rack 68. This type of device can be used to automate the opening of the pouch door 50 by pressing a button or otherwise signaling to the worm gear 66 that it should start to turn to open the door 50. The pouch can then be inserted into the opening that is created in the housing. The door 50 can form part of the upper surface of a wine dispensing device and, when closed, can form a substantially smooth outer surface along with the remainder of the upper surface of the device. The door 50 may include a sensor (not shown) that senses when a pouch has been inserted and may close upon sensing a pouch. Alternatively, a user may push a button to close the door 50 or press the door 50 closed manually once the pouch is properly installed.

Figure 11:
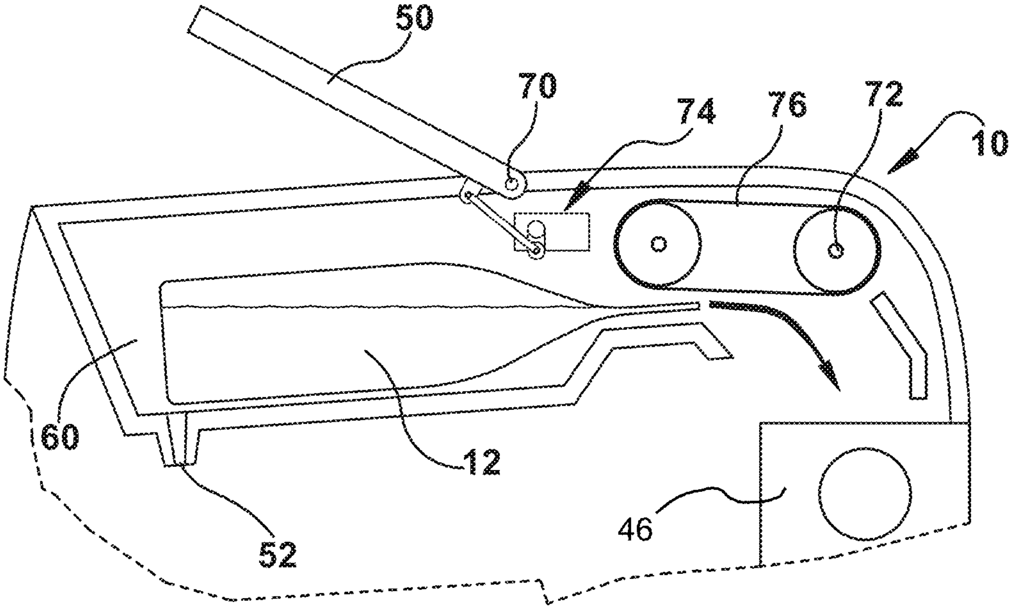
FIG. 11 illustrates an alternative door for use with the wine dispensing device according to an embodiment of the present invention.

FIG. 11 depicts a different pouch door 50 that is coupled via a hinge 70 to a top end of a housing of a wine dispensing device 10. In this embodiment, the door 50 is coupled to a drive member 72 and the drive member 72 is coupled to a servo motor 74. As the servo rotates, the door 50 opens or closes. The door opening assembly 72, 74 of this embodiment is advantageous because it can be positioned on an outer edge of the interior of the head of the wine dispensing device 10 and does not interfere with other mechanisms inside the head portion. The servo 74 can be operated by pressing a button or other means, including remote means. This embodiment provides a tray 60 into which the pouch 12 seats. The tray includes a discharge opening 52 and the pouch 12 is opened while it is seated in the tray. The pouch 12 may be opened by any known opening technique, such as by slicing, cutting, piercing, squeezing, or the like by a cutting mechanism.

The wine dispensing device 10 may be programmed to deactivate the cutting mechanism such that the blade cannot activate when door is open, even in case of firmware failure. Additionally, the wine dispensing device 10 may include hardware that prevents the door from opening when the blade is extended or engaged. For example, the hardware may comprise a limit switch. A limit switch may be configured at extended and home/retracted positions for moving parts, including the door and piercing motor. When the piercing motor is in the home position, the door motor may have power to it and thus can be activated at any time. When the home position piercing motor limit switched is not depressed, the door motor may be unpowered and so even if firmware were to try and activate the door motor, it would fail to do so.

According to one embodiment, the wine dispensing device 10 may further comprise a compressing mechanism for squeezing the pouch 12 to extract the entirety of its content. Wine then exits the tray into a cooling mechanism, not shown. Once the wine is dispensed, a conveyor type device 76 that utilizes two rollers moves the pouch 12 rearwardly inside the housing, where it is dropped into a discharge bin 46.

Figure 12:
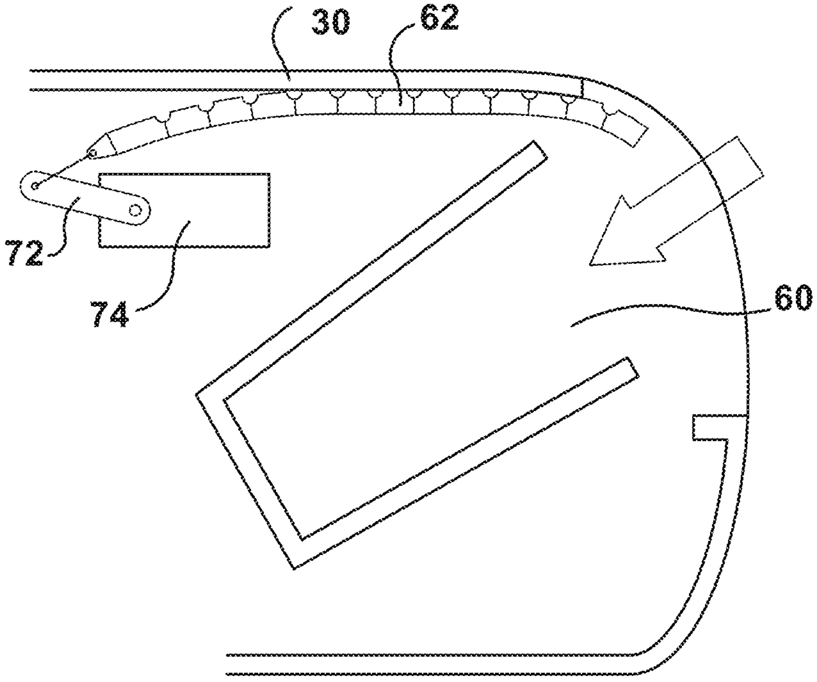
FIGS. 12 and 13 illustrate yet another alternative door according to an embodiment of the present invention with a roll-top door.
Figure 13:
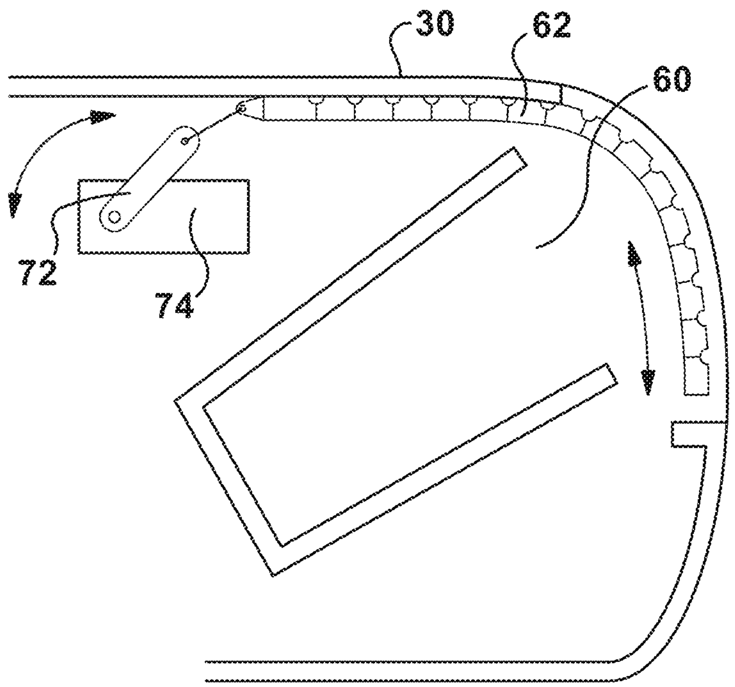

FIGS. 12 and 13 depict an alternative door mechanism in the form of a roll-top door 62. The door 62 is shown positioned on a front surface of the head 30. This type of door 62 may also be utilized on a top, side, or rear surface of a wine dispensing device. The roll-top door 62 could also be used for a discharge bin, if desired. In this embodiment, the user can push the roll-top portion upwardly so that it moves or translates into the interior of the head portion 30 of the device. As shown the roll-top portion remains along the top of the interior of the head portion 30. Guides may be used for holding the roll-top in position. As the roll-top door 62 travels rearwardly, it may engage a switch, that flips when the roll-top engages the switch. This switch may be used for governing other operations of the device. Alternatively, the roll-top door 62 can be remotely opened with a motor, such as a servo 74 that is connected to the roll-top door 62 via a drive member 72, that can open and close the roll-top door 62 with the press of a button or other instructions.

The roll-top door 62 remains on the outer edge of the interior of the head portion 30 so that it does not interfere with other parts within the interior of the head portion 30. Once the roll-top door 62 is pushed upwardly, a pouch can be inserted into the opening 36 that is created. A receptacle 60 for receiving the pouch 12 may be positioned in the opening, as shown in the figures. Other types of receptacles may be utilized, if desired. The pouch can be cut using a cutting mechanism or other opening mechanism, permitted to drain, and then disposed of by either manually removing the pouch through the roll-top door 62, or by an automated process for discarding the pouch into a discard bin positioned near the rear of the device. For example, the pouch retaining receptacle 60 shown may pivot downwardly to drop the pouch into a discard bin.

Figure 14:
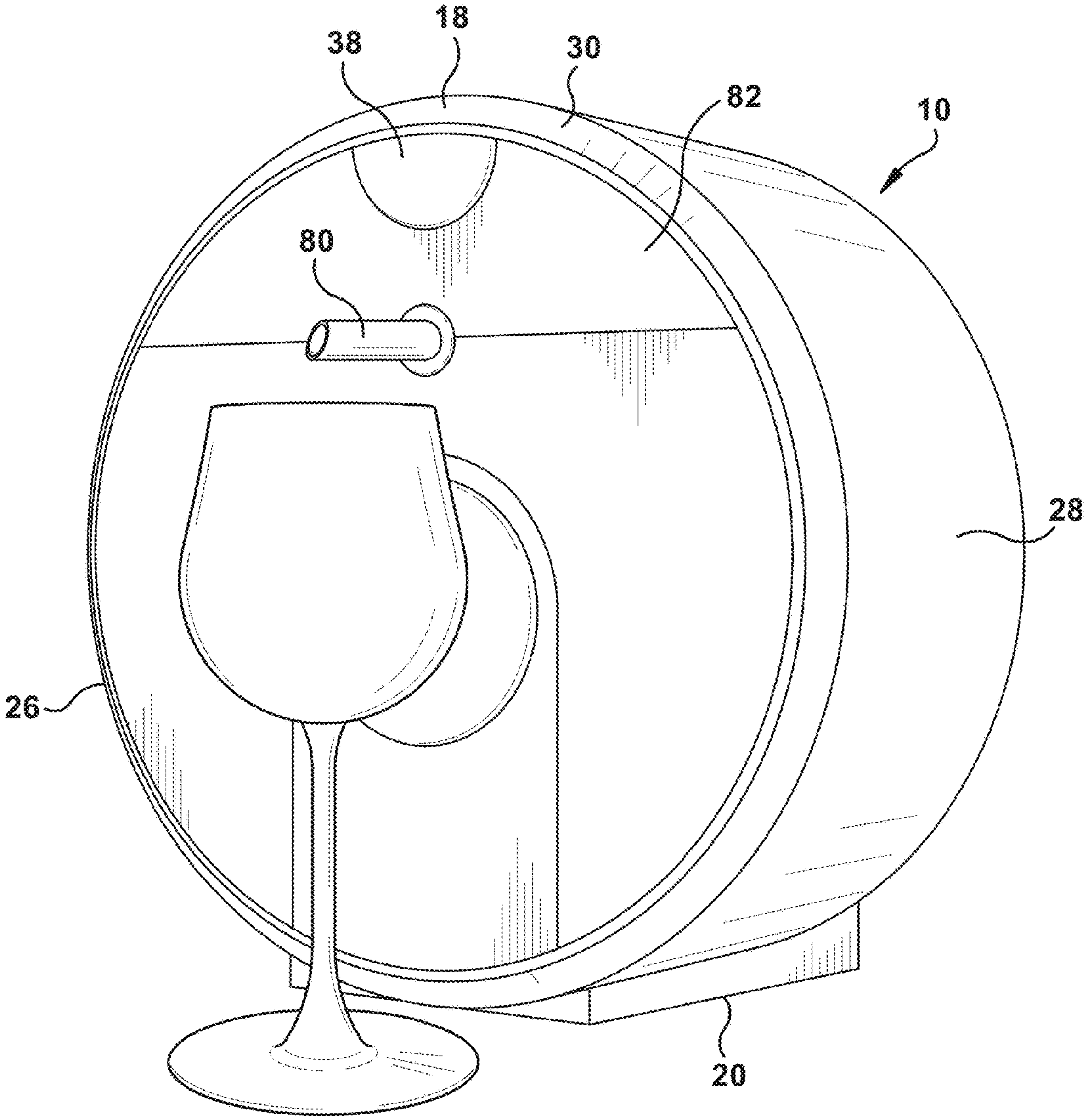
FIG. 14 illustrates a perspective view a wine dispensing device according to a fourth embodiment of the present invention.

FIG. 14 depicts an alternative embodiment of the wine dispensing device 10, where the wine dispensing device 10 has a circular housing and a spout 80 that extends outwardly from a front side of the housing to dispense wine into a glass. This device 10 somewhat resembles a keg with a spout 80. In this embodiment, instead of a central recess in the front of the housing, a wine glass may be placed adjacent, but not inside the housing. This device 10 includes one touch operation via a button positioned at the top of the front side. This device 10 can provide aeration that is visible in the top part 82 of the housing, which can be transparent to show the wine inside the housing. A heatsink or other cooling devices may also be positioned in the upper part of the housing. The device 10 may also include a wine level indicator and an aerating component (not shown). A button 38 is shown positioned at the top front of the device 10. The button 38 shown is semi-circular in shape and can be lighted, if desired. Other types of interfaces could be used, as discussed above. The button 38 can have a different shape and multiple buttons may be utilized, if desired.

Figure 15:
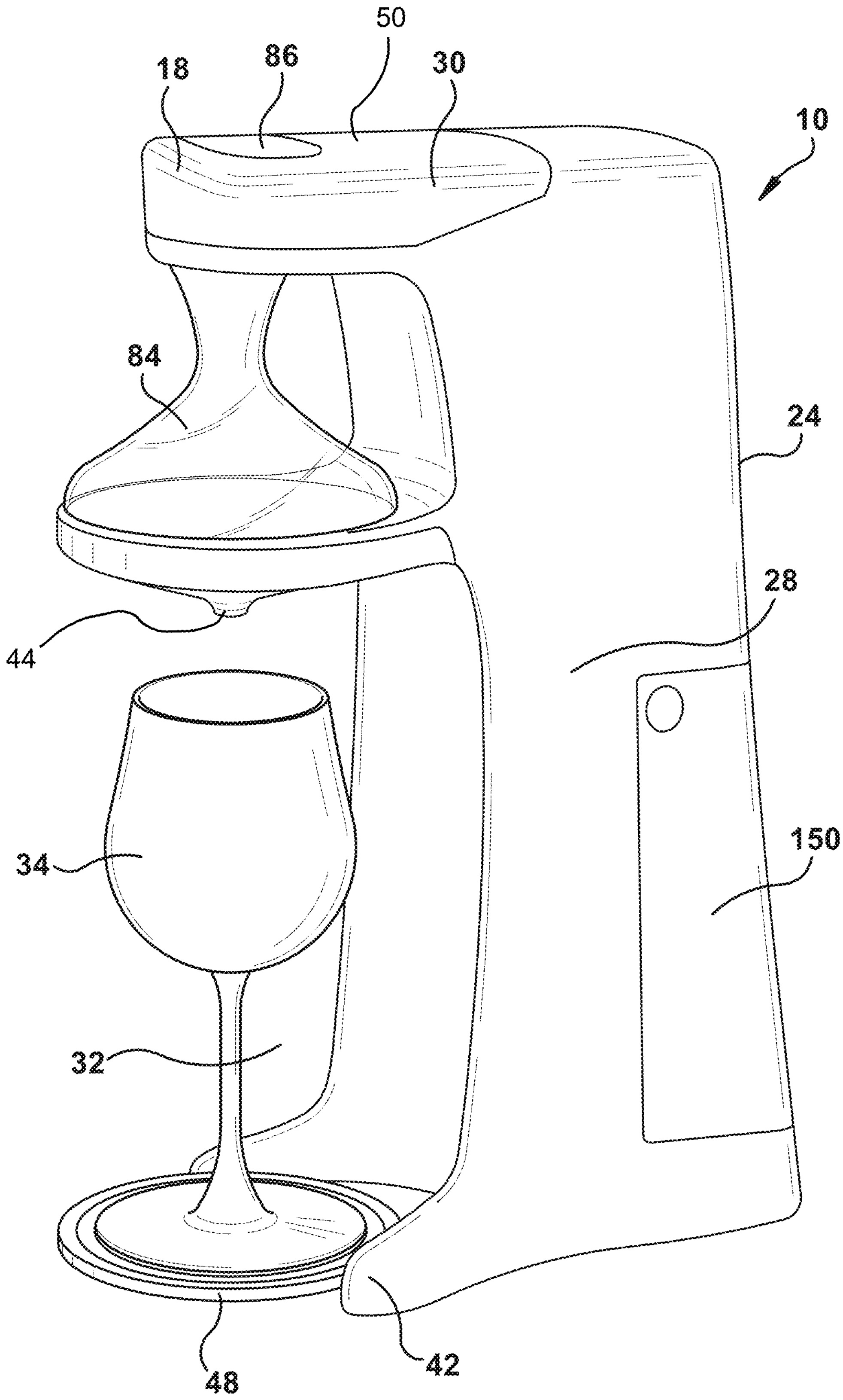
FIG. 15 illustrates a perspective view a wine dispensing device according to a fifth embodiment of the present invention.

FIG. 15 depicts another alternative embodiment of a wine dispensing device 10 according to the invention. In this embodiment, the device 10 includes a built-in decanter 84 that the wine can flow into before being dispensed through the discharge nozzle 44 of the device 10 into an underlying glass 34. This device 10 has a capacitive touch area 86 on the upper surface of the housing for operating the device 10. A discard bin may be positioned at the rear 24 of the housing and the housing may include a hidden internal reservoir for storing water for cleaning the decanter 84 and the interior of the device 10. This embodiment also includes an adjustable base member 48, which can be made of aluminum or other materials, if desired. A door 50 for inserting a pouch is shown on top of the device 10 and the door 50 can pivot upwardly about a pivot point 64 to reveal a space for inserting a pouch 12 into the device 10. The waste bin 46 may be positioned on a rear surface 24 of the device 10 and may include a door 150 that can be opened by the user to gain access to the discarded pouches 12. The visible decanter 84 feature could be incorporated into other designs disclosed herein.

Figure 16:
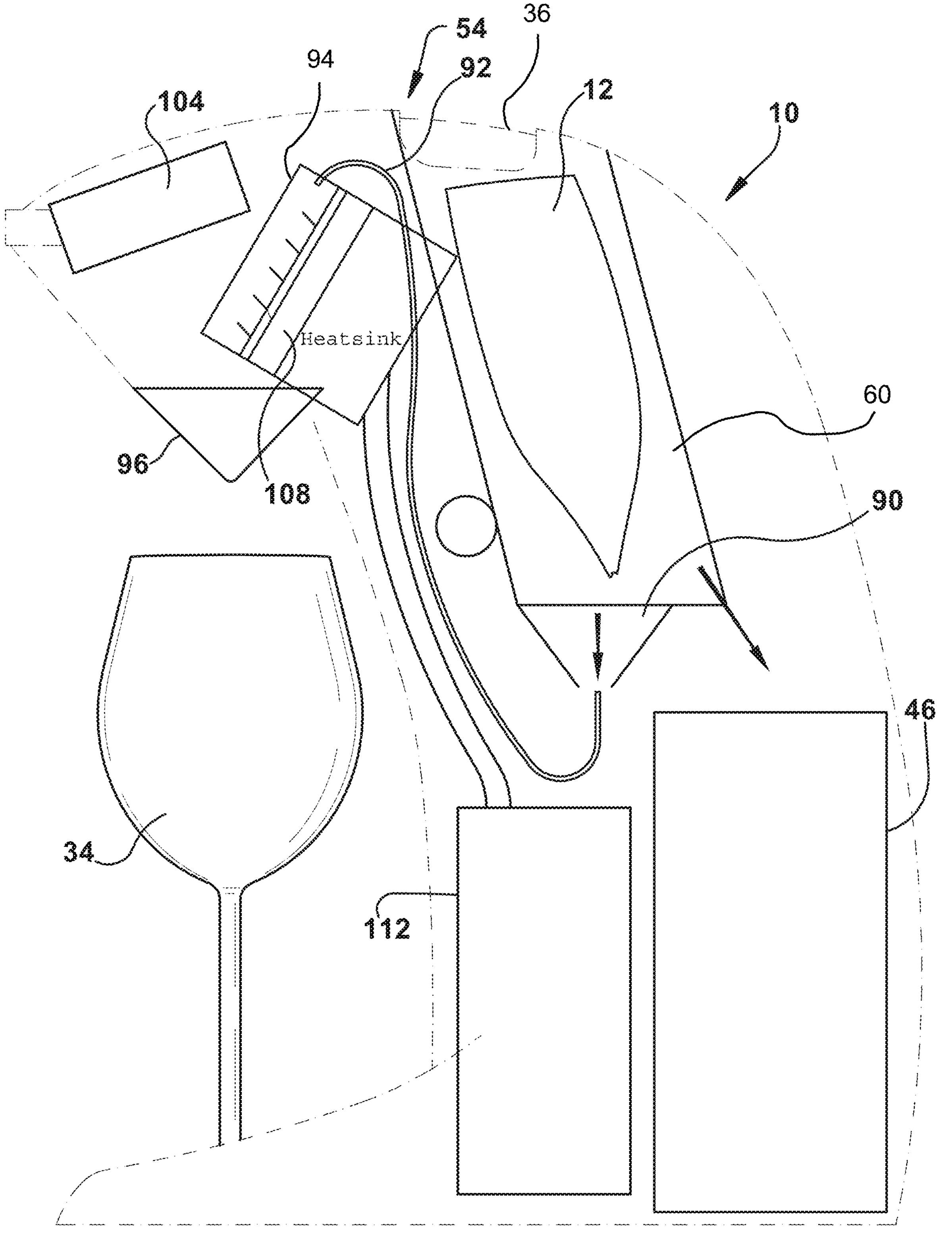
FIG. 16 illustrates a side schematic view of the wind dispensing device depicting the internal workings according to the second embodiment of the present invention.
Figure 17:
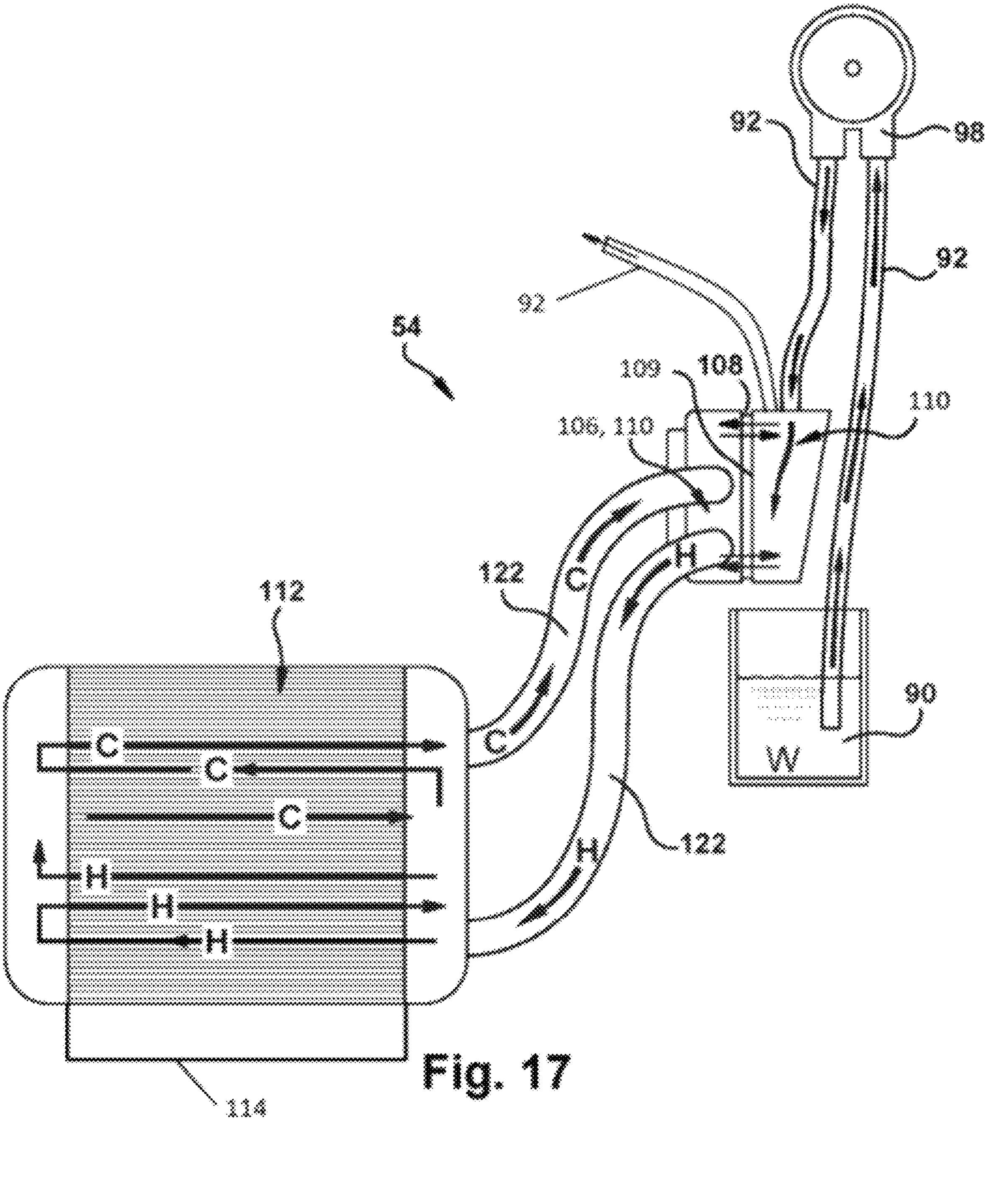
FIG. 17 illustrates a schematic of a cooling system according to an embodiment of the present invention.

FIG. 16 is a schematic of the internal parts of the wine dispensing device 10. The schematic is not to scale, but a general location for various parts is shown. The actual location for the various parts may be different from that shown. FIG. 17 depicts a schematic of parts of a cooling system of a wine dispensing device. FIGS. 16 and 17 can be used together to get a better understanding of the internal workings of a wine dispensing device.

Referring to FIG. 16, the machine includes a pouch receptacle 60, a bin 46 for discarded a pouch 12, a funnel or reservoir 90 positioned below the pouch receptacle 60 for capturing wine that is released from the pouch 12, a tube 92 that extends from the bottom of the reservoir 90 to a cooling system 94, the cooling system 94, and a discharge receptacle 96. The pouch receptacle 60 in this embodiment communicates with an opening in the upper surface of the device 10, similar to that shown in FIG. 2-5. The pouch receptacle 60 is shown having an opening 36 that is closed by a door. Any type of door can be used, including those disclosed herein as well as other types of doors. Alternatively, the pouch opening 36 could always be open. The opening 36 is sized to accept a pouch 12 therein and to permit a user to insert a pouch 12 into the pouch receptacle 60.

A pouch 12 is positioned in the pouch receptacle 60 in a top-down position, e.g., where the thin part of the pouch 12 (or a spout portion of the pouch 12) is inserted first into the receptacle 60. When inserted into the receptacle 60, the pouch 12 is fully inserted into the receptacle 60 so that no part of the pouch 12 extends outside of the device 10. Alternatively, part of the pouch 12 could extend outside the receptacle 60, if desired. The pouch receptacle 60 may be associated with an opening mechanism that is used for opening the pouch 12 so that liquid may be dispensed therefrom. The opening mechanism may be a cutting mechanism that is used to cut the pouch 12 open so that liquid vacates the pouch 12. Other types of opening mechanisms, as discussed above, may also be used either singly or in combination. If a different type of container is used, such as those that are not entirely soft pouches, other opening mechanisms, as disclosed above, could be used. The term pouch 12 is used herein to refer to a soft pouch 12, but also can refer to a non-soft pouch, e.g., one having non-flexible parts, or a molded beverage container, such as those discussed above. The term pouch 12 is meant as a universal term herein for describing a receptacle for holding a liquid.

As liquid leaves the pouch 12, it flows into a reservoir 90 that is positioned below the pouch receptacle 60. The reservoir 90 may vary in size to accommodate the contents of the pouch 12. For example, reservoir 90 may store a volume of between 6 to 16 fluid ounces. The reservoir shown in this embodiment is funnel shaped. The funnel 90 may be larger or smaller than that shown, and other shapes may be used, if desired. The liquid in the pouch 12 flows into the reservoir 90 via gravity. Once the cooling system 94 is ready, liquid from reservoir 90 is pumped via a pump into the cooling system 94 through a tube 92. The tube 92 may be coupled to the bottom of the reservoir 90. The liquid in the reservoir 90 may be pumped upwardly through the tube 92 to the cooling system 94. Then the liquid is circulated through the cooling system 94, as shown in FIG. 17.

Wine may be retained within a cooling reservoir until it is cooled to a desired temperature. After the liquid is cooled, a valve is utilized to direct fluid to the discharge receptacle/nozzle 44. Alternatively, the liquid may be passed through the cooling system 94 in a continuous manner. Varying the speed of the liquid being pumped through the cooling system 94 may aid in the desired heat removal/cooling of the liquid.

The discharge receptacle 96 may have aerating features, such as an umbrella aerator, a screen, or a different type of aerator. A screen may be used to prevent the ingress of any insects into the liquid path of the device 10. The discharge nozzle 44 may include special patterns, such as swirl patterns or other patterns that aid in aeration. The discharge nozzle 44 can have one or multiple holes for dispensing, which may also aid in aeration.

The housing of the device 10 may include two legs that extend forwardly from the sides of the housing. In addition, the housing includes a central recess into which a wine glass 34 may be inserted so that the glass 34 is positioned under the discharge nozzle 44.

Electronics 104 are shown as being stored inside a front end of the head portion 30 and are coupled to an activation button as well as other electrical parts of the device 10. While not shown, other electronics may be positioned at other locations within the housing. The device 10 also includes an electrical connector for coupling with a power cord and plug (not shown).

As shown, the opening 36 for inserting a pouch 12 into the device 10 is positioned near the rear side on the upper end of the device 10. The pouch opening 36 in the device 10 may be manually operated, requiring a user to open it, or may be opened electronically by the system based upon an activation signal by a user. The pouch opening 36 could also be a permanent opening in a surface of the device 10. The pouch receiving receptacle 60 is sized for holding the pouch 12 in position in the opening 36. The pouch 12 may be held in place to be properly cut/sliced by a cutting/slicing mechanism. A cutting mechanism may be used to cut open the pouch 12 so that wine drains from the pouch 12 into the underlying reservoir or funnel 90. The reservoir or funnel 90 may include an air gap which may serve as a method of decanting by introducing air to the wine drained from the pouch 12.

The cutting mechanism may also slice and/or puncture the pouch 12 at more than one location to aid in wine escaping from the pouch 12. The cutting mechanism may comprise a blade coupled to a blade holder that can be used to open the pouch 12 even further. The cutting mechanism can cut the pouch 12 with a single swing of a blade, or with motorized action of a cutting blade that moves inwardly and outwardly repeatedly, as will be discussed in further detail below, to help to further agitate the wine in the pouch 12 so that the pouch 12 empties more quickly. A knife that moves in and out repeatedly can be operated by a motor, such as a servo. The pouch 12 may be opened by other means, as known by those of skill in the art. Techniques for slicing open a pouch 12 is shown in U.S. Pat. No. 9,695,030 to Walker and U.S. Pat. No. 9,932,218 to Melville et al., the disclosures of which are incorporated herein by reference in their entirety.

As a cutting blade enters the pouch 12, it inherently creates some decanting because it results in air being introduced to the contents of the pouch 12. The funnel 90 that is positioned below the pouch 12 that captures the wine before it is pumped to the cooling system 94 may also serve as a decanting function because the wine will remain in the funnel 90 for at least a short period of time before it is pumped upwardly.

Alternatively, the opening mechanism for opening the pouch 12 may be a piercing element. The piercing element may have one or more sharp elements for piercing the pouch 12 at one or more locations. For example, the piercing element can pierce at both a top and bottom end of the pouch 12 or may pierce in multiple locations at one end of the pouch 12, as long as air is permitted to enter the pouch 12 during piercing to allow the beverage to flow from the pouch 12. The piercing element may be coupled to a motor to repeatedly pierce the pouch 12, which may also cause additional aeration of the beverage. A backing plate may be positioned opposite the piercing element to provide a firm surface against which the piercing element may engage.

To save head space within the device 10, the pouch 12 is shown as being emptied into a lower part of the unit and then pumped up to the cooling system 94. A peristaltic pump may be used that pushes the wine without touching it. The pump may pump wine from the funnel 90 through a tube 92 upwardly to the cooling section of the device 10, which is positioned near the top of the head portion of the housing. The tubing may be any type of food-grade tubing. Additionally, the pump and any wine contact surfaces may be any type of food grade as specified by industry/regulation standards.

Cooling System:

The cooling system of the wine dispensing machine chills wine to a desired temperature. A wine dispensing device may include a switch or knob (not shown) positioned on the housing that sets the desired temperature. Recommended serving temperature ranges for wine range from 43° F. to 55° F. (6° C. to 13° C.), as follows:

White wines 43-48° F. (6-9° C.);

Red wines 51-55° F. (10-13° C.).

The temperature setting may be completely variable or could be set to two or three different preferred temperatures, such as 45° F. (7° C.), 50° F. (10° C.), 55° F. (13° C.) to cover a range of types of wine, or 45° F. (7° C.) and 53° F. (12° C.), to cover most of the above ranges.

Elements of a cooling system are shown in FIG. 17. The cooling system comprises a cooling mechanism 54 including a Peltier cooler 108, thermal interface material 109, a heatsink 110, a radiator 112, a pump 106, a fan 114, and tubing 92. A Peltier cooler 108 may comprise a thermoelectric cooling device that uses the Peltier effect to create a heat flux between the junction of two different types of materials. The Peltier cooler 108 may include a solid-state heat pump that transfers heat from one side of the device to the other side, with the consumption of electrical energy. The Peltier cooler 108 may be prohibited from access by the user. In the event of malfunction, the Peltier cooler 108 may not ignite a fire or endanger the user.

Figure 26:
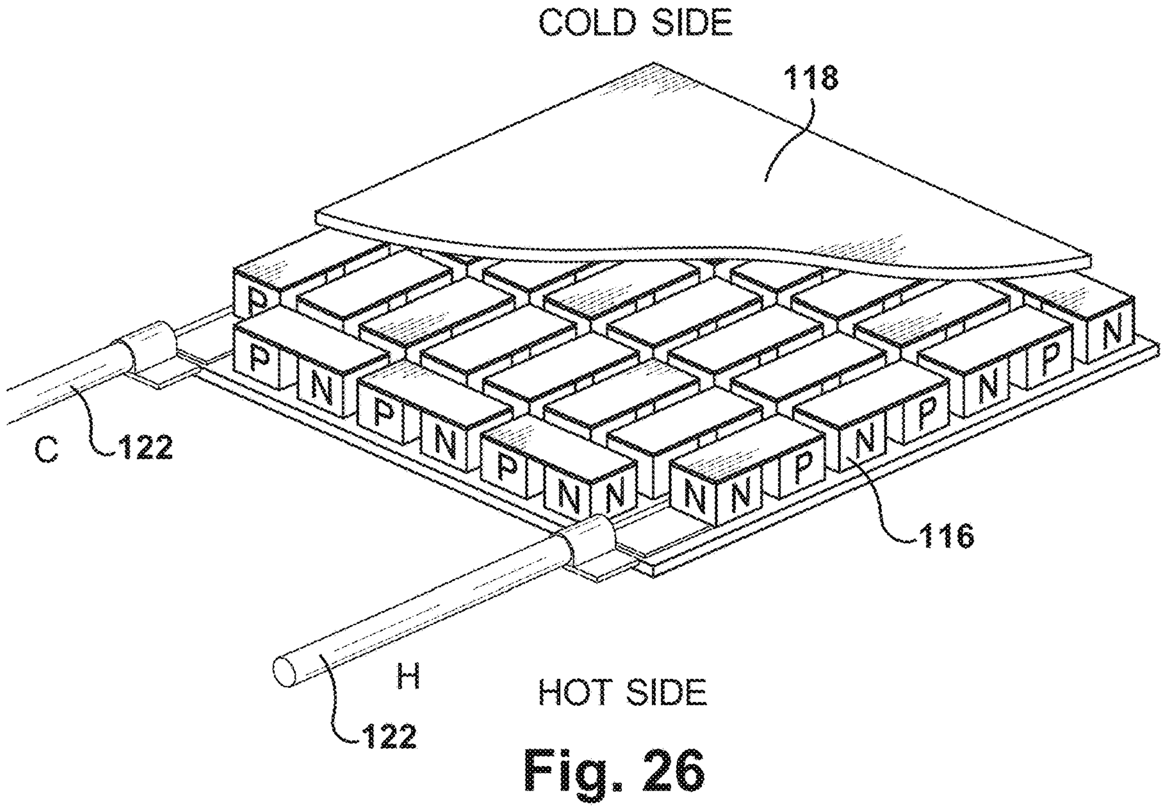
FIG. 26 illustrates a perspective schematic view of a heat sink utilizing a Peltier cooling device according to an embodiment of the present invention.

The Peltier cooler 108 may have two sides. When a direct current ("DC") or a pulse width modulated electric current flows through the Peltier cooler 108, it brings heat from one side to the other, such that one side gets cooler while the other side gets hotter. The "hot" side is attached to a heat sink 110 so that it remains at or near ambient temperature. The cold side is below room temperature. Multiple coolers can be cascaded together if greater cooling is necessary. A Peltier cooler 108 is shown in FIG. 26.

Peltier coolers are also commonly referred to as Peltier device 108, Peltier heat pump, solid state refrigerator, or thermoelectric cooler (TEC). Peltier coolers can be used for heating or cooling, although in practice their main application is for cooling. Primary advantages of Peltier coolers are that they lack moving parts or circulating liquid, have a very long life, are invulnerable to leaks, have a small size, and have a flexible shape.

For the present application, a Peltier cooler 108 ("Peltier" or "Peltiers") is a viable option for cooling the wine without requiring a user to add ice and water. Electricity is input to the Peltier cooler 108 and energy is transferred from one side to the other creating a hot side 116 and a cold side 118. The cold side 118 is used to chill the wine and the hot side 116 is cooled by heat sink 110, fan 114 and radiator 112 so that the cold side 118 can continue to chill the wine.

The heat sink 110 includes three main parts: upper and lower thermally conductive plates and a non-conductive spacer. When all three parts are sandwiched together, the upper and lower plates form channels for the liquid or wine to flow through. All surfaces that interface with the liquid or wine are food safe or coated with a food-safe material. Heat transfer occurs as the liquid or wine flows through the channels, which results in the liquid or wine being chilled. Peltier cooler 108 is attached to the back side of each of the heat sink plates. The cold side 118 faces the heat sink plates to cool the plates. A thermal interface material may be positioned between the conductive plates and the Peltier cooler 108 that aids in heat transfer. On the hot side 116 of the Peltier cooler 108, more thermal interface material may be used when attaching the heat sink 110 and pump 106 of the liquid-cooled radiator assembly (or radiator assemblies) 112. The sandwiched heat sink 110 may be held together with brackets so that expansion and contraction due to rapid fluctuations in temperature within the system do not create air gaps between of the critical surfaces.

As discussed above, and as shown in FIG. 17, a wine reservoir 90, which may be the same reservoir that is shown positioned below the pouch receptacle 60, or a different reservoir, is coupled to the Peltier cooler 108 via tubing and a pump 106 or another pump. The wine travels through the Peltier cooler 108, returns to the wine reservoir 90, and then is pumped back to the Peltier cooler 108 via the peristaltic pump 106 until such time that the wine reaches the desired temperature, or the device has timed out. Once the desired temperature is reached or the device has timed out, a solenoid valve may open and direct the wine to a discharge nozzle to be served. A cooling block is coupled to the Peltier cooler 108 and includes a heat sink 110 and a pump 106. The heatsink 110 is positioned directly adjacent the hot side 116 of the Peltier cooler 108 and is coupled to a radiator 112 by tubing and fluid in the heat sink 110 is circulated through the heat sink 110 to the radiator 112 and back. The cooling block is used to carry heat away from the hot side 116 of the Peltier cooler 108. In an alternative embodiment, wine is not recirculated back through a reservoir and flows directly through the heatsink 110 to the dispensing nozzle.

Alternatively, the wine may travel through the Peltier cooler 108 at a speed conducive to attaining the desired temperature of the dispensed wine. In this scenario, the wine will continuously flow through the system at a constant or variable speed and be dispend directly from the machine into a glass without requiring recirculation through the wine reservoir 90 and Peltier cooler 108 multiple times.

Figure 24:
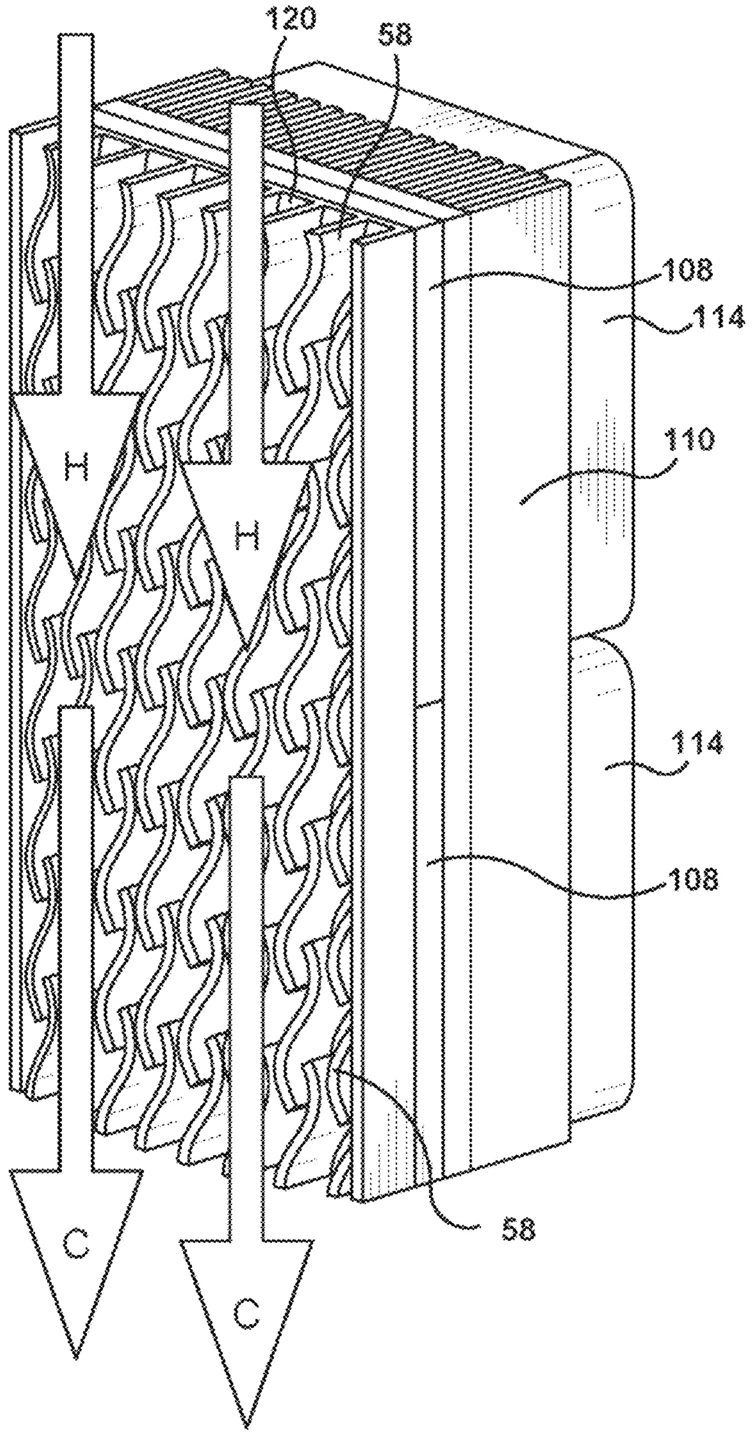
FIG. 24 illustrates an exemplary device for cooling and/or warming wine in a wine dispensing device according to an embodiment of the present invention.

A cooling block and Peltier cooler 108 are shown in FIG. 24. The cooling device shown includes two Peltier coolers 108 that have a dimension of about 40 mm×40 mm each. The cooling device has wavy-shaped fins or fingers 58 that extend outwardly from the Peltier coolers 108. Heat sink 110 may also have fingers that allow for proper heat transfer (cooling) and may also aerate naturally. The downside is that it may be necessary to rinse or clean the fingers. The warm sides of the Peltier coolers 108 are coupled to a heat sink 110, which is coupled to two fans 114. The Peltier cooler 108 creates a chamber through which the wine can flow, which is a large flat area, like a pan that is covered by a lid. The chamber that the wine flows through can be enclosed such that a cap is positioned over the pan surface of the Peltier cooler 108. While fingers are shown extending from the cooling surface of the Peltier cooler 108, a flat surface 120 could be used, or one where patterns or channels are engraved into the flat surface 120 could be used to increase the amount of surface area for contacting the wine.

The disclosed cooling system may work in a similar manner to an automotive cooling system by pumping a liquid, such as water, water mixed with a coolant, or a coolant, through passages in the heat sink 110 to a radiator and back. For example, mineral oil/glycerin could be used. The mineral oil helps to keep the internal parts lubricated, which is advantageous to the operation of the parts of the system.

Because of the close proximity between the heat sink 110 and the hot side of the Peltier cooler 108, the heatsink 110 picks up heat from the Peltier cooler 108. Liquids have a much higher coefficient of heat than air, so it is possible to remove more heat from the Peltier cooler 108 if liquids are used for cooling in the heat sink 110. The heatsink 110 has passages therethrough that permit the liquid to flow into one side of the heat sink 110, pick up heat from the Peltier cooler 108 while at the same time cooling the hot side of the cooler, and flow out of another opening in the heat sink 110. The heated fluid then travels via tubing to a radiator. As the fluid is pumped through the radiator fins, the surface area for cooling the fluid is maximized, which cools the liquid quickly. The radiator has thin tubes and the hot liquid is cooled by an air stream entering the radiator. A fan can be coupled to the radiator to push air through the radiator. Once the fluid is cooled, it returns to the heat sink 110 to absorb more heat. A pump may be utilized to keep fluid pumping through the cooling system. One type of pump that can be utilized is a diaphragm pump. Use of a radiator with a Peltier cooler 108 can permit for multiple glasses of wine to be chilled consecutively.

In a preferred embodiment, it is desired to lower the temperature of the wine by 20° F. (6.7° C.) in 1 minute. If the wine enters the system at 75° F. (24° C.), the wine can be chilled to 55° F. (13° C.) within 1 minute. Alternatively, in another preferred embodiment, it is desired to be able to lower the temperature of the wine by 20° F. (6.7° C.) in 2 minutes. In yet another embodiment, the cooling objectives are to chill 4-5 ounces of wine in 2-2½ minutes, with two output temperatures of 50° F. (10° C.) for white wine and 68° F. (20° C.) for red wine. Other size pouches 12 may be utilized, including 3 or 4 oz. pouches, or pouches in between 3 or 4 oz. pouches, 4 or 5 oz. pouches, 5 or 6 oz. pouches, or pouches in between these sizes.

In one embodiment, the Peltier cooler 108 has a flat upwardly facing surface 120 that forms a channel that the wine can travel over and through, such as that previously discussed in FIG. 24. The flat surface 120 includes projections 58, such as fingers, fins, or blades, that extend upwardly from the flat surface 120 of the Peltier cooler 108. The flat surface 120 of the Peltier cooler 108 imparts cooling to the wine. In addition, the projections, because coupled to the flat surface 120 of the Peltier cooler 108, also impart cooling to the wine. The projections on the Peltier cooler 108 also cause turbulence in the wine flow, which helps to aerate the wine while the wine is being cooled. Thus, the wine is chilled and aerated at the same time.

The Peltier cooler 108 may be angled at an angle between 0 and 90 degrees so that the wine flows across the Peltier cooler 108 from one end to the other. Possible angles include 10, 20, 30, 40, 45, 50, 60, 70, and 80 degrees. When the Peltier cooler 108 angle is lower, the wine takes longer to flow across the cooler and, as a result, is chilled more than a cooler angle that is greater. The Peltier cooler 108 is shown as having a length that is greater than a width, with the liquid flowing across the cooler lengthwise. Alternatively, the liquid could flow across the cooler widthwise. As shown, output of from the Peltier cooler 108 is at a highest point while input may be at the lowest, though this could be reversed.

It is preferred that the disclosed cooling system cools the wine to a desired temperature. However, there may be instances when the system is not able to fully cool the wine. For example, if the wine is particularly hot when inserted into the disclosed wine dispensing device, it may not be possible to lower the temperature enough in the preferred time. In these cases, the cooling system may cool the wine until a time limit is reached, at which point the wine will be released. There may be times when the wine is too cool when inserted into the system, such as being below 50° F. (10° C.) for white wine. In these instances, the system may hold the wine for a predetermined period before dispensing it through a dispensing nozzle.

Figure 25:
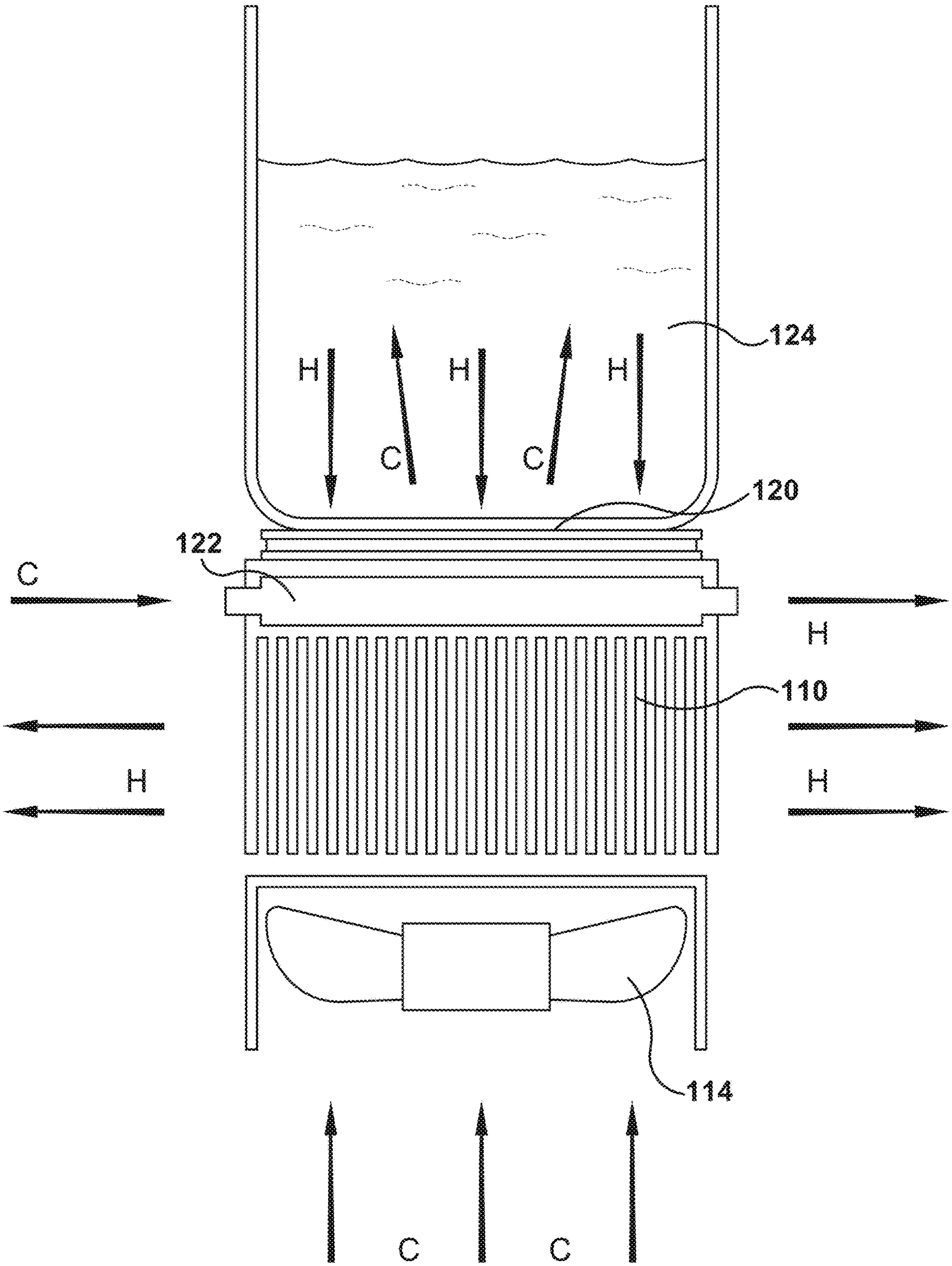
FIG. 25 illustrates another exemplary device for cooling and/or warming wine in a wine dispensing device according to an embodiment of the present invention.

FIG. 25 depicts another configuration for a cooling system according to an embodiment of the present invention. In this embodiment, the wine falls into a wine reservoir 124 where it is cooled within the wine reservoir 124 until it reaches a desired temperature, then it is pumped out of the wine reservoir 124 to a discharge nozzle. This embodiment may utilize a Peltier cooler. A flat upwardly facing surface 120 of the Peltier cooler is positioned directly adjacent the wine reservoir 124. A water block/heatsink 110 is positioned directly adjacent the flat upwardly facing surface 120 of the Peltier cooler. Water or fluid 122 flows continuously through the water block/heatsink 110 via a pump. The water block/heatsink 110 includes a plurality of fins that extend away from the Peltier cooler. The fins help to aid in dissipating heat from the flat upwardly facing surface 120 of the Peltier cooler 108. A fan 114 is coupled to the fins to continuously cool the fins with air. A temperature sensor may be associated with the wine in the wine reservoir 124 to measure the temperature of the wine to determine when it is ready to dispense.

Figure 27:
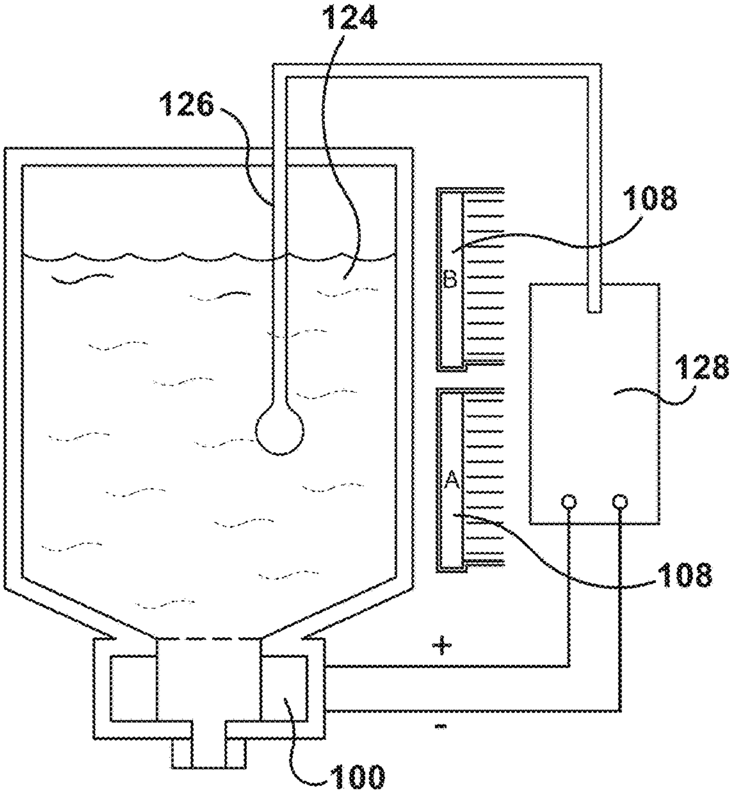
FIG. 27 illustrates yet another exemplary device for cooling and/or warming wine in a wine dispensing device according to an embodiment of the present invention.

FIG. 27 depicts another configuration for a cooling system. In this embodiment, wine moves into a wine reservoir 124. The wine reservoir 124 has a temperature sensor 126 positioned therein for measuring the temperature of the wine in the reservoir 124. The reservoir 124 is vertically oriented and includes a valve that is positioned at the bottom end of the reservoir 124. Two Peltier coolers 108 are positioned directly adjacent the wine reservoir 124 and are used to cool the wine in the wine reservoir 124. The temperature sensor 126 is coupled to a printed circuit board ("PCB") 128 and provides a signal to the valve to open when the temperature reaches a desired level.

Alternatively, in this embodiment, a pouch could be positioned directly into the reservoir 124 and could be cooled by the Peltier cooler 108. Then when a desired temperature is obtained, the pouch can be cut by a cutter and the wine can be permitted to flow through the open bottom end of the reservoir 124.

Figure 28:
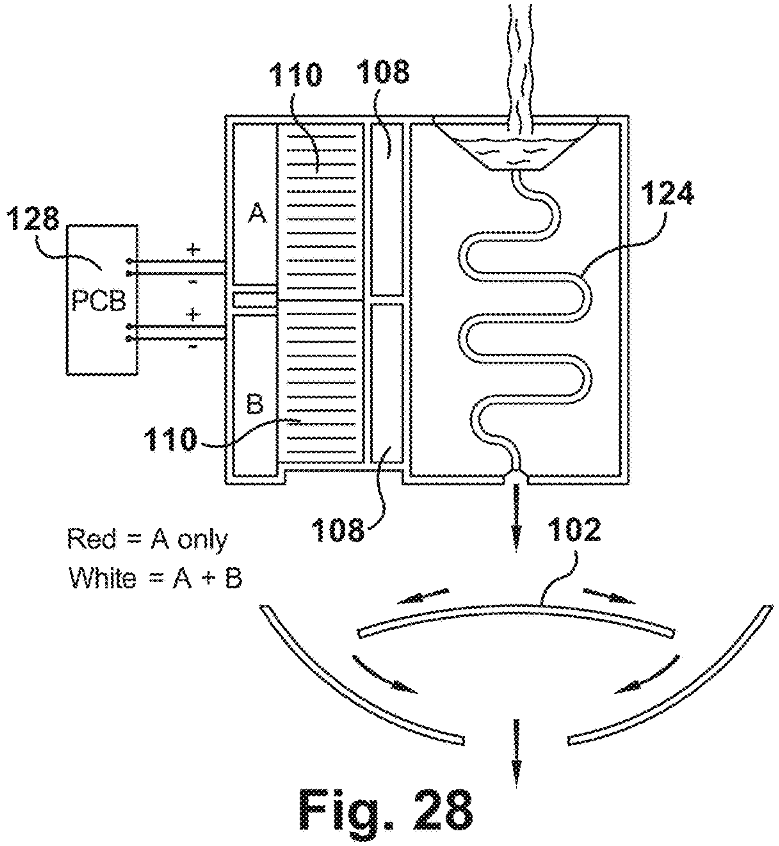
FIG. 28 illustrates yet another exemplary device for cooling and/or warming wine in a wine dispensing device along with an aeration device according to an embodiment of the present invention.

FIG. 28 depicts an alternative cooling system. In this embodiment, two Peltier coolers 108 are positioned directly adjacent a cooling block that has a receptacle for receiving wine and a circuitous pathway that extends through the cooling block. As wine travels through the pathway in the cooling block, it is cooled. A valve is not needed to retain the wine in the cooling block because the pathway of the block is designed to fully cool the wine before it exits the cooling block. This embodiment uses programming that determines if red or white wines are being dispensed. If red wine is being dispensed, cooler A is operational. If white wine is being dispensed, both coolers A and B are operational. The type of wine can be sensed by reading a bar code on the package. One type of bar code reading is disclosed in U.S. patent application Ser. No. 15/449,949 to Wu, the disclosure of which is incorporated herein by reference in its entirety. Other conventional bar code devices and reading techniques may also be used, as known by those of skill in the art. In this embodiment, after the wine exits the cooling block, the wine falls onto an umbrella aerator 102 to aerate the wine, which is then permitted to exit the device through a discharge nozzle.

Figure 29:
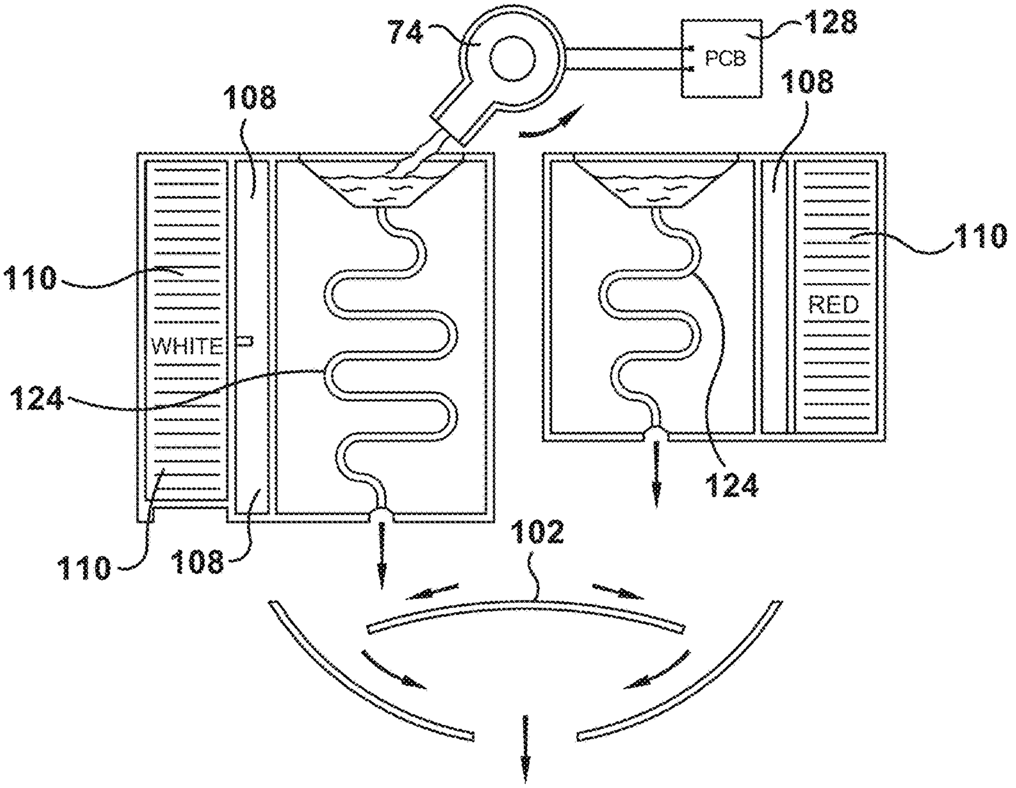
FIG. 29 illustrates yet another exemplary device for cooling and/or warming wine in a wine dispensing device along with an aeration device according to an embodiment of the present invention.

FIG. 29 depicts yet another alternative cooling system. This embodiment is similar to that shown in FIG. 28, except that different cooling blocks are used depending upon whether the wine is red or white. The illustrated embodiment may also include different tubing and pathways to prevent cross contamination of white and red wines. The red wine cooling block may be shorter and includes a shorter pathway for cooling. The white wine cooling block may be longer and includes a longer pathway for cooling. The device includes a servo that directs wine either to the red block or to the white block by rotating between the two blocks. A PCB 128 determines the location of the servo that dispenses wine into one of the cooling blocks. The PCB 128 may be coupled to a bar code reader (not shown) for determining which type of wine is being dispensed. Alternatively, a user may flip a switch or otherwise signal to the PCB 128 what type of wine is being dispensed. After wine exits the cooling blocks, it falls into a discharge reservoir that includes an umbrella aerator 102, which aerates the wine before it exits through a discharge nozzle.

Figure 30:
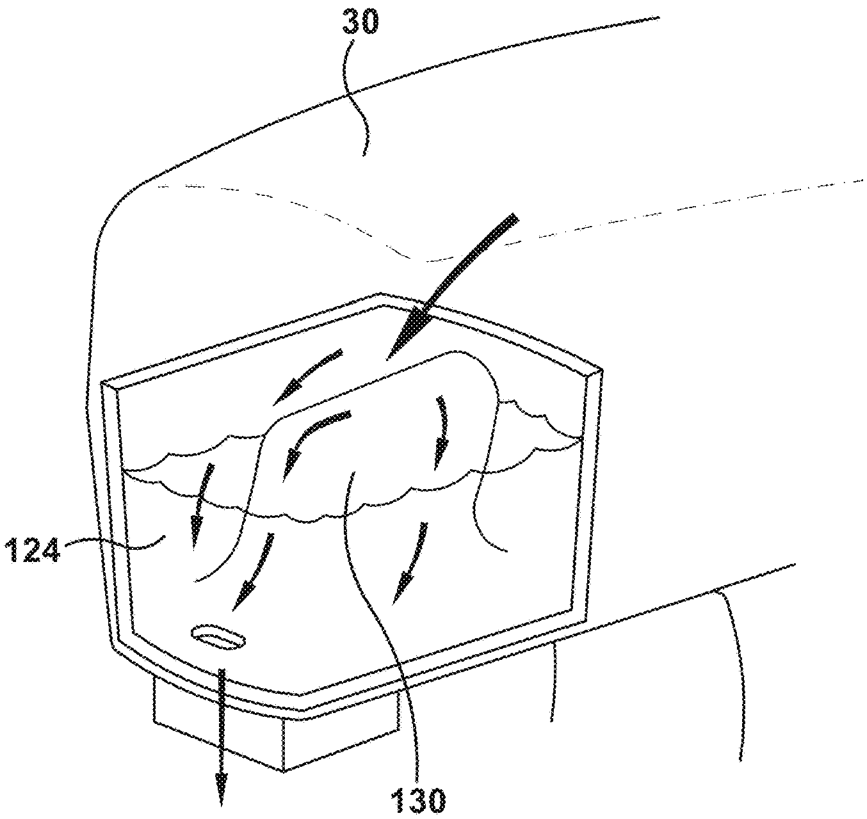
FIGS. 30 and 31 illustrates yet another exemplary device for cooling and/or warming wine in a wine dispensing device according to another embodiment of the present invention.
Figure 31:
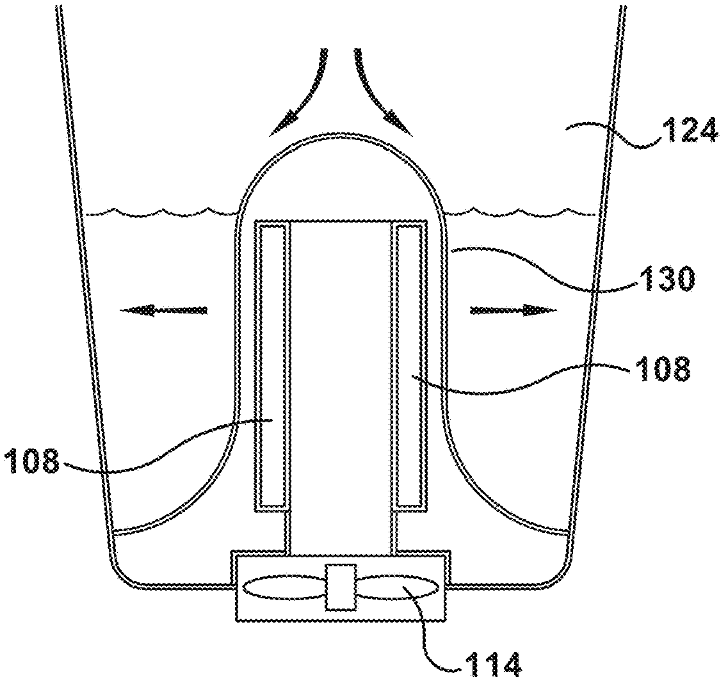

FIGS. 30 and 31 depict an alternative cooling system. In this system, wine spills into a discharge reservoir that also serves as a cooling reservoir. A projection or cooling column 130 is positioned in the center of the cooling reservoir and one or more Peltier coolers 108 are positioned in the projection for cooling the wine in the reservoir. Wine flows onto the cooled projection and spills down over the projection into the reservoir 124. A discharge opening of the reservoir 124 can be closed by a valve such that a temperature of the wine is measured with a sensor before the wine is discharged from a discharge receptacle. FIG. 31 depicts the orientation of two Peltier coolers 108 that are positioned so that the cold sides of the coolers are positioned outwardly, and the warm sides are positioned inwardly and face one another. A fan 114 is used to help cool the hot sides of the Peltier coolers 108.

Figure 32:
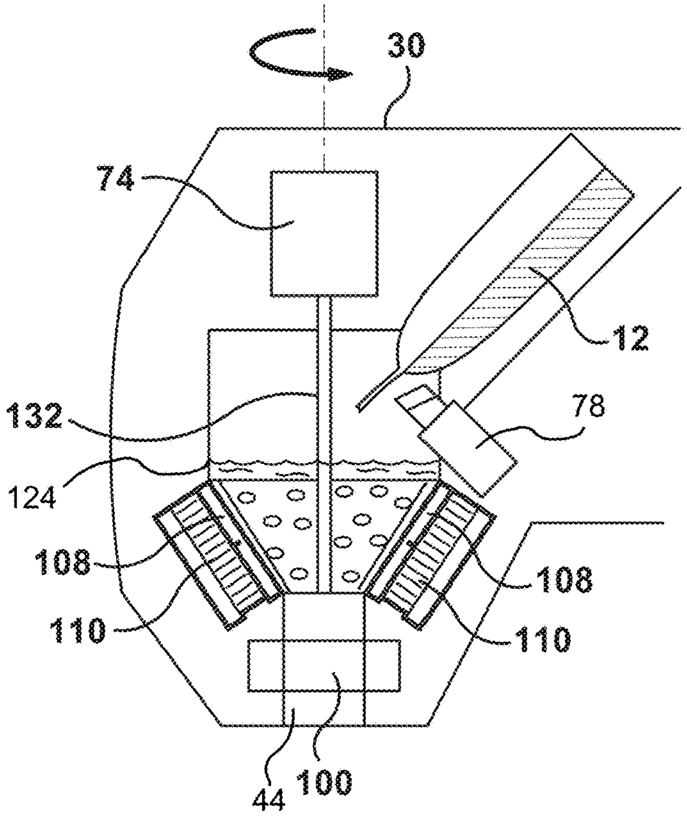
FIG. 32 illustrates an exemplary device for cooling and/or warming wine in a wine dispensing device according to an alternative embodiment of the present invention.

FIG. 32 depicts another alternative cooling system that utilizes a spinning chamber or blade 132 that moves wine to aerate it while the wine is being cooling. The blade 132 is operated by a motor 74 which spins the blade 132 about a vertically extending axis. The movement created by the spinning blade 132 increases turbulence, which speeds the aeration and heat transfer within the chamber 132. In this embodiment, wine leaves the pouch 12 after being cut by a cutter 78 and spills into a chamber or reservoir 124. The chamber or reservoir 124 is V-shaped and leads to a dispensing nozzle 44. Peltier coolers 108 including heatsink 110 are positioned on opposite sides of the discharge chamber for cooling wine in the chamber. The discharge valve 100 may be closed by a solenoid valve or other valve. A temperature sensor can be used to measure the temperature of the wine. Once the wine reaches a desired temperature, the valve 100 is opened, and the wine exits the discharge chamber through the dispensing nozzle 44.

Figure 33:
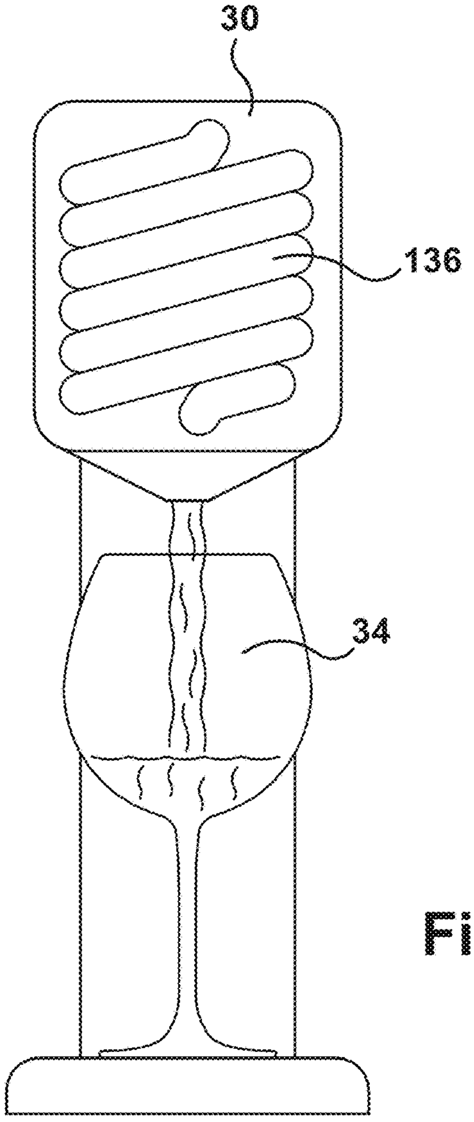
FIG. 33 illustrates an exemplary device for cooling and/or warming wine in a wine dispensing device according yet another embodiment of the present invention.

FIG. 33 depicts a schematic of yet another alternative cooling system that utilizes cooling coils 136 that extend outwardly from a front surface of the head 30 of the device. The coils 136 may be disposed for viewing. The coils 136 could be transparent tubing so that a user can view wine in the coils as it is chilled. The coils 136 may be positioned directly adjacent a discharge reservoir and outlet so that wine falls from the coils 136 into the discharge reservoir for dispensing through the discharge outlet. In this embodiment, a Peltier cooler 108 may be positioned inside the machine and is coupled to and positioned directly adjacent the coils 136. The coils 136 could also be positioned inside the head 30 of the machine so that they are not visible to the user. The Peltier cooler may chill the wine in the coil 136 inside the machine.

Figure 34:
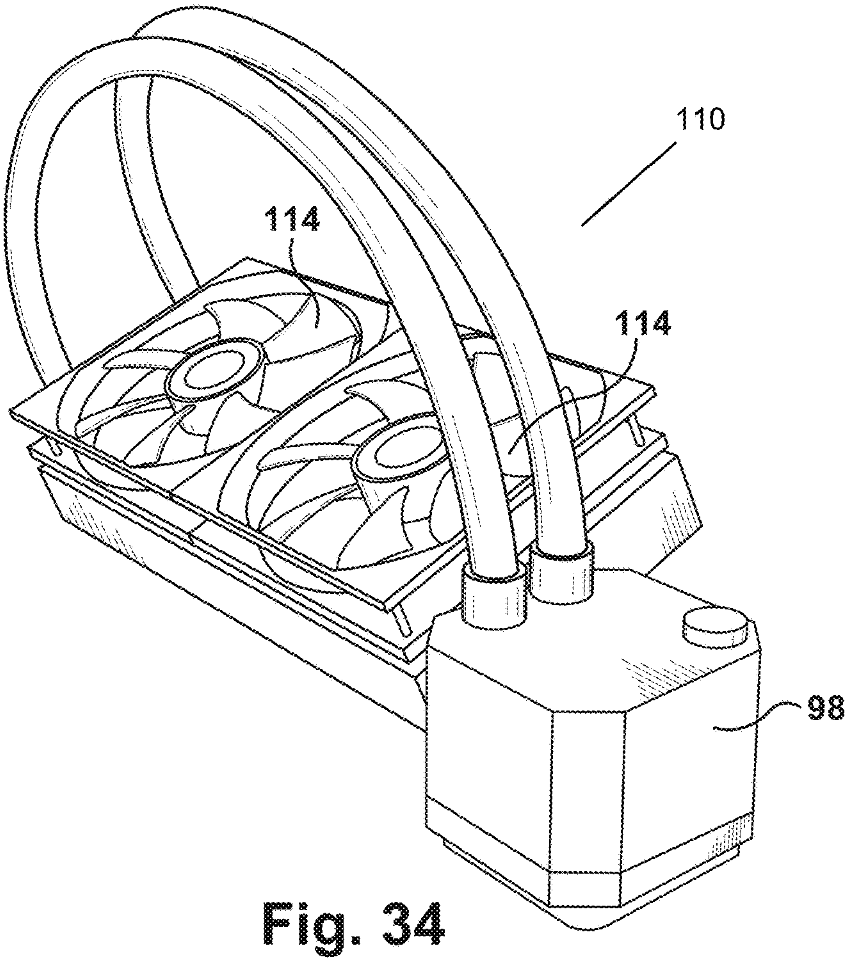
FIG. 34 illustrates a component for use with a cooling device for drawing heat away from or towards the cooling device according to an embodiment of the present invention.

FIG. 34 depicts a fan 114 and heat sink 110 for use with the system. The heatsink 110 has tubing extending therefrom that is coupled to a pump 98 for pumping fluid through the heatsink 110. The heatsink 110 could be a copper heatsink. A PCB board may be used with the system, although not shown. Color sensors (not shown) could be used for reading a color barcode on a pouch.

Figure 35:
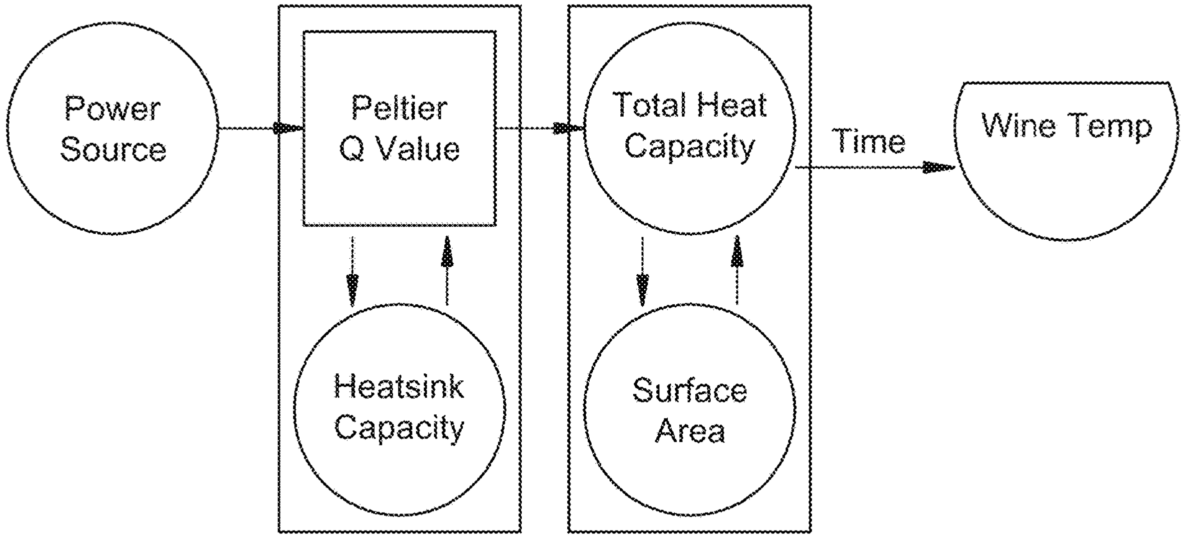
FIG. 35 illustrates a schematic of a cooling system of a wine dispensing device according to an embodiment of the present invention.
Figure 36:
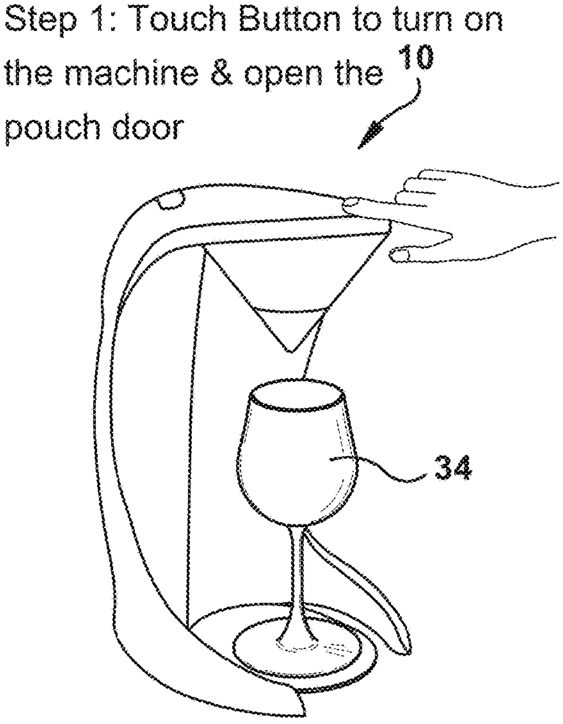
FIGS. 36-43 illustrate various operational steps for an exemplary wine dispensing device according to an embodiment of the present invention.
Figure 37:
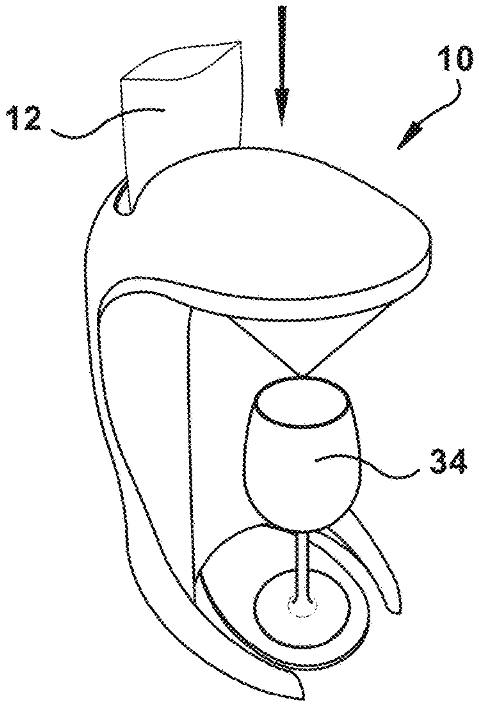
Figure 38:
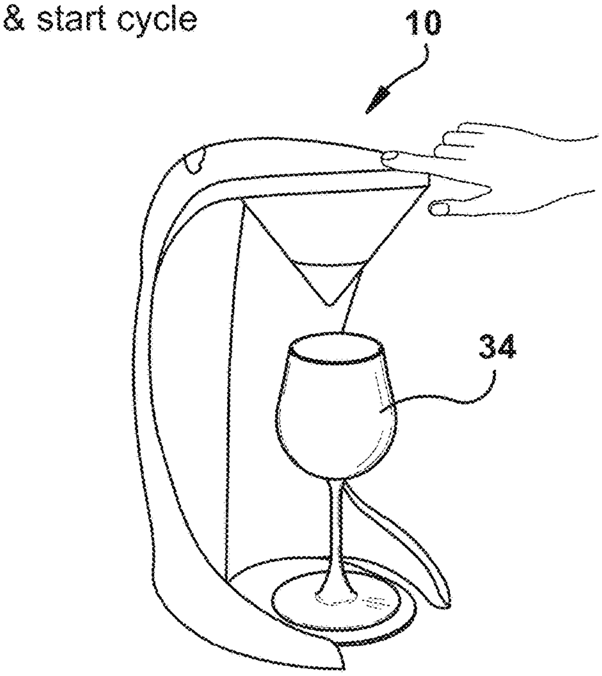
Figure 39:
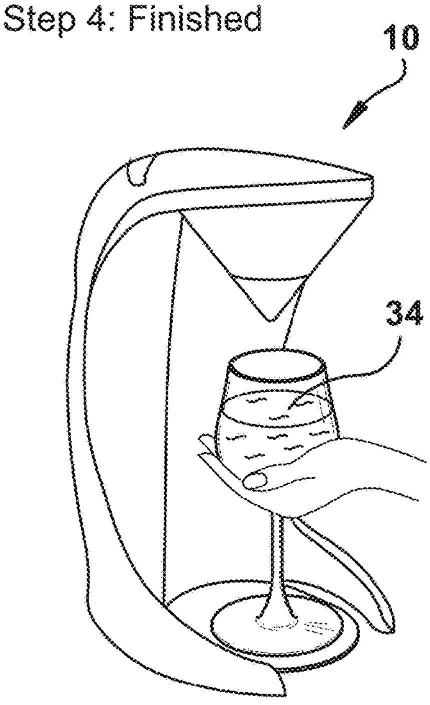
Figure 40:
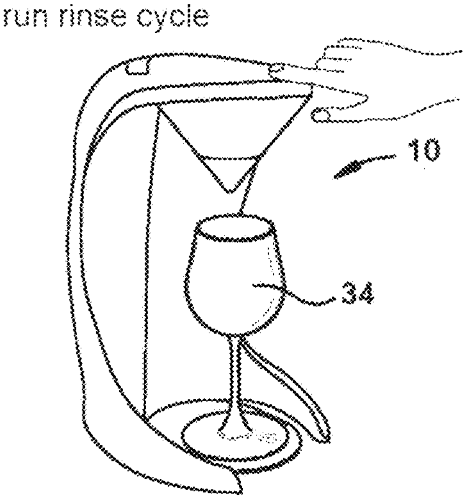

FIG. 35 depicts an overview of the cooling technology utilized with the invention, including various variables that are relevant to the system. Changing any variable will require reevaluating every component in the system. All variables directly affect one another. Each time a variable changes, different components must be selected to stay in the operating range.

FIGS. 36-39 depict a method for dispensing wine according to an embodiment of the present invention. Step 1 comprises activating the wine dispensing device 10 by touching an activation button on the wine dispensing device 10. This button, when pressed, may light up and begin a pre-chilling process. Button activation also serves to open a pouch door. Step 2 comprises inserting a pouch into the wine dispensing device 10 through the pouch door. Step 3 comprises touching the button again. Touching the button a second time causes the button to light up again, but with a different color to show that the button has been touched twice. When the user presses the button during step 3, the pouch receptacle door closes, and the dispensing cycle begins. This cycle may include cutting, draining cooling, aerating, pouring, and auto-discarding of the empty pouch. Once the wine has been dispensed, the button light indicator indicates to the user that the glass can be removed.

FIGS. 40-43 depict additional steps for dispensing wine according to an embodiment of the present invention. Step 4 depicts a cleaning process that can be used with the system. To clean the wine dispensing device 10, the user may press and hold the activation button to run the rinse cycle. A water reservoir 40 may be positioned inside the housing which holds water used for rinsing the system. The rinse cycle may be activated if different types of wine are dispensed from the device so that the wines do not mix. The rinse cycle can also be used at the end of the day after all glasses of wine have been dispensed to rinse the device. Rinse water may travel through the cooling system and is dispensed out of the dispensing nozzle, where it can be collected in a glass and disposed of.

Figure 41:
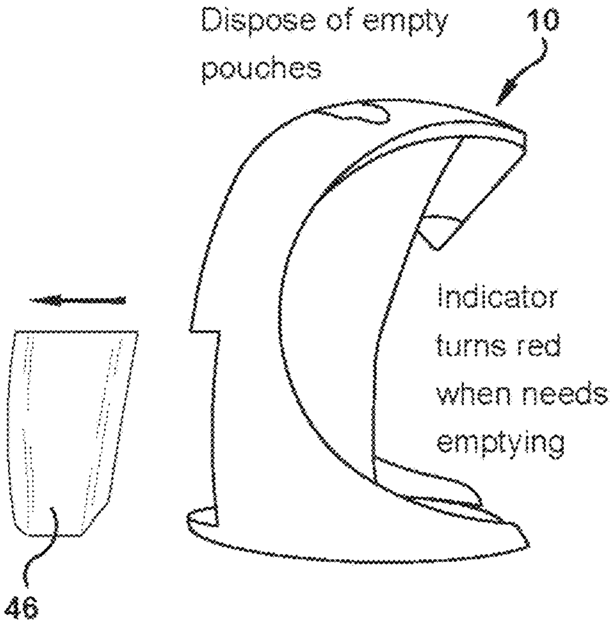

FIG. 41 depicts a pouch discard bin ready to be emptied according to an embodiment of the present invention. The activation button turns red, indicating that the wine pouch receptacle inside the device needs to be emptied. The user may empty the pouch bin 46 by removing it from the rear side of the wine dispensing device 10, or by dumping the bin 46.

Figure 42:
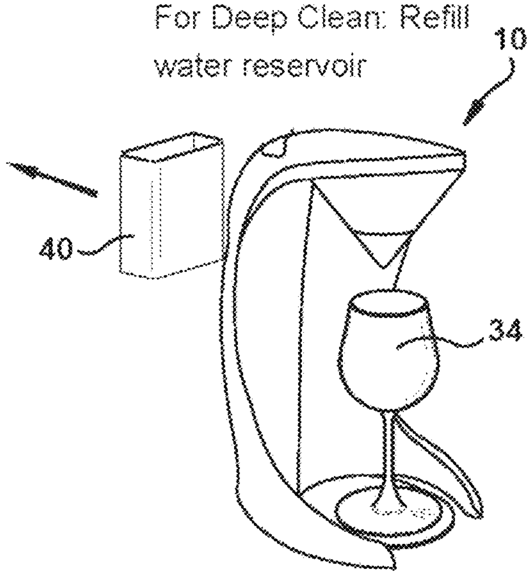

FIG. 42 depicts Step 6 comprising refilling a water reservoir for a cleaning cycle according to an embodiment of the present invention. In one embodiment, the water reservoir 40 may hold 3 cycles worth of cleaning water. The location for the water reservoir 40 may be inside the housing of the wine dispensing device. The water reservoir 40 can either be removed from the housing to be refilled, or and can be provided with a spout formed in the housing to permit a user to pour additional water directly into the water reservoir 40 without having to remove the water reservoir 40 from the housing.

Figure 43:
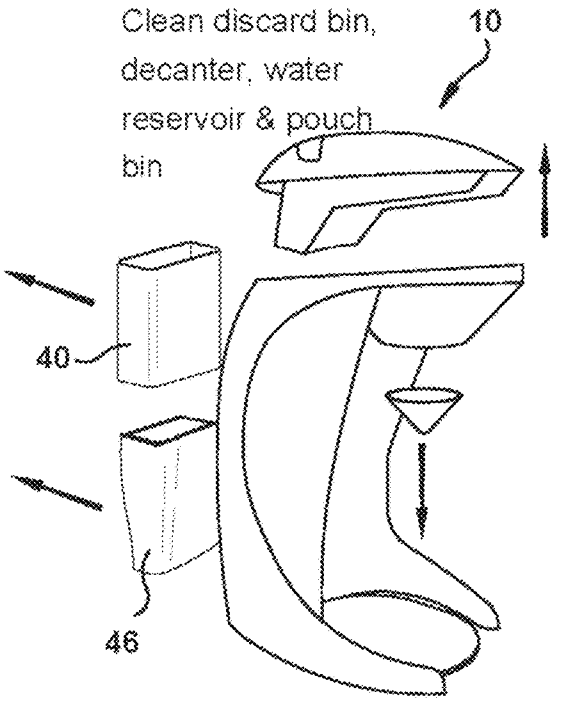
Figure 44:
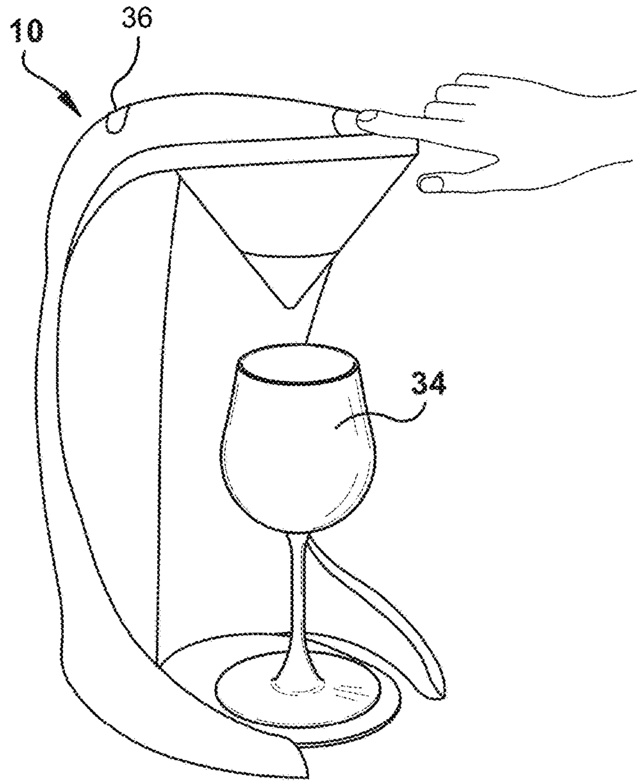
FIGS. 44-47 illustrate various operational steps for an exemplary wine dispensing device according to an alternative embodiment of the present invention.
Figure 45:
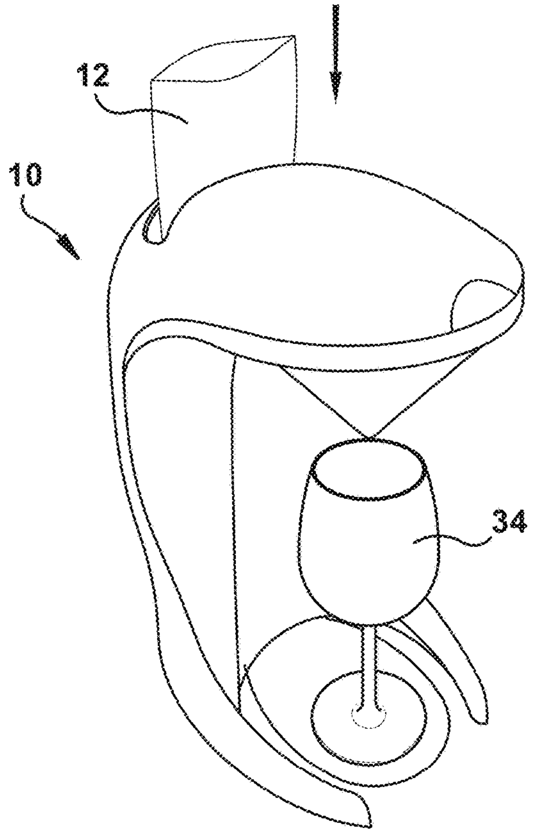
Figure 46:
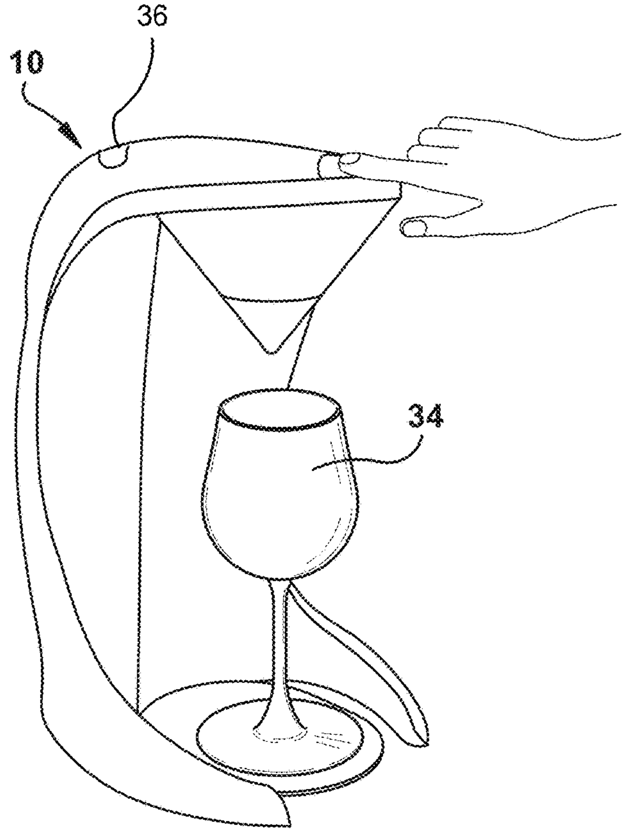
Figure 47:
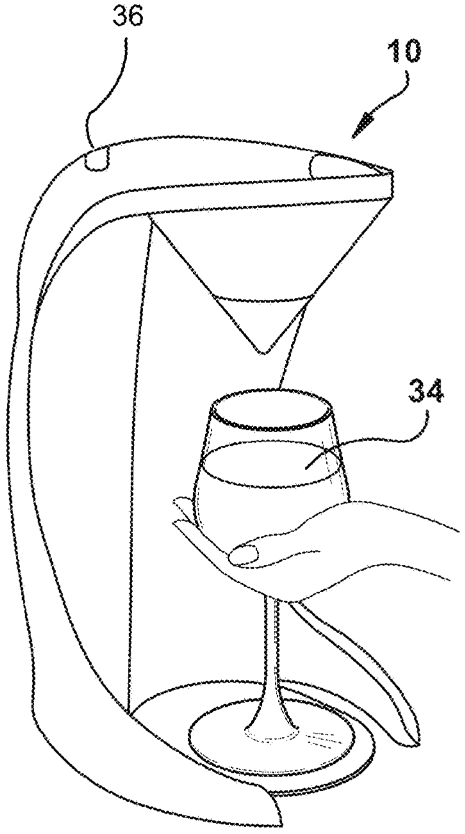

FIG. 43 depicts Step 7 comprising a deep cleaning of the system according to an embodiment of the present invention. In this Step, the user may remove the decanter/discharge nozzle, water reservoir 40, and the pouch discharge bin 46. The pouch discard bin 46 can be provided as a separate removable part of the wine dispensing device 10 that houses the pouch receptacle and the cutting mechanism for cutting open the pouch.

FIGS. 44-47 depict a user experience for a wine dispensing device according to an embodiment of the present invention. A user may touch a control button and a pouch door opens. The user then may load a pouch 12 into a pouch slot 36. The user may then touch the control button for a second time to begin the dispensing cycle. This also causes the pouch door to close.

Figure 48:
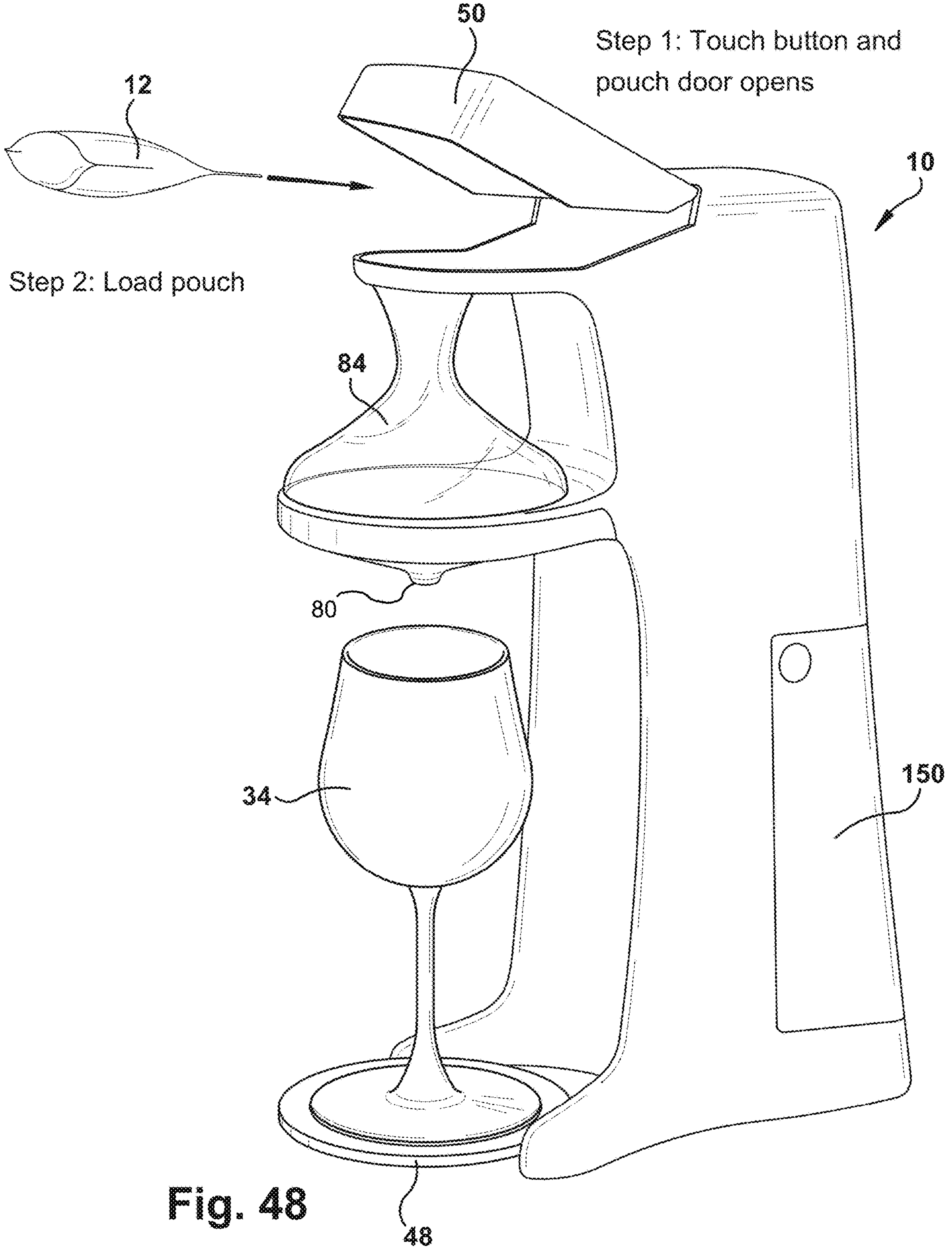
FIGS. 48-49 illustrate operational steps for an exemplary wine dispensing device according to yet another alternative embodiment.
Figure 49:
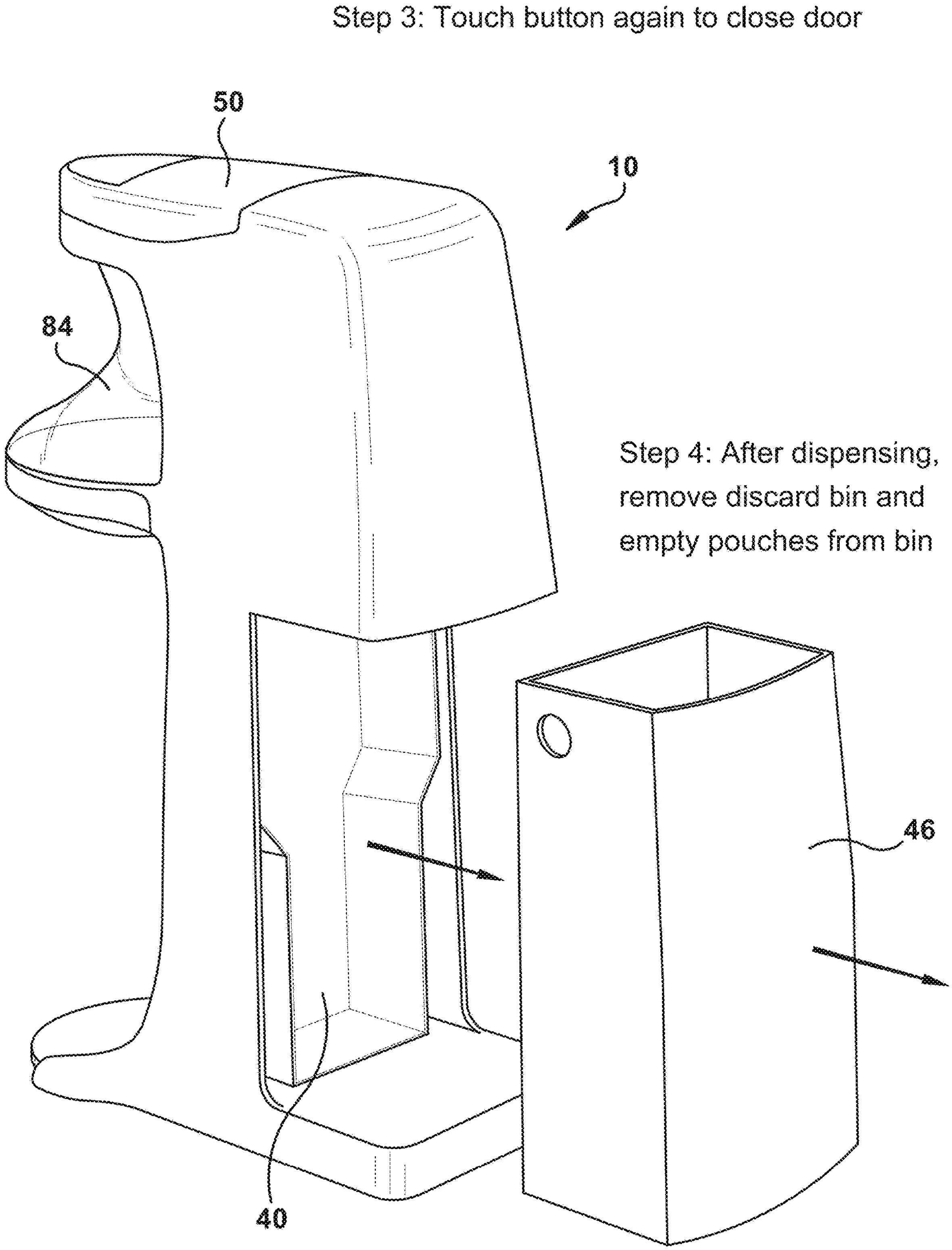

FIGS. 48-49 depict the user experience for a wine dispensing device according to another embodiment of the present invention. Similar to prior embodiments, the first step comprises touching of an activation button to start the wine dispensing device and open the pouch door 50. On start-up, the light rotates around the button indicating internal processing of the device 10 and that the device 10 is not yet ready for the pouch 12 to be inserted. A second step comprises that the device 10 is “ready” and that the pouch door 50 has been opened and a pouch 12 can be inserted into the device 10. When the device 10 is “ready”, the indicator light of the activation button becomes solid or fades in and out before the pouch 12 is inserted to indicate readiness/waiting.

The pouch door 50 in this embodiment is positioned on the front surface of the device 10. The pouch door 50 is hinged along the top edge of the device 10 and opens outwardly from the top. A user may insert a pouch 12 with the top end down into a pouch receiving slot. In step 3, the user may touch the activation button again to close the pouch door 50 and to start the operational cycle of the device 10, which begins the dispensing cycle and closes the pouch receiving door 50. Device 10 may include a close door sensor that prohibits operation of the device and the dispensing cycle prior to the pouch receiving door 50 being closed. Alternatively, device 10 may automatically close the pouch receiving door 50 upon detection that the user commands the device 10 to commence operation or begin the dispensing cycle. During processing, the light glows solid and bright when the button is pressed to show confirmation. Wine may then be dispensed through a decanter 84 and to an outwardly extending spout 80.

After dispensing has occurred and the dispensing cycle has been completed, the activation button blinks twice, then stays solid to indicate completion of the process. Other signals can be used, including blinking and solid lights and different colors, as well as different parts of the button being lit, or around the button. The device 10 may also include dedicated buttons for selecting red wine, white wine, door opening/closing, rinse, deep clean, and power.

The activation button may be a single activation button that is used for all operations of the system. The button can include LED lighting that is associated with the button. The entire button could light up, or an area around the button could light up, or both. The LED lighting could provide different colors to signal different things or status modes to the user. The LED lighting may indicate status and operation to the user. In one indicator user experience, the button could glow red when the pouch discard bin 46 is full, indicating to the user that the bin 46 needs to be emptied. In addition, when the pouch discard bin 46 is full, programming could be used to lock the device 10 from operating any further until the bin 46 is emptied. The LED lighting may be programmed according to the following modes: blinking blue to indicate deep cleaning or rinse cycle, blinking blue to indicate water reservoir needs more water, pulsing red to indicate red wine cooling and dispensing cycle, and pulsing champagne to indicate white wine cooling and dispensing cycle.

The device 10 may also include a rinse light to prompt a rinse or deep clean and to communicate errors. The rinse light may be programmed according to the following modes: blinking in sets of 2 to suggest a rinse, blinking in sets of 4 to suggest a deep clean, and standard blinking to indicate a rinse or deep clean in progress. Additionally, the device 10 may include a buzzer that can communicate certain states, such as low water, errors, or dispense complete.

FIG. 49 also shows the location of the water reservoir 40 inside the device 10 as well as removal of the discard bin 46 for emptying used pouches. The discard bin can hold at least 3 pouches, but possibly more. The discard bin 46 can be removed from the device 10 and emptied without having to touch the pouches 12, thus avoiding sticky fingers. While the button is used to open and close the door 50 in this embodiment, the user could alternatively open and close the door 50 manually.

During a rinse cycle, the LED lighting may rotate slowly while running the cycle to show processing. When the water reservoir 40 that is used for cleaning is empty, a light associated with the button could glow blue to indicate that the water reservoir 40 needs to be refilled before it will run the next pouch. The button is shown positioned at the front top edge of the device 10, but could be positioned at other locations, if desired.

Figure 50:
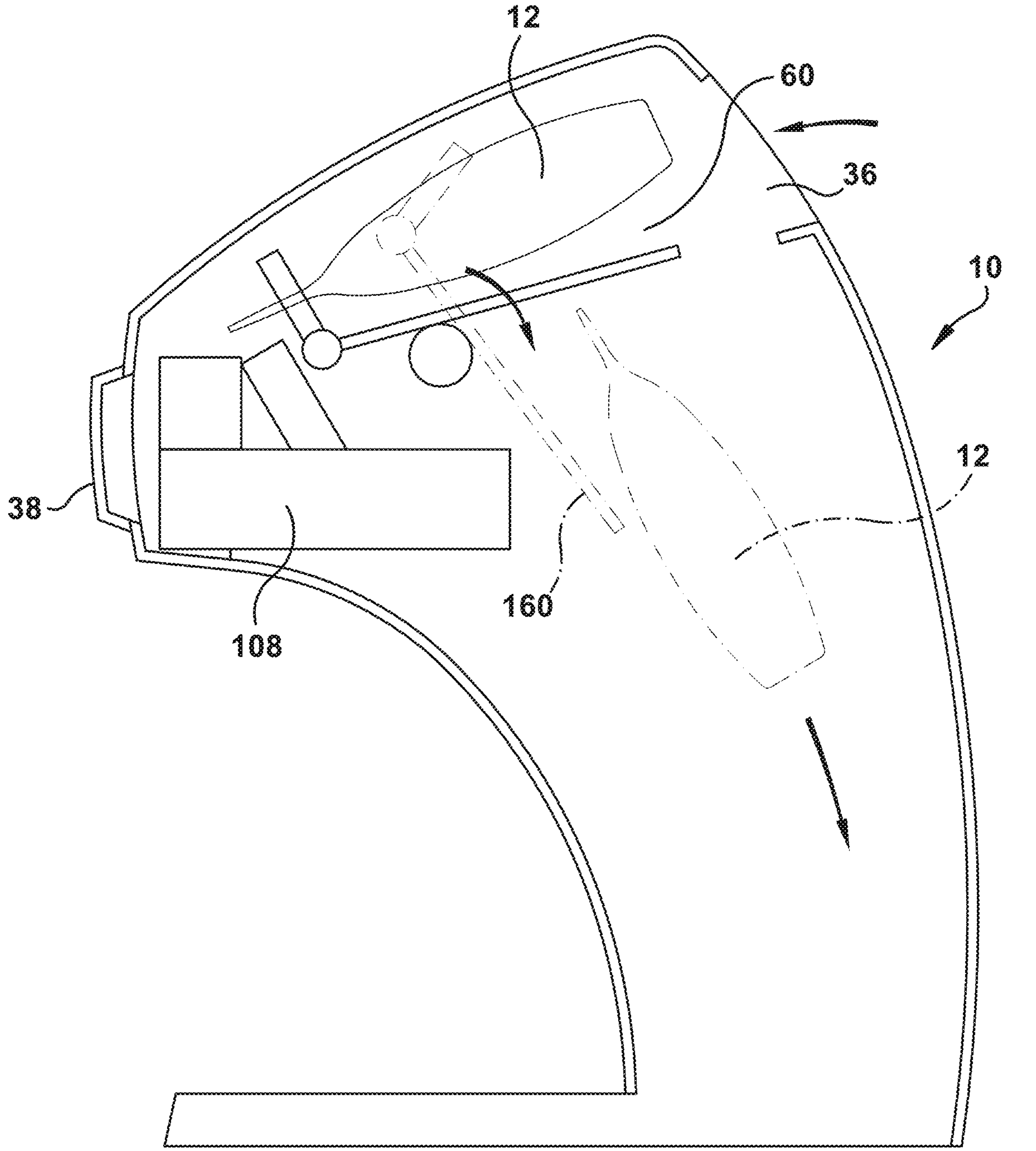
FIGS. 50 and 51 illustrate a cutaway side view of a wine dispensing device having a rear loading slot according to one embodiment of the present invention.

FIG. 50 depicts an alternative embodiment of a wine dispensing device 10 that has an opening 36 for loading pouches 12 into the rear of the device 10. In this embodiment, there is no door for inserting the pouch 12. The user simply inserts the pouch 12 top first into the rear slot 36 until the pouch 12 seats in the pouch receptacle 60. The pouch 12 is cut in the pouch receptacle 60 and wine flows into the front of the device 10, where it is cooled. The device 10 may include a viewing window to allow the user to see the wine as it is being processed. A cooler and any aeration devices may be positioned at the front end of the head of the device 10 and an opening 36 in the housing of the device 10 may be positioned below a discharge opening so that a glass can be positioned under the discharge opening. This embodiment may include a swing door that permits the pouch 12 to rotate and be discarded into a discard bin.

Figure 51:
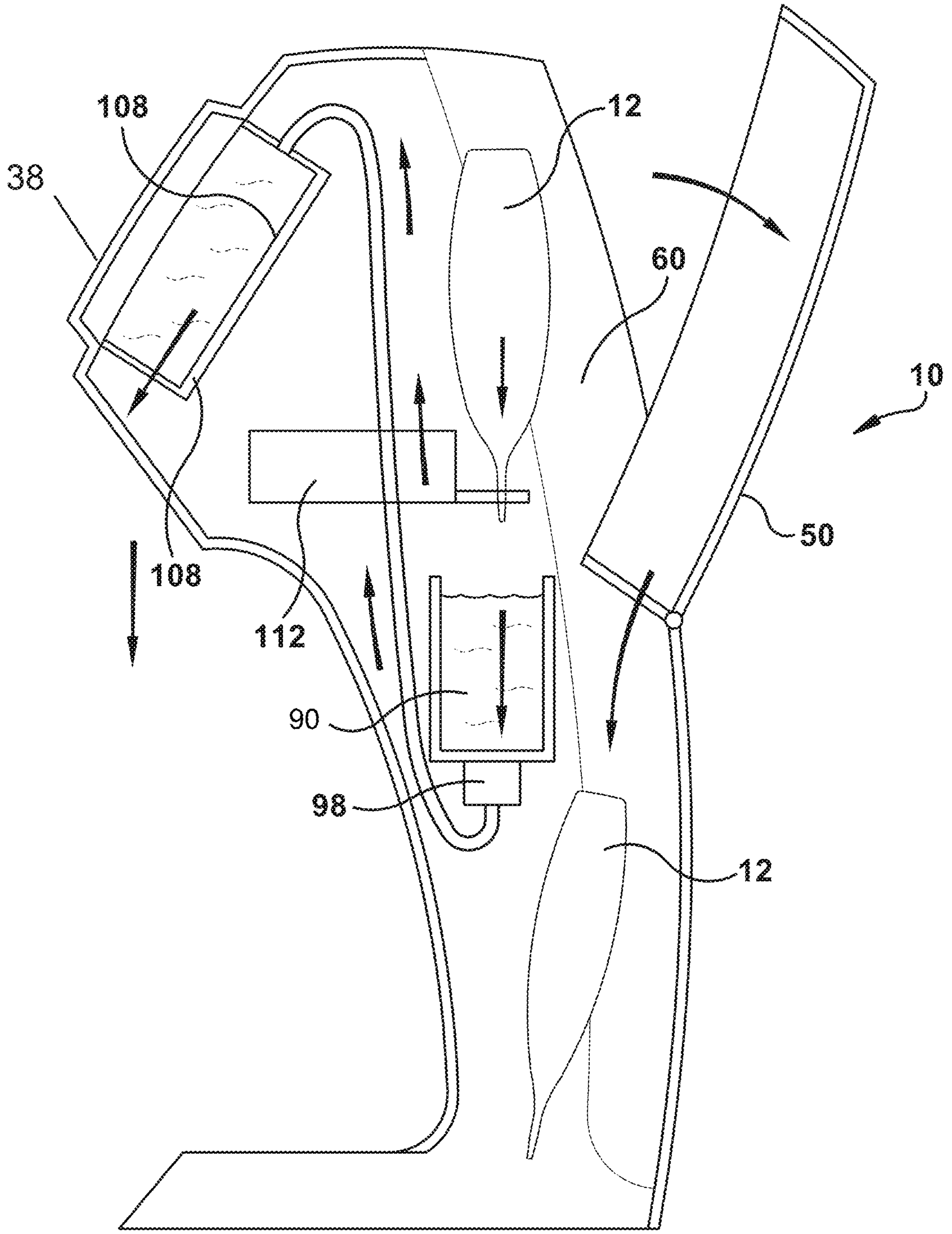

FIG. 51 depicts another alternative embodiment of a wine dispensing 10 where a pouch opening for loading pouches 12 is positioned on a rear surface of the device 10 under a door 50. The door 50 is hinged to the housing at a lower end of the door 50 on the rear surface of the device 10. The door 50 can be opened manually or can be opened by touching a button that operates a servo to open the door 50. Once the door 50 is opened, the user inserts the pouch 12 into the pouch receptacle 60 inside the housing. The pouch 12 is inserted with the top end down. Once the pouch 12 is positioned in the receptacle 60, the pouch 12 may be opened with a cutting mechanism or slicing mechanism and wine is permitted to flow into a wine reservoir 90. Aeration can occur while the wine is in the wine reservoir 90 or while the wine leaves the pouch 12. A pump 98 is utilized to pump the wine to the upper end of the housing, where it flows into a Peltier cooler 108. The Peltier cooler 108 is associated with a viewing window, where a user can view the wine being cooled. Then the wine can be dispensed from the device 10 into a glass. After the pouch 12 has been emptied it can move into a discard bin. The discarding process can be tied to the rotation of the door 50 such that the pouch 12 moves into the bin as the door 50 is opened, for example. Alternatively, as discussed above, other techniques for pouch discarding can be used.

Figure 52:
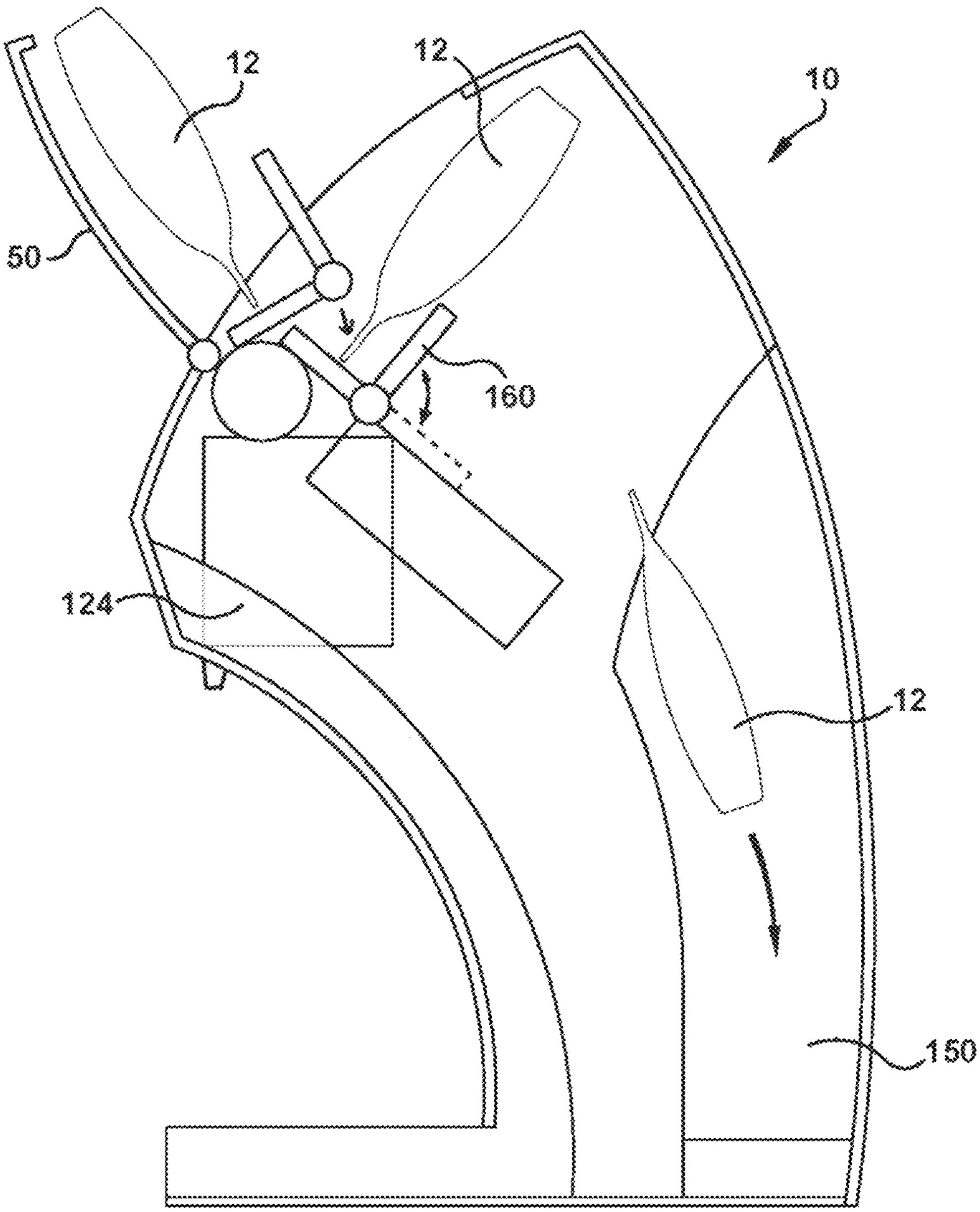
FIG. 52 illustrates a cutaway side view of a wine dispensing device having a top loading door and a bin for catching a used pouch according to an alternative embodiment of the present invention.

FIG. 52 depicts an alternative embodiment of a wine dispensing device 10 where the pouch door is positioned on top of the device 10. In this embodiment, the user inserts the pouch 12 into a pouch receptacle, which is coupled to the door 50. The door 50 is hinged to the upper end of the housing near the top center of the device 10. The door 50 opens forwardly. When the user closes the door 50, the pouch 12 rotates into the housing along with the rotation of the door 50, where it is cut and the wine in the pouch 12 is dispensed. The pouch receptacle includes a trap door 160 that rotates and releases the pouch 12 into a discard bin.

Figure 53:
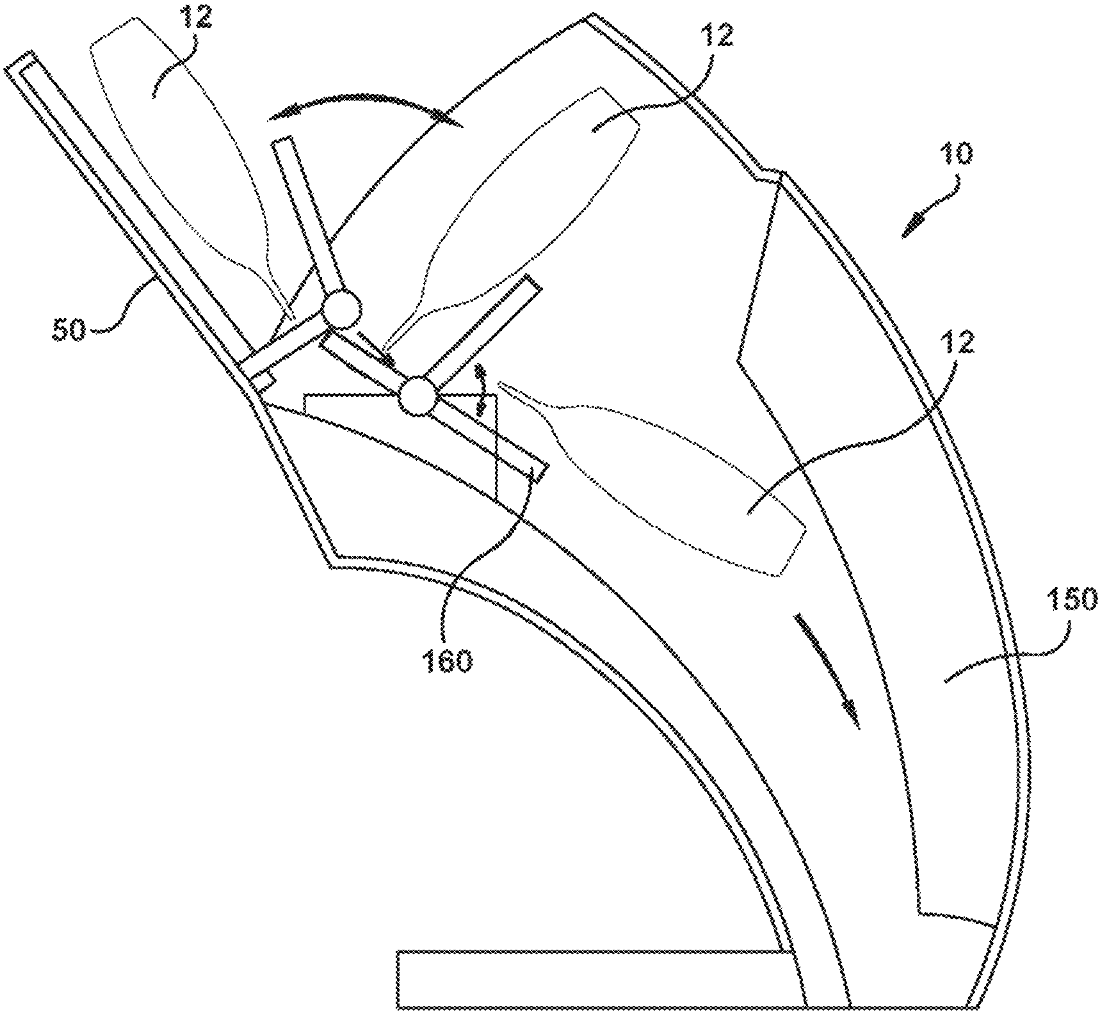
FIG. 53 illustrates a cutaway side view of a wine dispensing device having a top loading door with an alternative bin for catching a used pouch according to another embodiment of the present invention.

FIG. 53 depicts an alternative embodiment of a wine dispensing device 10 where a pouch door 50 is on the top end of the device 10. The pouch door 50 is hinged to the top end of the housing adjacent the front end of the device 10. The pouch door 50 includes a receptacle for holding the pouch 12 in a substantially or partly vertical position. The user inserts the pouch 12 into the receptacle in a substantially or partly vertical position with the top end of the pouch 12 facing downwardly. The user closes the door 50 either manually or with the touch of a button. The pouch 12 is cut by the cutting mechanism inside the housing, and then wine is dispensed from the pouch 12. The pouch receptacle includes a trap door 160 that rotates to force the pouch 12 to be discarded into a discard bin.

Figure 54:
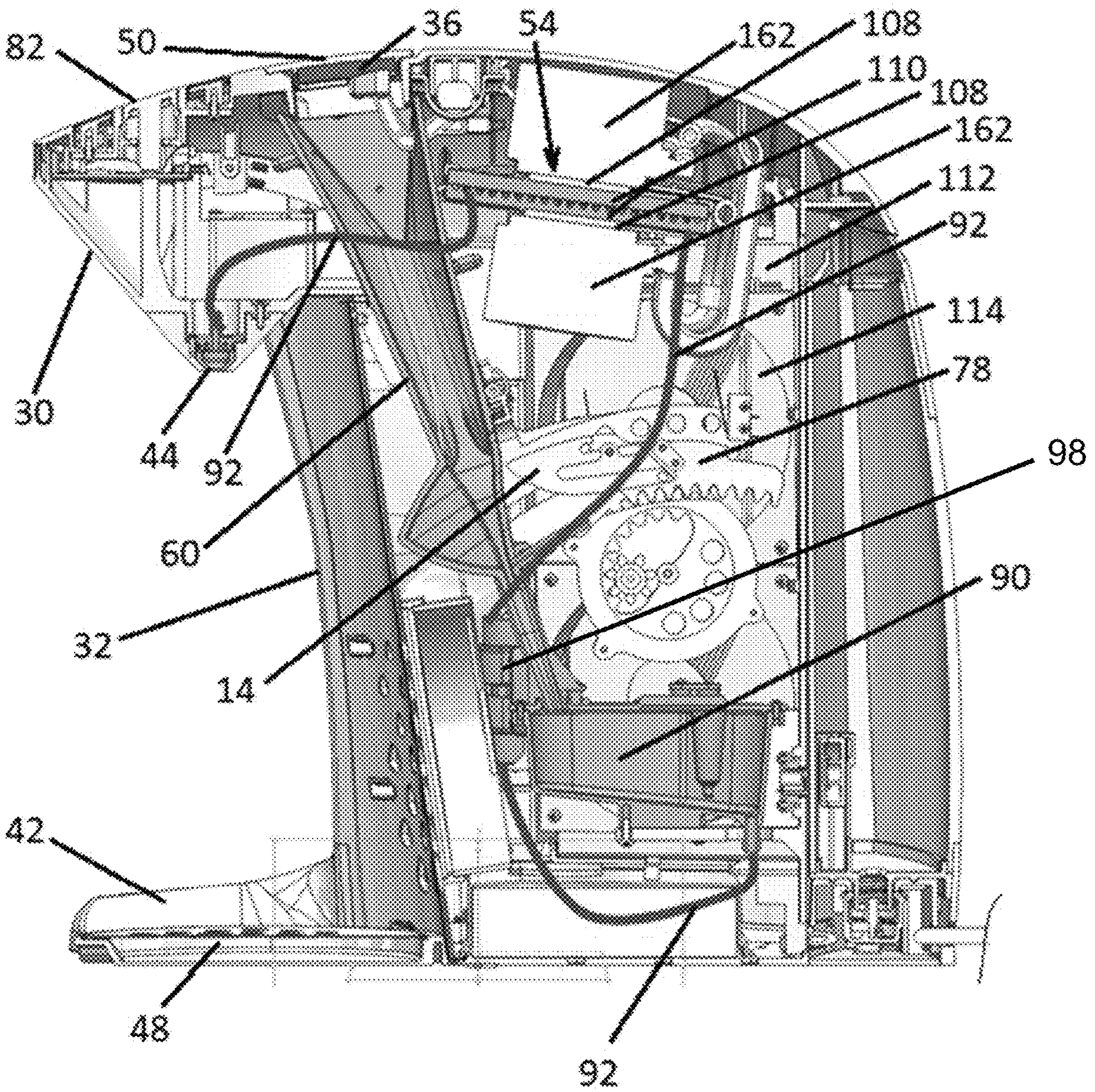
FIG. 54 illustrates a side, internal view of a beverage dispenser according to one embodiment of the present invention.
Figure 55:
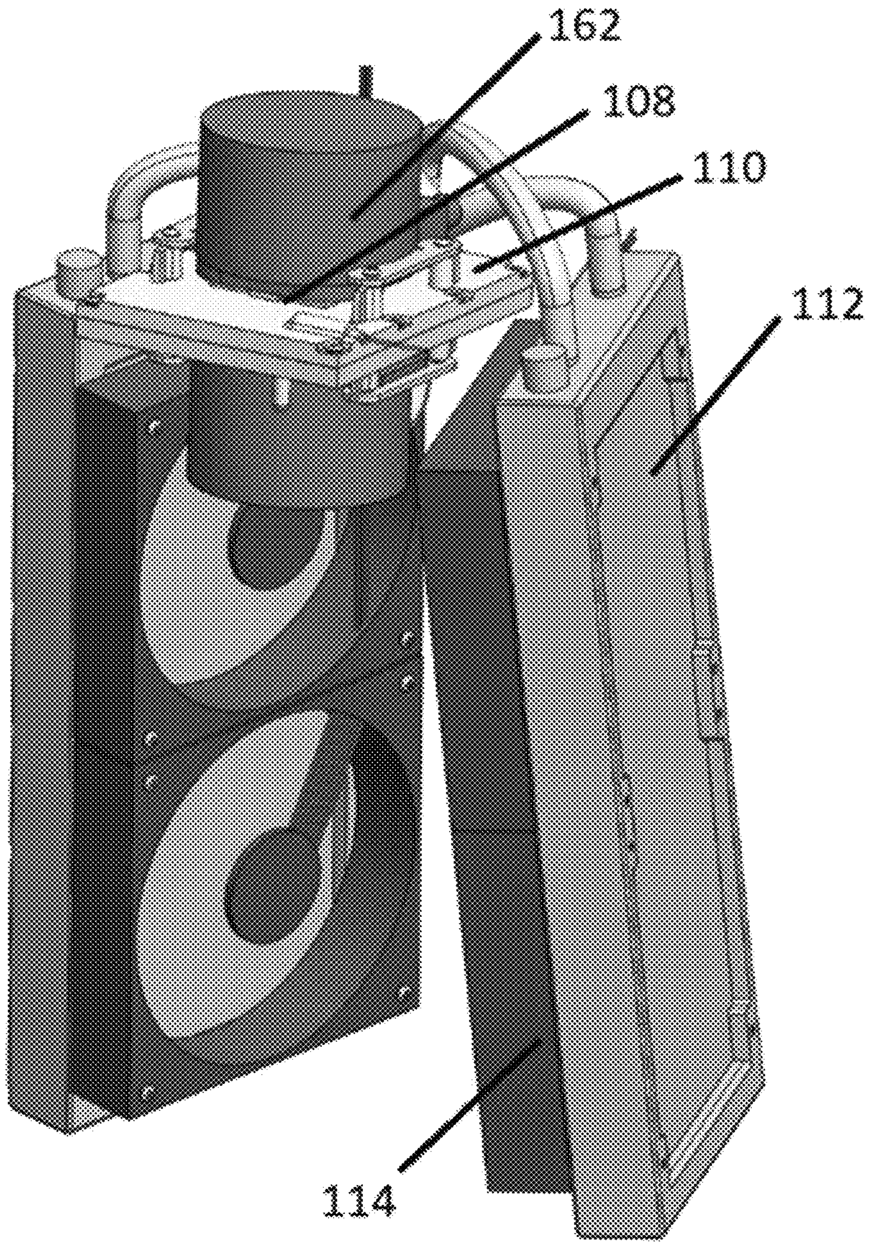
FIG. 55 illustrates a perspective view of a cooling system utilized in the beverage dispenser according to one embodiment of the present invention.

FIG. 54 depicts an alternative embodiment of a wine dispensing device 10. The device 10 has an opening 36 disposed in the top surface of the housing. A pouch receiving receptacle 60 is coupled to the opening 36 and extends downwardly therefrom at an angle. The pouch receiving receptacle 60 includes inwardly extending members that help to trap the pouch in the receptacle 60 so that the cutting process can take place. The bottom end of the receptable 60 has a conduit through which the beverage travels into a reservoir 90 via gravity. Tubing 92 is coupled to a bottom end of the reservoir 90 and a pump 98 is utilized to pump the beverage from the wine reservoir 90 upwardly to the heatsink 110. The wine is pumped through the heatsink 110 at a prescribed or predetermined speed. The speed may be programmed in a PCB to apply to all types of wine. The speed may be determined by an algorithm that takes into account the type of wine that is being served. The speed may be determined by an algorithm that takes into account the type of wine and the temperature of the wine. The wine temperature may be sensed by a first temperature sensor in the wine reservoir 90 and again by a third temperature sensor that is coupled to the heatsink 110. A second temperature sensor is coupled to the device 10 for determining the ambient temperature, which can also be considered within the algorithm.

The wine may be cooled in the heatsink 110 using the cooling systems disclosed herewith. Once the wine reaches the exit to the heatsink 110, the wine may be pumped to the dispensing nozzle 44 where it is dispensed into a glass. The dispensing nozzle 44 is positioned in the head 30 of the housing.

The pouch may be cut by a cutting mechanism 78 that includes a cutting blade 14. The cutting blade 14 is coupled to a blade holder, which is coupled to gears and a motor. The motor operates the cutting blade 14 to move into and out of the pouch and the pouch receptacle 60.

In operation, the user inserts a pouch containing a beverage through the opening 36 in the top of the device 10. The pouch gets caught by the receptable 60 or hopper. The pouch is cut by a piercing mechanism/cutting mechanism 14, 78. Wine exits the pouch and flows into the reservoir 90. Wine is then pumped from the reservoir 90, through the heatsink 110 and out through the dispensing nozzle 44.

Figure 56:
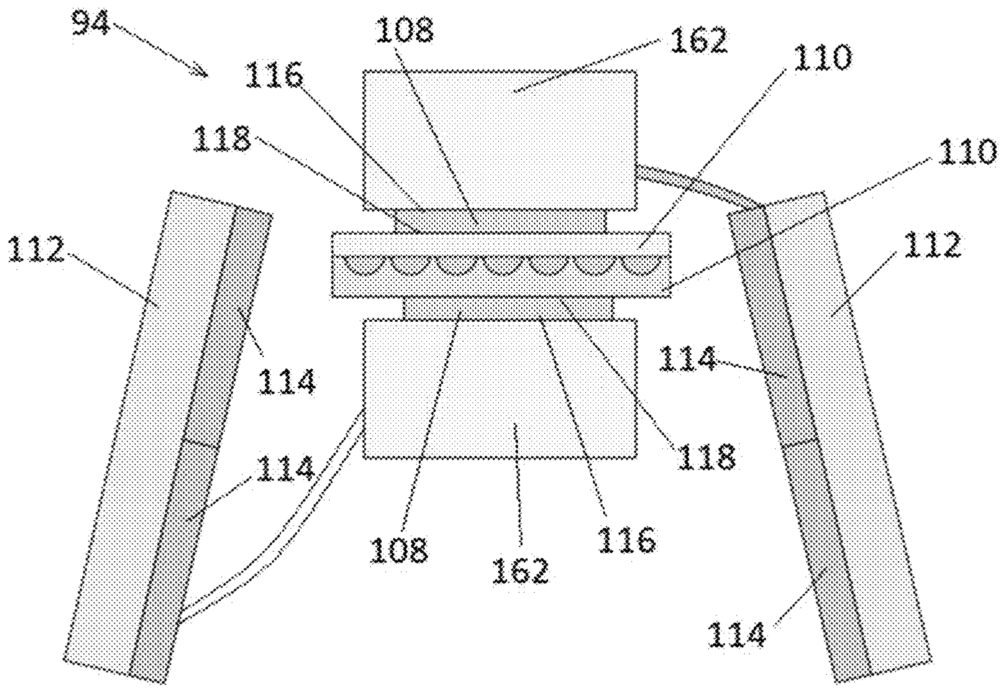
FIG. 56 illustrates a schematic of a cooling system according to one embodiment of the present invention.

FIGS. 55-58 depict exemplary cooling systems according to embodiments of the present invention. The cooling systems may utilize a pair of Peltier coolers 108 that are positioned in spaced relation to one another, with a heatsink 110 positioned between the Peltier coolers 108. The Peltier coolers 108 include a hot side 116 and a cold side 118. Cooling pumps 162 are coupled to each of the hot sides 116 of the Peltier coolers 108. Each of the cooling pumps 162 are coupled to a radiator 112 and a pair of fans 114. A cooling fluid flows through the cooling pumps 162 between an entrance and exit of the pumps 162. When the cooling fluid exits the cooling pump 162, it flows through a radiator 112, where it is cooled by a fan 114. The number of fans 114 utilized is determined based upon the cooling power required as well as the size of the radiator 112. The size of the radiator 112 is also determined based upon the amount of cooling that is required. As shown in FIG. 56, the heatsink 110 is trapped between the two Peltier coolers 108, with the cooling pumps 162 being positioned adjacent each of the Peltier coolers 108.

Figure 58:
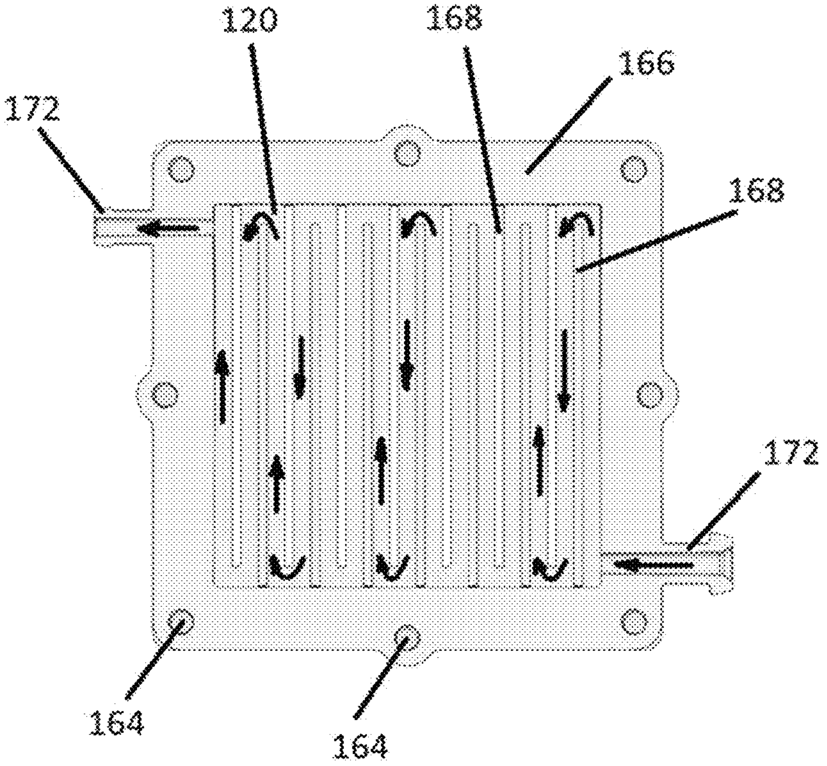
FIG. 58 illustrates a top, transparent view of a heatsink according to one embodiment of the present invention.
Figure 57:
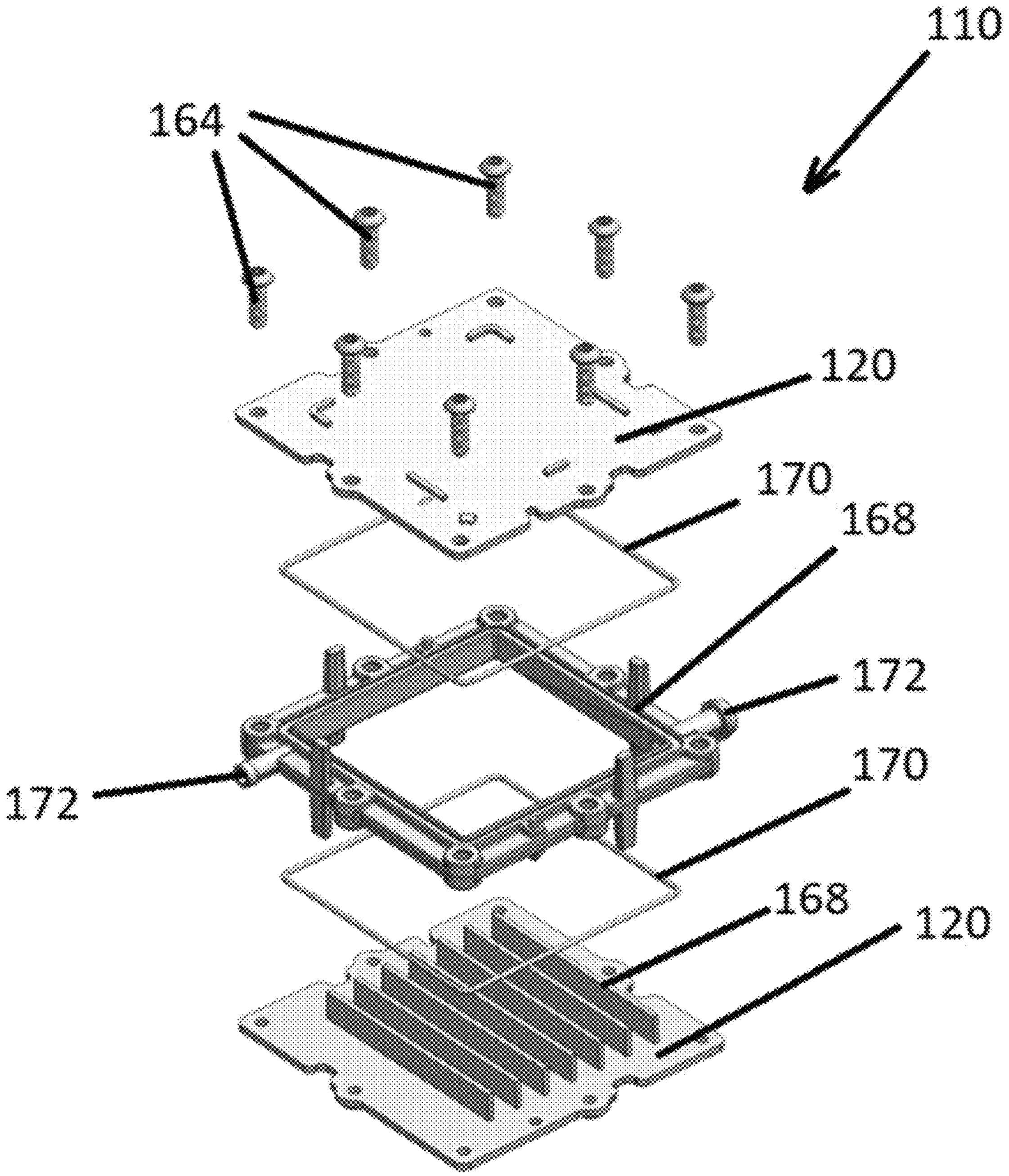
FIG. 57 illustrates an exploded perspective view of a heatsink utilized in a cooling system according to one embodiment of the present invention.

The heatsink 110 is shown in greater detail in FIGS. 57 and 58. The heatsink 110 comprises a pair of plate-like members 120 that have fins 168 extending outwardly from a surface thereof. The plate-like members 120 may be made of aluminum or another material and coated with, for example non-stick coating such as Teflon. The plate-like members 120 may be substantially flat, as shown in FIG. 57, with the fins 168 being outwardly extending substantially flat bars that together define channels therebetween. The fins/bars 168 are spaced from one another in a parallel manner, but could be non-parallel, if desired. The pair of plate-like members 120 together define the heatsink 110 along with a core 166, which defines the side walls of the heatsink 110. The heatsink 110 may include at least two bends, The plate-like members 120 face one another so that the fins 168 from each plate 120 extend inwardly toward the other plate 120. The fins 168 are positioned on each of the plates 120 in spaced relation to one another so that when the plates 120 are positioned against one another, the fins 168 from each plate 120 define interspersed parallel channels that define a circuitous path through the heatsink 110. The fins 168 on each plate-like member 120 of the heatsink 110 are substantially the same length. When the plates 120 are positioned against one another, the fins 168 are aligned in a first direction, but not aligned in another direction such that flow path channels are created between the plates 120, which is shown in FIG. 58.

The core 166 defines the side walls of the heatsink 110 and includes an inlet and an outlet 172. Wine enters the inlet 172 and exits the outlet 172 of the heatsink 110 via the openings in the core 166. Sealing rings 170 are positioned between each of the plates 120 and the core 166 to seal the core 166 from leaks. The inlet 172 of the core 166 may be larger in diameter than the outlet 172 of the core 166 so that wine cannot flow as easily through the heatsink 110, so that wine is required to stay in the heatsink 110 longer, which aids in cooling. The plates 120 and core 166 are coupled together with fasteners 164, with seals 170 being trapped between the parts. A channel may be defined on each side of the core 166 to hold the seals 170 in place.

While only one activation button is shown, the device 10 could include multiple buttons or a touch screen or other input device(s) if desired. A different cooling system such as a water-cooled system or other system could be used for cooling if desired, although other systems tend to add significant cost.

Pouch:

The pouch utilized with the disclosed wine dispensing device may comprise a flexible, soft pouch with no hard-plastic parts. The pouch can be a four-sided pouch that is sealed entirely around a single edge of the perimeter of the pouch. Alternatively, the pouch can be a stand-up pouch that has a sealed, gusseted bottom, as known by those of skill in the art.

Figure 18:
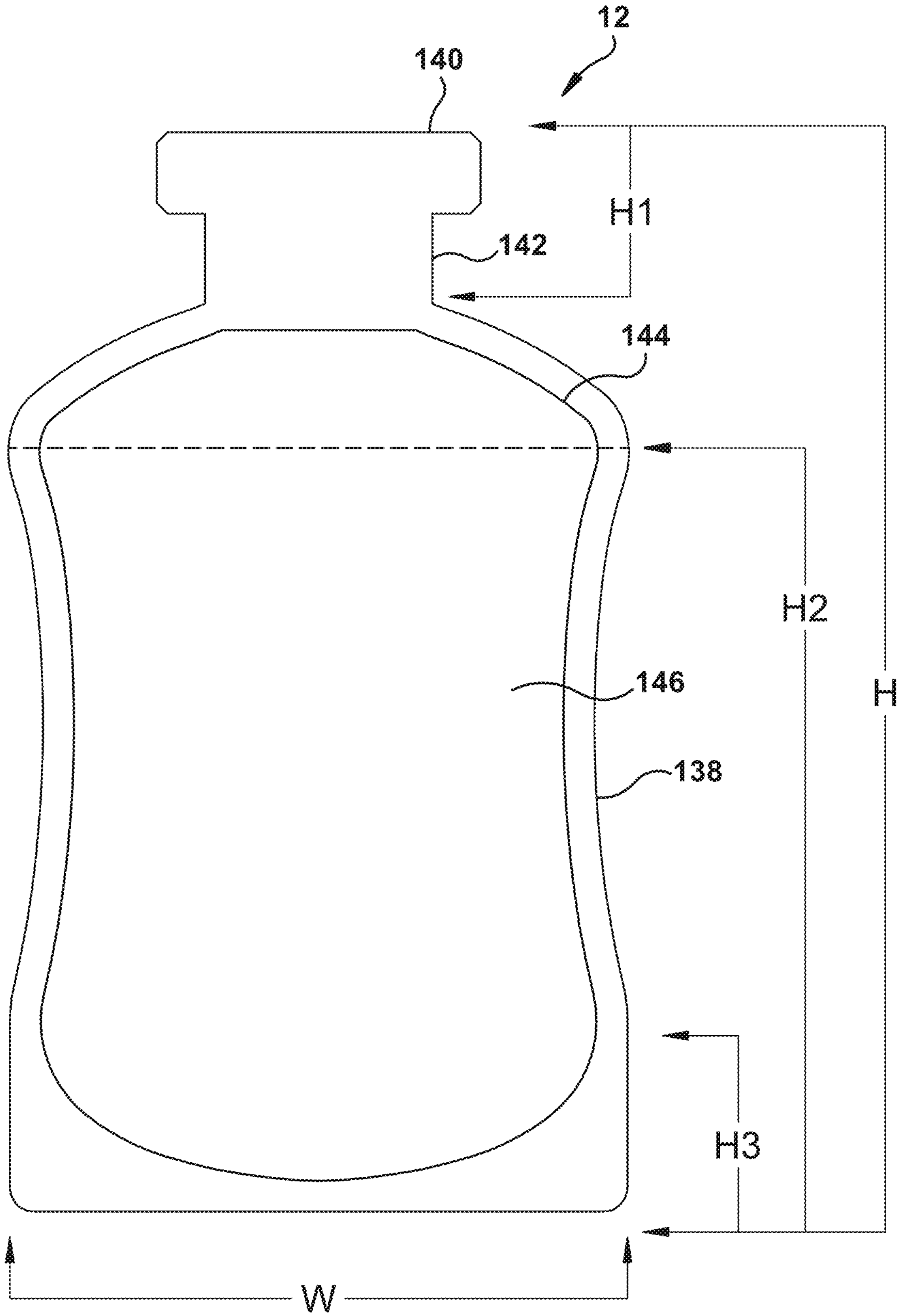
FIG. 18 illustrates a front view of a pouch that may be used with the wine dispensing device according to an embodiment of the present invention.

Referring to FIG. 18, a first example pouch 12 is illustrated as having an outer perimeter 138 that resembles a bottle. The profile of the pouch 12 includes a rectangular cap 140, a rectangular neck 142, and sloping, curved shoulders 144 that extend downwardly from the neck 142. After the shoulders 144, the side edges of the pouch curve inwardly to a central location along the height of the shoulders 144, and then curves outwardly until hitting a vertical portion of the side edges. The vertical portion of the side edges is positioned directly adjacent the bottom surface of the pouch 12, which is flat. The internal shape of the bladder 146 of the pouch 12 is shown as following the shape of the outer edges of the pouch 12. At the top end, the bladder 146 starts directly adjacent the bottom of the neck 142. At the bottom end, the bladder 146 walls have a curved shape in the bottom corners. The curved shape does not match the exterior walls of the pouch 12 and instead is more rounded than the bottom of the pouch 12 shape, which is more rectangular. This pouch 12 has a width of about 3.75 inches and a height of about 6.5 inches. The combined height of the neck 142 and cap 140 is about 1.0 inch. H1 is about 1 inch, H2 is about 4 inches, H3 is about 1 inch, W is about 3.8 inches, and H is about 6.5 inches.

Figure 19:
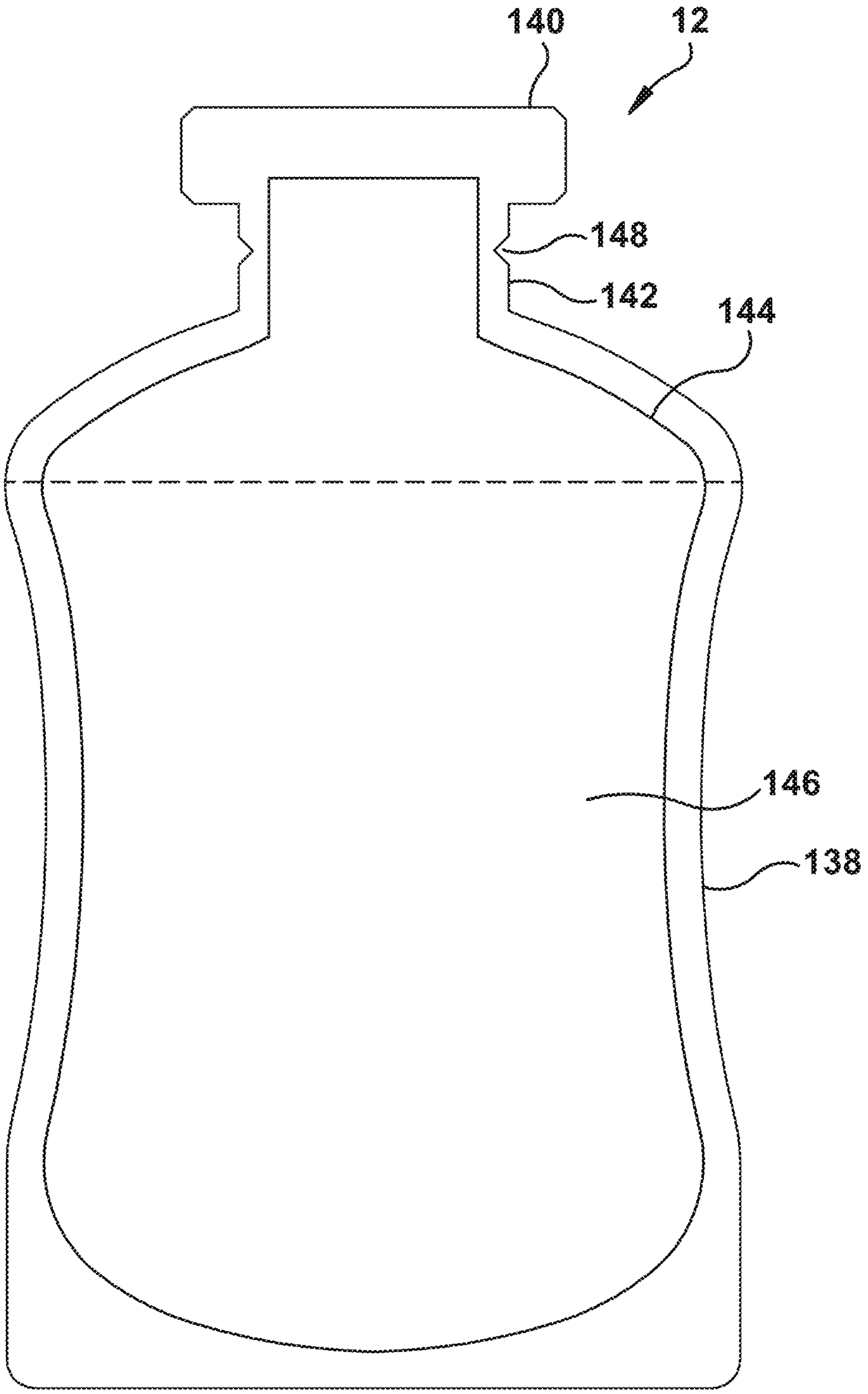
FIG. 19 illustrates a front view of a pouch that may be used with the wine dispensing device according to another embodiment of the present invention.

FIG. 19 depicts a pouch 12 shape similar to that shown in FIG. 18, but the bladder 146 extends into the neck 142 of the pouch 12 to the cap 140. In addition, the pouch 12 may include an indented tear portion 148 in the neck 142 that permits the pouch 12 to be torn more easily. The tear portions 148 in the neck 142 are triangular. Pouch 12 may be capable of holding at least five (5) ounces of liquid or greater depending on a desired serving size.

The material utilized for the pouch 12 must permit the shelf-life of the wine to be at least 18 months and preferably at least 24 months. Types of materials that may be utilized include foil rolls such as: 12PET/9AL/12PET/70PE; 48 ga PET/60BON/4 mil PE; 100 Bon/100 bon/150 PE; 48 ga PET/48 ga METPET/4 mill PE; 48 ga PET/5 mil PE; 48 ga PET/60 BON/5 mil PE; 0.92 mil Polyester/ADH/.48 MET-PET/ADH/.60 mil Nylon/ADH/5.0 mil WLLDPEF; or 0.48 PET/0.48 MET PET/0.6 Nylon/3.5 EVOH Coex film. Other materials presently known or developed in the future may alternatively be utilized.

Decanting:

The disclosed wine dispensing device preferably includes one or more decanting systems. Multiple types of decanting techniques may be used to achieve agitation and aeration, such as gravity fed, disruption and venturis. The wine dispensing device may also have a mechanism for filtering sulfites. A filter (not shown) may be used to reduce sulfites to a normal level. The filtering mechanism may be a filter that can be changed by a user. The filter may be washable and reusable or disposable.

Aeration opens the wine which maximizes the amount of surface area that is exposed to oxygen. Adding oxygen into wine rapidly speeds the fermentation process, aging the wine just before it is consumed. Studies show that both red and white wines benefit from aeration before consumption. Several known types of decanting include venturi decanting, diverting decanting, and umbrella decanting.

Figure 20:
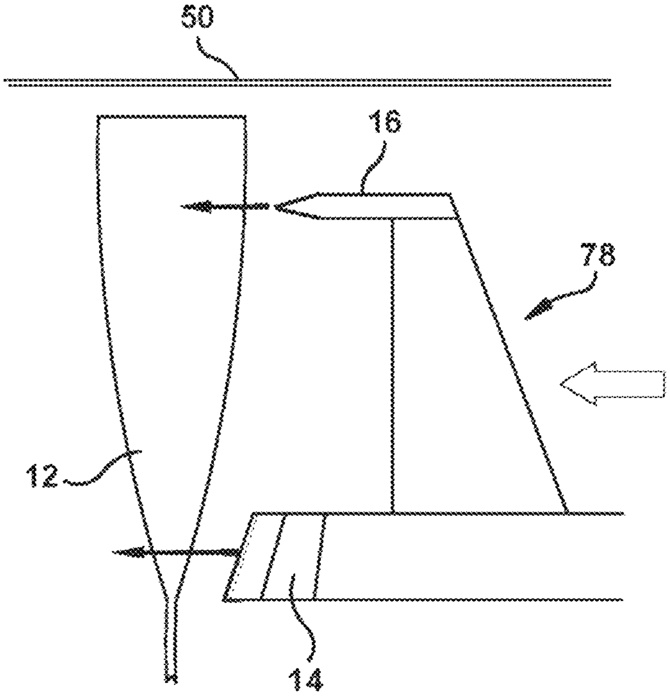
FIG. 20 illustrates a cut-away side view of a wine dispensing device showing an aerating technique for aerating, opening and dispensing wine from a pouch according to an embodiment of the present invention.

Venturi decanting is when the wine is forced through a small opening, which causes air to be mixed with the wine as it flows through the opening. In one example, such as shown in FIG. 20, that utilizes venturi decanting, a hole is punctured into the pouch 12 which allows air to enter the pouch 12, creating aeration and bubbling within the pouch 12. Then the pouch 12 is cut open using a knife or cutting blade 14, as shown being positioned near the bottom of the pouch 12, to release the wine in the pouch 12. The release of wine from the pouch 12 causes some aeration because air is mixed with the wine as it leaves the pouch 12. The cutting knife slices into the bottom of the pouch 12 and may be coupled to a spring-loaded cutter or could be coupled to a motor so that the cutting knife continuously slices back and forth for a period of time. The oscillation of the blade 14 back and forth can help to clear the liquid from the pouch 12 and can also add some aeration to the wine. One size blade 14 is shown. The blade 14 could be larger or smaller. For example, the blade 14 could have a height to cut into approximately ¼ of the height of the pouch 12, ⅓ of the height of the pouch 12, or ½ half of the height of the pouch 12, among other heights. The upper end of the pouch 12 can be punctured to permit the introduction of air, which will help in the release of fluid from the pouch 12. A puncturing/piercing element 16 or cutting device 14 could be used to open the top end of the pouch 12.

Diverting decanting involves moving wine in a different direction to introduce some turbulence and associated oxygenation. Umbrella decanting is when wine flows over a body to cause turbulence and associated oxygenation. Umbrella decanting is a simple design that involves pouring wine over an umbrella shaped member and allowing the wine to flow over the umbrella shaped member and fall off the umbrella. This type of decanting requires sufficient height within the unit to permit the wine to fall from the umbrella.

Sediment removal is also typically a part of decanting. There are several ways to remove sediments from liquids including the simple solution of using a gold-plated filter similar to ones found in many coffee makers. Any type of filter that is used to pick up particulate matter will need to be replaced or changed over time. The filter could be stored in a drawer and be rinsed or dropped into a sliding drawer. The size of the filter only needs to be about the size of a quarter but could be larger.

There are multiple locations within the system where aeration can occur, including the following:

When the pouch 12 is cut by a cutting blade 14, the wine is aerated by the action of the blade 14 on the pouch 12 because it adds air to the wine.

When the wine flows from the pouch 12 into a wine reservoir. While the wine is in the reservoir, it is exposed to air which naturally aerates the wine.

When the wine is pumped to the cooling section, the action of a pump aerates the wine.

When the wine cascades through a heatsink/Peltier cooler, air is naturally added due to the turbulence that is created within the flow path. Even if the Peltier cooler surface is flat, it opens the wine up to more oxygen.

When the wine enters a dispensing nozzle, the wine swirls around the nozzle, which again causes the wine to be aerated. The dispensing nozzle may include a funnel that at the top that has an air gap. This funnel decreases pressure on the lines to counter sputter where left over water is remaining and dispensed before a wine dispense occurs.

There may also be other locations within the dispensing process where aeration occurs. According to another embodiment, decanting or aeration may be bypassed via a separate tubing or pathway for beverages that do not require oxygenation, such as sparkling wine.

Figure 21:
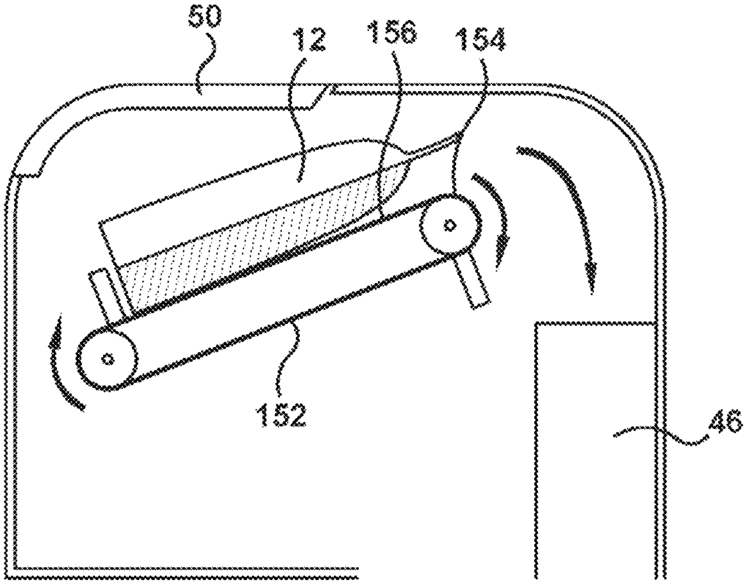
FIG. 21 illustrates a cut-away side view of a wine dispensing device showing an exemplary pouch disposal configuration.
Figure 22:
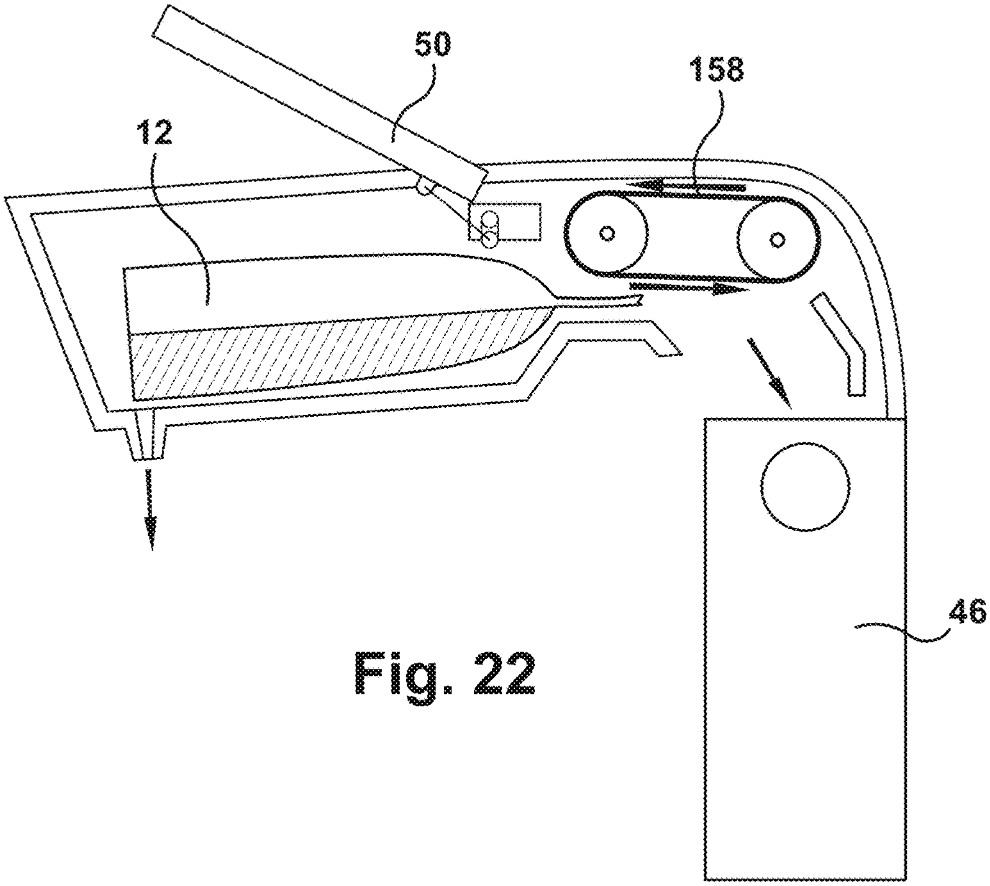
FIG. 22 illustrates a cut-away side view of a wine dispensing device showing another exemplary pouch disposal configuration.
Figure 23:
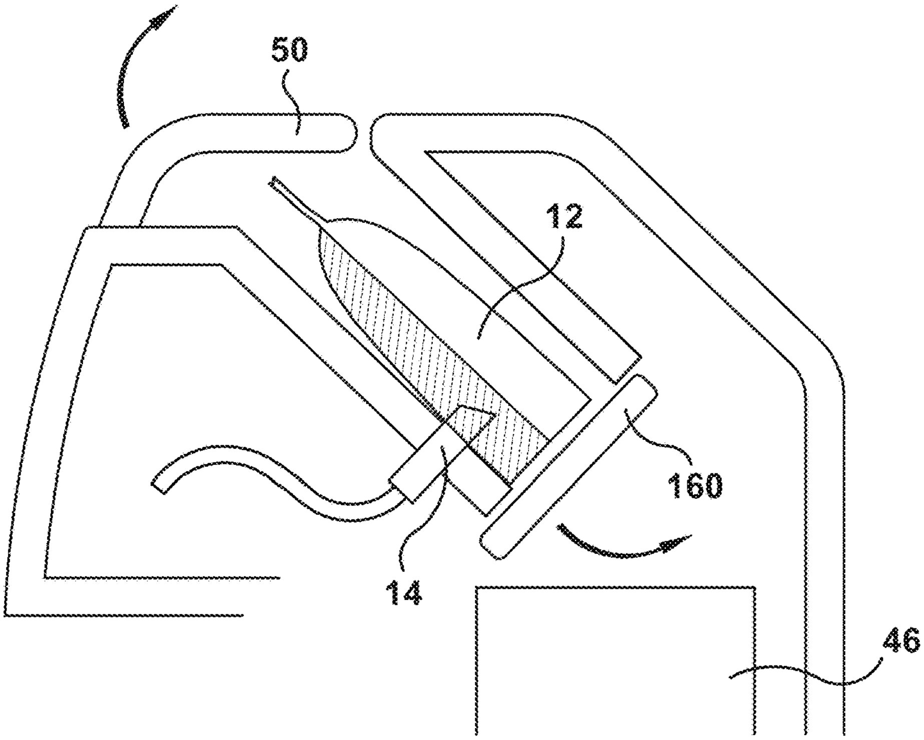
FIG. 23 illustrates a cut-away side view of a wine dispensing device showing yet another exemplary pouch disposal configuration.

Pouch Discarding:

As previously discussed, the disclosed wine dispensing device may include a system for discarding emptied pouches into a waste bin. The waste bin may be positioned on a rear surface of the device and may include a door that can be opened by the user to gain access to the discarded pouches. The waste bin may be positioned inside the housing but could be positioned outside the housing if desired. Different techniques for discarding pouches are shown in FIGS. 21-23. The techniques shown are non-exhaustive and it should be recognized that other discarding techniques could be used.

One type of pouch discarding technique is belt paddle discarding, as shown in FIG. 21. In this type of discarding, belt paddle 152 push the pouch 12 over a "hill" or "peak" 154 of a ramp 156 and then the pouch 12 falls into a waste bin 46.

Another type of pouch discarding technique is a belt-driven discard, which is shown in FIG. 22. In this technique, a belt 158 grabs the top edge of the pouch 12 and pulls the pouch 12 through a small space, similar to a deposit slot of an automatic teller machine ("ATM"). The stickiness or rubbery nature of the belt 158 helps to grab and pull the pouch 12. The pouch 12 is then led into a waste bin 46, where it falls by gravity.

Another type of pouch discarding is "trap door" discarding shown in FIG. 23, where a servo can remotely open and close a door 160 to a waste bin 46. Once the door 160 is opened, the pouch 12 is permitted to fall into the waste bin 46. Different types of motors can be used to assist in discarding the pouch 12 after it has been cut and emptied. One type of motor is a stepper motor, which is a simple motor with a continuous position sensor. This type of motor provides full control over the number of rotations and position of the motor at all times. The stepper motor provides more freedom than a servo motor but involves more programming. The servo motor is a simple and inexpensive motor that provides automation with finesse. It has limited capabilities with only 180 degrees of rotation. There are, however, simple ways to convert rotational force into linear force for opening and closing a pouch bin 46. Another type of motor is a motor and switch. In this set up, the motor will run freely for a predetermined time until a switch turns off the motor. There is no position or rotation control unless switches are used to control position. This type of motor is most cost effective if standard servos or stepper motors are not robust enough.

A waste bin 46 is positioned inside the housing and can be rotatable outwardly when a rear door on the housing is opened. The discard bin 46 can rotate outwardly when the door opens in an automatic fashion or can rotate outwardly when the user pulls the bin 46 out of the housing. Other types of discard bins can be used, if desired. In one embodiment of the device, the waste bin 46 can hold 3-4 discarded pouches 12 before it needs to be emptied.

In one example, a single servo is used to operate two doors that are associated with the waste bin 46. The entire floor flips orientation to ensure the pouches 12 are ejected from the loading hopper.

The system also includes electronics that permit the system to work, including a PCB board, programming, LEDs, and other known parts.

Pouch Scanning and Processing:

The disclosed wine/beverage dispensing device may further include a code reader or scanner for scanning codes printed on or associated with pouches, such as barcode or a Quick Response ("QR") code. A scan code on a pouch may include information for the dispensing device to determine a type of wine or beverage that will be dispensed. That is, data in the code may be used to control the dispensing device's operation. The scan codes may also be used to authenticate pouches as coming from a licensed/trustworthy source.

Figure 59:
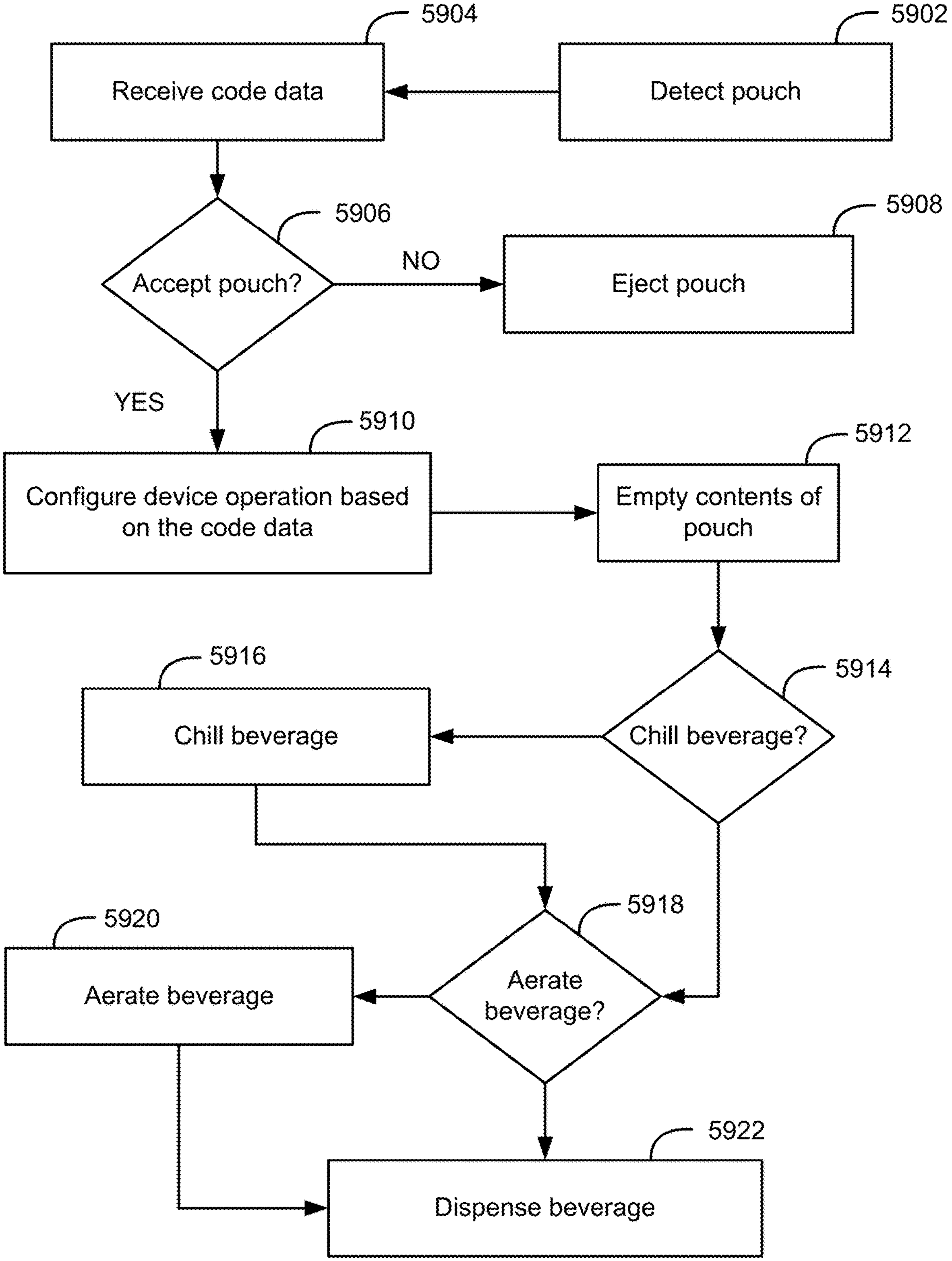
FIG. 59 illustrates a method for processing a pouch by a beverage dispensing device according to an embodiment of the present invention.

FIG. 59 presents a method for processing a pouch by a beverage dispensing device according to an embodiment of the present invention. A beverage pouch may be inserted into a compartment of the beverage dispensing device. The beverage dispensing device may include a sensor configured to detect presence of the pouch within the compartment. The pouch is detected, step S902. The beverage dispensing device may include a computing device configured to receive the detection of the pouch from the sensor.

The beverage dispensing device receives code data, step S904. The computing device may receive code data from a code scanner or code scanning device coupled to the computing device. Alternatively, the computing device may wirelessly receive code data from a mobile device, such as a smartphone including code scanning capabilities, via a wireless network or communication protocol. The code data may be embedded on a scan code associated with a pouch. The code data may include parameters such as ideal serving temperature, time, ideal aeration, and other information to control how a beverage in a pouch is processed. The code data may also include information including year of vintage, vineyards, grape varietal, food pairings, tasting notes, regions, wine makers, aromas, viscosity, sediments, production method, wine ratings/user reviews, packager/packaging facility, and date of packaging.

The code data is used to determine whether a pouch should be accepted by the beverage dispensing device, step S906. For example, the beverage dispensing device may authenticate a given pouch as coming from a licensed/trustworthy source. Additionally, the beverage dispensing device may also determine whether the beverage in the pouch have expired or subject to a recall based on packager/packaging facility and date of packaging from the scan code.

If the beverage is rejected by the beverage dispensing device, the pouch is ejected, step S908. Otherwise, operation of the beverage dispensing device is configured based on the code data, step S910. The computing device may determine which type of beverage is being dispensed and perform operations that are dependent on the type of beverage. For example, red wines and white wines may require different preparation prior to dispensing. According to one embodiment, the beverage dispensing device may include separate tubing or flow paths for each type of wine or beverage and direct a beverage from a pouch based on a type of beverage specified by code data on the pouch. The computing device may also display information from the code data on a visual display screen for the user to view.

The computing device instructs a cutting mechanism to empty a beverage from the pouch into a beverage reservoir, step S912. The beverage dispensing device may include a temperature sensor for detecting temperature of the beverage in the beverage reservoir. The computing device determines whether the beverage requires chilling, step S914. The computing device may determine proper chilling of the beverage to an ideal serving temperature based on the determined type of beverage and/or code data. If the temperature is above the ideal serving temperature, the beverage dispensing device performs a chilling process on the beverage, step S916. The chilling process may include the computing device instructing a pump to pump the beverage from the beverage reservoir to a cooling system. The cooling system may be controlled by the computing device to cool the beverage until a time limit is reached, at which point the beverage may be released. There may be times when the beverage is too cool when inserted into the beverage dispensing device, such as being below 50° F. (10° C.) for white wine. In these instances, the system may hold the beverage for a predetermined period in the beverage reservoir.

The computing device determines whether the beverage requires aeration, step S918. The disclosed beverage dispensing device may include one or more decanting systems to achieve agitation and aeration, such as gravity fed, disruption and venturis. Beverages, such as wine, may benefit from oxygenation to improve a wine's flavor by exposing it to fresh air, and allowing it to breathe. The computing device determines an aeration process to achieve ideal aeration for the beverage based on the determined type of beverage and/or code data and processes the beverage from either the cooling system or the beverage reservoir based on the chilling process, step S920. The beverage may be pumped and directed to an aeration component by a valve controlled by the computing device. The aerated beverage is dispensed from the beverage dispensing machine, step S922. Dispensing the beverage from the beverage dispensing machine may include the computing system instructing a nozzle to release the beverage. However, certain beverages, such sparkling wines, may not require aeration or aeration may be indicated as unnecessary by the code data or based on configurable settings. In such a case, the beverage is pumped and dispensed from the beverage reservoir without aeration, step S922.

Examples:

To cool 60 oz. of liquid from 70° F. to 50° F. (21° C. to 10° C.), a Peltier cooler may be used to remove 7800 joules of energy at a target of 60 seconds, or 130 watts. As the liquid volume drops, the amount of energy required will drop. To remove 130 watts of energy, a Peltier cooler is chosen that has a combined rating of 130 Watts at a delta T of 20° F. (7° C.). As the Peltier cooler moves heat from one side of the cooler to the other side, it creates even more heat. To move the 130 watts of energy from the wine, the Peltier cooler creates an additional 125 Watts of heat that needs to be removed from the hot side of the Peltier cooler. A heatsink is used to remove all 255 Watts of heat from the hot side of the Peltier cooler such that the hot side of the Peltier cooler remains at room temperature.

A change in any of the variables associated with cooling requires reevaluation of every component. All variables directly affect one another. Each time a variable is changed, different components must be selected to say within the preferred operating range.

Tests were performed using 6 oz of water, 5 oz of water, and 4 oz of water for periods of time of 60 seconds, 90 seconds, and 120 seconds. The target temperature drop was 20° F. (6.7° C.). For 6 oz of water, the total energy removed was 7832.4 joules. For 5 oz. of water, the total energy removed was 6524.7 joules. For 4 oz. of water, the total energy removed was 5221.6 joules.

The following test results were achieved:

| 6 oz. at ΔT 20° F. (7° C.) | 5 oz. at ΔT 20° F. (7° C.) | 4 oz. at ΔT 20° F. (7° C.) |
|---|---|---|
| 60 seconds = 130.54 W | 60 seconds = 108.75 W | 60 seconds = 87.03 W |
| 90 seconds = 87.02 W | 90 seconds = 72.5 W | 90 seconds = 58.02 W |
| 120 seconds = 65.27 W | 120 seconds = 54.37 W | 120 seconds = 43.51 W |

Based upon the test results, it was determined that a wine dispensing device could move 160 Watts of heat at a ΔT 15° C. by using two Peltier coolers that were powered at 12 volts. The Peltier coolers would draw 10.4 Amps of power.

The wine dispensing device may include a window for viewing the wine during the dispensing process. Aeration may be a visual feature, with the aeration being performed in a window or in part of the device that protrudes from the machine. The device would be used to show swirling and opening of the wine.

While the device has been described as performing a cooling/chilling function, the device could also perform a heating/warming function if the wine temperature is too low. This can be performed using the same Peltier cooler by flipping the current on the cooler from the cold side to the hot side.

The Peltier coolers utilize fans that help to draw away heat from the hot side of the Peltier cooler. These fans may be positioned in the back of the device so that hot air is not blown towards a user.

The disclosed wine dispensing device can be stored under an upper cabinet, but, in use, depending upon the type of door utilized, may also fit comfortably on most counter tops under the upper cabinets, or otherwise. According to one embodiment, the disclosed wine dispensing device may comprise a smart appliance that may be connected to other devices (such as smartphones) or networks via different wireless protocols such as Bluetooth, Zigbee, NFC, Wi-Fi, LiFi, long range wide area network ("LoRa"), cellular communication networks, etc., that can operate to some extent interactively and autonomously. The disclosed wine dispensing device may further comprise wireless speaker hardware and capable of playing music from, e.g., a smartphone.

The disclosed wine dispensing device may also be updated via over-the-air software or firmware updates. The software or firmware may be installed to update the wine dispensing device for new partnership wines or to update the wine dispensing device with features in a subscription, such as by purchase.

If a pouch that is inserted is already cool enough at the start, a temperature reading that is taken will determine this and then programming will instruct the device to run through the cooling cycle for a 1-minute period for decanting purposes.

The device utilizes a cleaning technique that permits a quick rinse of the system. A deeper clean can be achieved by disassembling the device. The device includes a small reservoir of water for use in the quick rinse cycle.

The wine dispensing device is disclosed in the context of wine. It is envisioned that the device could be used for dispensing other types of fluids, such as water, liquors, cocktails, or other products. Different types of pumps can be used for performing various steps within the system, including: positive displacement pumps and centrifugal pumps, such as rotary positive displacement pumps, reciprocating positive displacement pumps, various positive-displacement pumps, helicon-axial pumps, twin-screw pumps, progressive gravity pumps, and electrical submersible pumps, among other types of pumps.

While the technology described herein is discussed in the context of a single-serve device, the device could be modified to cool greater quantities of wine, if desired. For example, a pouch having multiple glasses of wine could be utilized and cooled in bulk or cooled by the glass. According to one embodiment, the wine dispensing device may be configured for two modes of use—a casual consumption setting and a party use setting. For example, the causal consumption setting may comprise a setting that allows for the wine dispensing device to dispense wine for 2-4 individuals with 2-6 glasses dispensed. The party use setting may comprise a setting that allows for the win dispensing device to be used heavily to dispense wine for 10-20 individuals with 20-50 glasses dispensed, for example.

According to one embodiment, a beverage dispensing device is disclosed for dispensing beverages other than wine. The beverage dispensing device includes a housing, a receptacle, means for opening the beverage container, a thermoelectric cooler, an aeration component, and a discharge nozzle. The housing may include a flow path. The receptacle in the housing may receive a beverage container that houses a beverage and for discharging the beverage into the flow path. The means for opening the beverage container may be used for releasing the beverage therefrom. The thermoelectric cooler may be positioned in the housing for one of chilling or warming the beverage along the flow path. The aeration component may be used for aerating beverage in the flow path. The discharge nozzle is coupled to the flow path for dispensing the beverage from the housing.

The thermoelectric cooler may cause aeration and includes one or more of fins, projections, a circuitous path, and a flat surface. The thermoelectric cooler may be a Peltier cooler coupled to a cooling system. The Peltier cooler may include a cooling surface coupled to projections that extend outwardly from a surface of the cooler, said projections for receiving the beverage such that the beverage flows through and around the projections, creating turbulence in the beverage flow. The projections serve an aeration function for the beverage. The cooling system may include one or more of a pump, a valve, a cooling block, a radiator, and cooling fluid circulating through the radiator.

The device may also include activation hardware and software for activating the device to cool and dispense a beverage from the beverage container. The device may also include a discharge bin coupled to the receptacle and a discharge mechanism coupled between the receptacle and the discharge bin. The beverage container may be moved from the receptacle to the discharge bin via the discharge mechanism after the beverage container has been substantially emptied of the beverage. The discharge bin may be associated with a rear surface of the housing.

The housing may include a head having a top surface having an opening for receiving the pouch. The opening may be coupled to the receptacle. The housing may alternatively include a door coupled to the opening. The door may be automatic or manual. The head includes the discharge nozzle positioned on a lower side thereof. The housing also includes a recess positioned below the head and the discharge nozzle for receiving a glass or cup.

In another embodiment, a wine dispensing device includes a housing, an opening in the housing, a cutting mechanism, a Peltier cooler, a tube, and a discharge opening. The housing may include a wine flow path therethrough. The opening in the housing may be used to receive a flexible pouch filled with wine. The cutting mechanism may be used for cutting or slicing open the pouch to permit wine to vacate the pouch. The wine may flow by gravity into a holder for catching the wine. The Peltier cooler may be associated with the flow path and has a cooling surface. The tube may couple the holder for moving wine from the holder to the Peltier cooler. The discharge opening may be coupled to the Peltier cooler. Wine may be pumped from the holder to an upper end of the Peltier cooler where it flows over the cooling surface and is discharged to the discharge opening.

The housing may include a receptacle for receiving the pouch. The receptable may be coupled to the opening in the housing. The cutting mechanism may be coupled to the receptacle to permit cutting of the pouch when the pouch is positioned in the receptacle.

A plurality of fins may be operatively associated with the cooling surface of the Peltier cooler and the fins are likewise cooled by the Peltier cooler. The cooling surface may be positioned in the flow path and may have at least a partially vertical orientation.

The cutting mechanism may include a cutting blade and the cutting blade may be coupled to a motor that moves the blade in and out of contact with the pouch to repeatedly cut and/or agitate the pouch. The movement of the cutting blade may cause aeration of the wine.

The receptacle may be coupled to a discharge bin. The device may include means for transferring a pouch from the receptacle to the discharge bin.

The device may include a door coupled to the opening in the housing. The door closes the opening and the opening may be either manually operated or automatically operated.

The device may also include an activation button for turning the device on and for activating the dispensation of wine from the device.

The device may include a movable base member for seating a glass thereon. The base member may be movable to provide at least a first height for a first height glass and a second height for a second height glass. The base member may be configured to position a top end of the glass directly adjacent the discharge opening of the device to deter splatter.

The device may also include a cooling system associated with the Peltier cooler for transferring heat away from the cooling surface of the Peltier cooler. The cooling system may include at least a cooling block, a pump, a fan and a radiator.

The device may also include a vessel for holding wine directly coupled to the Peltier cooler and a temperature sensor. The vessel may include a discharge opening that is coupled to a valve that opens and closes the discharge opening. The wine in the vessel may be retained in the vessel until cooled to a prescribed temperature as determined by the temperature sensor. Multiple Peltier coolers may be utilized in the device.

The cooling system of the device may include at least one cooling pump, at least one thermoelectric cooler, at least one heatsink, at least one radiator, and at least one fan. The beverage may flow into one opening in the heatsink and out of another opening in the heatsink, and the cooling pump may pump a cooling fluid from an area adjacent the thermoelectric cooler and through the radiator that is cooled by the at least one fan and returned to the cooling pump.

The cooling system may include a pair of Peltier coolers with a heatsink positioned between the Peltier coolers, with a cooling pump positioned directly adjacent each of the Peltier coolers to transfer warm cooling fluid through a radiator. The cooling fluid is cooled and then recirculated to the respective cooling pump.

The heatsink may include a pair of plate-like members having fins extending outwardly from a surface thereof to define channels. The fins may be positioned adjacent one another to provide a flow path therebetween. The heatsink may also include a core positioned between the plates to define sides of a chamber through which the beverage may flow. The core may include an entrance and an exit that each corresponds with a channel defined between the two plate-like members. A seal may be positioned between the core and each of the plate-like members. A plurality of fasteners may be utilized for coupling the heatsink together.

The receptacle for receiving the beverage container may be shaped to trap the beverage container in the receptacle and to permit cutting of the receptacle with a cutting knife that moves into and out of the receptacle to cut the beverage container. The beverage in the container may evacuate the container via gravity.

The device may also include a first temperature sensor associated with the reservoir, a second temperature sensor associated with the device for measuring an ambient temperature, and a third temperature sensor associated with the cooling system for measuring the temperature of the beverage in the cooling system.

The term "substantially," if used herein, is a term of estimation. While various features are presented above, it should be understood that the features may be used singly or in any combination thereof. Further, it should be understood that variations and modifications may occur to those skilled in the art to which the claimed examples pertain. The examples described herein are exemplary. The disclosure may enable those skilled in the art to make and use alternative designs having alternative elements that likewise correspond to the elements recited in the claims. The intended scope may thus include other examples that do not differ or that insubstantially differ from the literal language of the claims. The scope of the disclosure is accordingly defined as set forth in the appended claims.

What is claimed is:

1. A beverage dispensing device comprising:
- a beverage reservoir;
- a receptacle that receives a beverage container including a beverage and discharges the beverage from the beverage container into the beverage reservoir;
- a cutting mechanism that opens the beverage container to release the beverage therefrom, wherein the cutting mechanism comprises a cutting blade coupled to a motor that moves the cutting blade in and out of contact with the beverage container to repeatedly cut and/or agitate the beverage container;
- a cooling system comprising one or more thermoelectric coolers including one or more plate-like surfaces along the flow path, the cooling system performing at least one of chilling or warming the beverage that flows over at least part of the plate-like surface;
- a pump that transfers the beverage from the beverage reservoir to the cooling system;
- an aeration component that receives and aerates the beverage from the cooling system; and
- a discharge nozzle coupled to the aeration component that dispenses the beverage.

2. The beverage dispensing device of claim 1, wherein the one or more thermoelectric coolers cause additional aeration and include one or more of fins, channels, projections, a circuitous path, and a flat surface.

3. The beverage dispensing device of claim 1, wherein the one or more thermoelectric coolers include a Peltier cooler coupled to a radiator system.

4. The beverage dispensing device of claim 3, wherein the Peltier cooler includes a plate-like surf ace that allows the beverage to flow therewith, the plate-like surface is either smooth or non-smooth, wherein the non-smooth surface provides turbulence to the beverage that serves as an aeration function.

5. The beverage dispensing device of claim 3, wherein the cooling system comprises one or more of a pump, a valve, a cooling block, a radiator, and a cooling fluid circulating through the radiator.

6. The beverage dispensing device of claim 1 further comprising activation hardware and software that activates the beverage dispensing device to cool and dispense the beverage from the beverage container.

7. The beverage dispensing device of claim 1 further comprising:

a discard bin coupled to the receptacle; and a discard mechanism coupled between the receptacle and the discard bin, wherein the discard mechanism comprises a belt paddle, a swing door, or a belt-driven discard, and wherein the beverage container is moved from the receptacle to the discard bin via the discard mechanism after the beverage container has been substantially emptied of the beverage.

8. The beverage dispensing device of claim 1 further comprising a housing including a head having a top surface having an opening for receiving the beverage container, the opening being coupled to the receptacle.

9. The beverage dispensing device of claim 8 further comprising a door coupled to the opening, the door being automatic or manual, and the head including the discharge nozzle positioned on a lower side thereof, wherein the housing includes a recess positioned below the head and the discharge nozzle for receiving a glass.

10. The beverage dispensing device of claim 8 further comprising a door coupled to the opening in the housing, wherein the door closes the opening and is opened either manually or automatically operated.

11. The beverage dispensing device of claim 1 further comprising a piercing element that pierces the beverage container at one or more locations on the beverage container to permit the beverage to vacate the beverage container, wherein the beverage flows by gravity into the beverage reservoir.

12. A beverage dispensing device comprising:

a beverage reservoir;

a receptacle that receives a beverage container including a beverage and discharges the beverage from the beverage container into the beverage reservoir;

a piercing element comprising one or more sharp elements that are coupled to a motor that moves the piercing element in and out of contact with the beverage container to repeatedly pierce and/or agitate the beverage container, the movement of the piercing element causing aeration of the beverage and releasing the beverage from the beverage container;

a cooling system comprising one or more thermoelectric coolers including one or more plate-like surfaces along the flow path, the cooling system performing at least one of chilling or warming the beverage that flows over at least part of the plate-like surface;

a pump that transfers the beverage from the beverage reservoir to the cooling system;

an aeration component that receives and aerates the beverage from the cooling system; and a discharge nozzle coupled to the aeration component that dispenses the beverage.

13. The beverage dispensing device of claim 1, wherein the cutting mechanism is coupled to the receptacle to permit cutting of the beverage container when the beverage container is positioned in the receptacle.

14. The beverage dispensing device of claim 1, wherein the receptacle is coupled to a discard bin, and further comprising means for transferring the beverage container from the receptacle to the discard bin, wherein the means for transferring comprises a belt paddle, a swing door, or a belt-driven discard.

15. The beverage dispensing device of claim 3, wherein the Peltier cooler includes a cooling surface positioned in a partially vertical orientation.

16. A beverage dispensing device comprising:

a beverage reservoir;

a receptacle that receives a beverage container including a beverage and discharges the beverage from the beverage container into the beverage reservoir;

a cutting mechanism including a cutting blade that is coupled to a motor that moves the blade in and out of contact with the beverage container to repeatedly cut and/or agitate the beverage container, the movement of the cutting blade causing aeration of the beverage and releasing the beverage from the beverage container;

a cooling system comprising one or more thermoelectric coolers including one or more plate-like surfaces along the flow path, the cooling system performing at least one of chilling or warming the beverage that flows over at least part of the plate-like surface;

a pump that transfers the beverage from the beverage reservoir to the cooling system;

an aeration component that receives and aerates the beverage from the cooling system; and a discharge nozzle coupled to the aeration component that dispenses the beverage.

17. The beverage dispensing device of claim 1 further comprising an activation button, the activation button turning the beverage dispensing device on and activating dispensation of the beverage from the beverage dispensing device.

18. The beverage dispensing device of claim 1, wherein the cooling system comprises:

at least one cooling pump;

at least one heat sink;

at least one radiator; and at least one fan, wherein the beverage flows into a first opening in the heat sink and out of a second opening in the heat sink, and the cooling pump pumps a cooling fluid from an area adjacent to the one or more thermoelectric coolers and through the radiator that is cooled by the at least one fan and returned to the cooling pump.

19. The beverage dispensing device of claim 18, wherein the heat sink includes a pair of plate-like members including fins extending outwardly from a surface thereof to define channels, the fins positioned adjacent one another to provide a flow path therebetween, and further comprising a core positioned between the pair of plate-like members to define sides of a chamber through which the beverage flows, the core including an entrance and an exit that each corresponds with a channel defined between the pair of plate-like members, wherein a seal is positioned between the core and each of the plate-like members, and a plurality of fasteners couple the heat sink together.

20. The beverage dispensing device of claim 1, wherein the cooling system comprises a pair of Peltier coolers including a heat sink positioned between the Peltier coolers, and a cooling pump positioned directly adjacent each of the Peltier coolers to transfer cooling fluid through a radiator, where the cooling fluid is cooled and recirculated to the respective cooling pump.

21. A beverage dispensing device comprising:

a beverage reservoir;

a receptacle that receives a beverage container including a beverage, wherein the receptacle is shaped to trap the beverage container in the receptacle and to permit cutting of the beverage container with a cutting knife that moves into and out of the receptacle to cut the beverage container, the beverage in the container evacuating the container via gravity into the beverage reservoir;

a cooling system comprising one or more thermoelectric coolers including one or more plate-like surfaces along the flow path, the cooling system performing at least one of chilling or warming the beverage that flows over at least part of the plate-like surface;

a pump that transfers the beverage from the beverage reservoir to the cooling system;

an aeration component that receives and aerates the beverage from the cooling system; and a discharge nozzle coupled to the aeration component that dispenses the beverage.

22. The beverage dispensing device of claim 1 further comprising a first temperature sensor associated with the reservoir, a second temperature sensor associated with the beverage dispensing device that measures an ambient temperature, and a third temperature sensor associated with the cooling system that measures the temperature of the beverage in the cooling system.

23. The beverage dispensing device of claim 12, wherein the one or more thermoelectric coolers cause additional aeration and include one or more of fins, channels, projections, a circuitous path, and a flat surface.

24. The beverage dispensing device of claim 12 further comprising activation hardware and software that activates the beverage dispensing device to cool and dispense the beverage from the beverage container.

25. The beverage dispensing device of claim 12 further comprising a housing, the housing comprising:

a head having a top surface having an opening for receiving the beverage container, the opening being coupled to the receptacle, wherein the discharge nozzle is positioned on a lower side of the head;

a door coupled to the opening, the door being automatic or manual; and a recess positioned below the head and the discharge nozzle for receiving a glass.

26. The beverage dispensing device of claim 12, wherein the cooling system comprises:

at least one cooling pump;

at least one heat sink, wherein the heat sink includes a pair of plate-like members including fins extending outwardly from a surface thereof to define channels, the fins positioned adjacent one another to provide a flow path therebetween, and further comprising a core positioned between the pair of plate-like members to define sides of a chamber through which the beverage flows, the core including an entrance and an exit that each corresponds with a channel defined between the pair of plate-like members, wherein a seal is positioned between the core and each of the plate-like members, and a plurality of fasteners couple the heat sink together;

at least one radiator; and at least one fan, wherein the beverage flows into a first opening in the heat sink and out of a second opening in the heat sink, and the cooling pump pumps a cooling fluid from an area adjacent to the one or more thermoelectric coolers and through the radiator that is cooled by the at least one fan and returned to the cooling pump.

27. The beverage dispensing device of claim 12 further comprising a first temperature sensor associated with the reservoir, a second temperature sensor associated with the beverage dispensing device that measures an ambient temperature, and a third temperature sensor associated with the cooling system that measures the temperature of the beverage in the cooling system.

28. The beverage dispensing device of claim 16, wherein the one or more thermoelectric coolers cause additional aeration and include one or more of fins, channels, projections, a circuitous path, and a flat surface.

29. The beverage dispensing device of claim 16 further comprising activation hardware and software that activates the beverage dispensing device to cool and dispense the beverage from the beverage container.

30. The beverage dispensing device of claim 16 further comprising a housing, the housing comprising:

a head having a top surface having an opening for receiving the beverage container, the opening being coupled to the receptacle, wherein the discharge nozzle is positioned on a lower side of the head;

a door coupled to the opening, the door being automatic or manual; and a recess positioned below the head and the discharge nozzle for receiving a glass.

31. The beverage dispensing device of claim 16, wherein the cooling system comprises:

at least one cooling pump;

at least one heat sink, wherein the heat sink includes a pair of plate-like members including fins extending outwardly from a surface thereof to define channels, the fins positioned adjacent one another to provide a flow path therebetween, and further comprising a core positioned between the pair of plate-like members to define sides of a chamber through which the beverage flows, the core including an entrance and an exit that each corresponds with a channel defined between the pair of plate-like members, wherein a seal is positioned between the core and each of the plate-like members, and a plurality of fasteners couple the heat sink together;

at least one radiator; and at least one fan, wherein the beverage flows into a first opening in the heat sink and out of a second opening in the heat sink, and the cooling pump pumps a cooling fluid from an area adjacent to the one or more thermoelectric coolers and through the radiator that is cooled by the at least one fan and returned to the cooling pump.

32. The beverage dispensing device of claim 16 further comprising a first temperature sensor associated with the reservoir, a second temperature sensor associated with the beverage dispensing device that measures an ambient temperature, and a third temperature sensor associated with the cooling system that measures the temperature of the beverage in the cooling system.

33. The beverage dispensing device of claim 21, wherein the one or more thermoelectric coolers cause additional aeration and include one or more of fins, channels, projections, a circuitous path, and a flat surface.

34. The beverage dispensing device of claim 21 further comprising activation hardware and software that activates the beverage dispensing device to cool and dispense the beverage from the beverage container.

35. The beverage dispensing device of claim 21 further comprising a housing, the housing comprising:

a head having a top surface having an opening for receiving the beverage container, the opening being coupled to the receptacle, wherein the discharge nozzle is positioned on a lower side of the head;

a door coupled to the opening, the door being automatic or manual; and a recess positioned below the head and the discharge nozzle for receiving a glass.

36. The beverage dispensing device of claim 21, wherein the cooling system comprises:

at least one cooling pump;

at least one heat sink, wherein the heat sink includes a pair of plate-like members including fins extending outwardly from a surface thereof to define channels, the fins positioned adjacent one another to provide a flow path therebetween, and further comprising a core positioned between the pair of plate-like members to define sides of a chamber through which the beverage flows, the core including an entrance and an exit that each corresponds with a channel defined between the pair of plate-like members, wherein a seal is positioned between the core and each of the plate-like members, and a plurality of fasteners couple the heat sink together;

at least one radiator; and at least one fan, wherein the beverage flows into a first opening in the heat sink and out of a second opening in the heat sink, and the cooling pump pumps a cooling fluid from an area adjacent to the one or more thermoelectric coolers and through the radiator that is cooled by the at least one fan and returned to the cooling pump.

37. The beverage dispensing device of claim 21 further comprising a first temperature sensor associated with the reservoir, a second temperature sensor associated with the beverage dispensing device that measures an ambient temperature, and a third temperature sensor associated with the cooling system that measures the temperature of the beverage in the cooling system.

* * * * *